United States Patent
Masuda et al.

(10) Patent No.: US 11,504,857 B2
(45) Date of Patent: Nov. 22, 2022

(54) WIRE SAW DEVICE, AND PROCESSING METHOD AND PROCESSING DEVICE FOR WORKPIECE

(71) Applicant: Takatori Corporation, Nara (JP)

(72) Inventors: Makoto Masuda, Nara (JP); Hiroyuki Kita, Nara (JP); Masahiro Morita, Nara (JP); Tatsuya Komeda, Nara (JP); Takaaki Yoshimura, Nara (JP); Hisashi Yoshida, Nara (JP); Atsunori Takeda, Nara (JP); Yuichi Inoue, Nara (JP)

(73) Assignee: TAKATORI CORPORATION, Nara (JP)

( * ) Notice: Subject to any disclaimer, the term of this patent is extended or adjusted under 35 U.S.C. 154(b) by 0 days.

(21) Appl. No.: 17/353,084

(22) Filed: Jun. 21, 2021

(65) Prior Publication Data

US 2021/0308871 A1    Oct. 7, 2021

Related U.S. Application Data

(62) Division of application No. 15/776,298, filed as application No. PCT/JP2016/083941 on Nov. 16, 2016, now abandoned.

(30) Foreign Application Priority Data

Nov. 16, 2015 (JP) ................................. 2015-223848
Mar. 3, 2016 (JP) ................................. 2016-041012
(Continued)

(51) Int. Cl.
B24B 41/06     (2012.01)
B23Q 3/08      (2006.01)
(Continued)

(52) U.S. Cl.
CPC .............. *B25J 11/0055* (2013.01); *B23Q 3/08* (2013.01); *B23Q 3/18* (2013.01); *B24B 27/00* (2013.01);
(Continued)

(58) Field of Classification Search
CPC .. B23Q 1/035; B23Q 3/08; B23Q 3/18; B25B 1/2415; B25B 1/2421; B25B 11/00;
(Continued)

(56) References Cited

U.S. PATENT DOCUMENTS 5,224,406 A    7/1993  Nasu
5,971,381 A    10/1999 Genunani
(Continued)

FOREIGN PATENT DOCUMENTS

JP    7-276231    10/1995
JP    10-119031   5/1998
(Continued)

*Primary Examiner* — Lee D Wilson
*Assistant Examiner* — Alberto Saenz
(74) *Attorney, Agent, or Firm* — Wenderoth, Lind & Ponack, L.L.P.

(57) ABSTRACT

In order to respond flexibly to various processing modes, such as forming curved surface shapes, when cutting a workpiece using a wire saw, this wire saw device (1) is provided with: a single robot arm (2) that is capable of moving freely by means of multi-axis control; a wire saw unit (3) that is detachably connected to the robot arm (2) via a tool changer (7); a wire (8) that spans a plurality of pulleys supported within the wire saw unit (3); and a workpiece cutting zone (20) that is established between the pulleys. The workpiece is cut to a prescribed shape by moving the robot arm (2) in a preset direction while running the wire (8) of the wire saw unit (3) and pressing the wire (8) against the supported workpiece.

5 Claims, 38 Drawing Sheets

(30) Foreign Application Priority Data

| Apr. 6, 2016 | (JP) | 2016-076505 |
|---|---|---|
| Apr. 6, 2016 | (JP) | 2016-076820 |
| May 26, 2016 | (JP) | 2016-105552 |
| Jul. 12, 2016 | (JP) | 2016-137409 |

(51) Int. Cl.

| *B23Q 3/18* | (2006.01) |
|---|---|
| *B25J 11/00* | (2006.01) |
| *B24B 55/06* | (2006.01) |
| *B28D 5/04* | (2006.01) |
| *B25J 15/04* | (2006.01) |
| *B24B 27/00* | (2006.01) |
| *B24B 27/06* | (2006.01) |

(52) U.S. Cl.
CPC ......... *B24B 27/0038* (2013.01); *B24B 27/06* (2013.01); *B24B 27/0633* (2013.01); *B24B 41/06* (2013.01); *B24B 55/06* (2013.01); *B25J 15/04* (2013.01); *B25J 15/0408* (2013.01); *B28D 5/04* (2013.01); *B28D 5/045* (2013.01)

(58) Field of Classification Search
CPC . B25B 11/005; B25B 11/007; H01L 21/6838; B24B 27/00; B24B 27/0038; B24B 27/06; B24B 27/0633; B24B 27/065; B24B 41/06; B24B 41/068; B24B 55/02; B24B 55/06; B25J 15/04; B25J 15/0408; B28D 5/04; B28D 5/045; B28D 5/0064; B28D 5/0076; B28D 5/0094; B23D 57/0007
USPC ................. 125/21; 269/20, 21, 35
See application file for complete search history.

(56) References Cited

U.S. PATENT DOCUMENTS

| 6,585,244 | B2 | 7/2003 | Goeckel | |
|---|---|---|---|---|
| 8,382,555 | B2* | 2/2013 | Lee | B24B 37/04 451/41 |
| 8,748,780 | B2* | 6/2014 | Moro | C23C 16/46 269/21 |
| 2005/0035514 | A1* | 2/2005 | Hillman | H01L 21/6838 269/21 |
| 2012/0311848 | A1 | 12/2012 | Park | |
| 2016/0099166 | A1* | 4/2016 | Yudovsky | H01L 21/68764 269/21 |

FOREIGN PATENT DOCUMENTS

| JP | 2003-117750 | 4/2003 |
|---|---|---|
| JP | 2007-098491 | 4/2007 |
| JP | 4390363 | 12/2009 |
| JP | 2014-73549 | 4/2014 |
| JP | 2014-133273 | 7/2014 |
| JP | 2014-136300 | 7/2014 |

* cited by examiner

Fig. 17
(a)
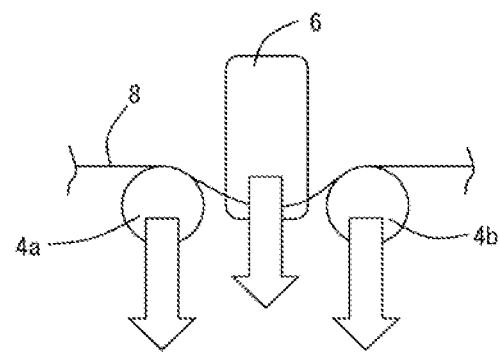
(b)
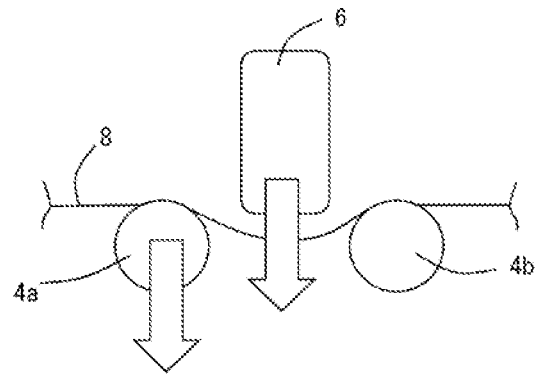
(c)
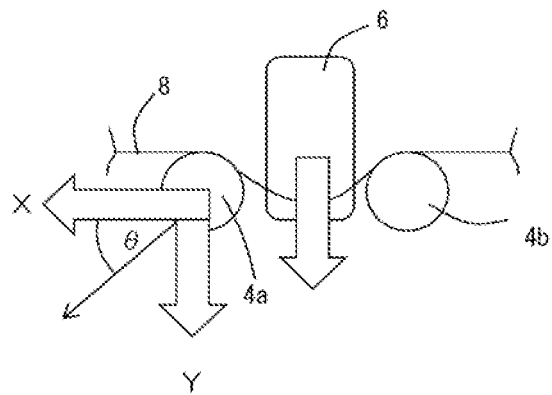

WIRE SAW DEVICE, AND PROCESSING METHOD AND PROCESSING DEVICE FOR WORKPIECE

TECHNICAL FIELD

The present invention relates to a wire saw device for cutting a workpiece by using a multi joint multi-axis controllable robot arm and a processing method and a processing device for a workpiece.

BACKGROUND ART

Conventionally, a wire saw device of a fixed abrasive type that cuts a workpiece by pressing the workpiece such as silicon or sapphire onto a wire row formed by winding a wire between a plurality of groove rollers and includes a fixed abrasive wire in which abrasive grains such as diamond is fixed, on a core wire formed of a steel wire, by electrodeposition, resin, or the like is known.

In processing by a conventional wire saw device, a workpiece is processed and fed to a traveling wire by a processing feed device. This processing feed direction is a uniaxial direction, and thus cannot flexibly cope with various kinds of workpieces or various processing modes such as a curved surface shape.

Also, in the case of using a wire saw device, regardless of a type of the workpiece, how to deal with cutting waste generated during processing and heat generated by friction is an important problem.

In order to solve the above problem, the following various wire saw devices have been proposed as devices that enables cutting of various kinds of workpieces and various processing modes.

With respect to a wire suspended between two cutting rollers, a center line of rotation of the cutting rollers is maintained perpendicular to a curved surface to be processed. The center line of rotation of the cutting rollers is changed in a direction of an elevation angle/depression angle in a processing direction, and the cutting rollers follow the change of the elevation angle/depression angle of a curved surface. There is known a cutting method in which the wire suspended between the rollers is, in accordance therewith, pressed against a workpiece to form a curved surface on the workpiece (for example, Patent Literature 1).

In addition, there is also a wire saw device in which, by moving a robot arm that is provided with a chuck for holding a workpiece at an tip end of the robot arm and is multi-axis controllable, a workpiece is moved to a cutting processing region of a wire provided within an operation range of a robot arm and is pressed against and cut by a traveling wire while the workpiece is held (for example, Patent Literature 2).

Furthermore, there is also a wire saw device having wire guide heads at tip end portions of robot arms of two industrial robots. A wire is suspended between the two wire guide heads, and a workpiece placed within an operation range of the wire guide heads is pressed against the wire and cut in accordance with movement of the robot arms (for example, Patent Literature 3).

In addition, as a method of dealing with cutting waste generated during processing of a workpiece and heat generated by friction, a method of cooling a cutting portion of the traveling wire by cooling water, and washing off the cutting waste generated at the cutting portion is also performed (For example, Patent Literature 4).

Normally, in a wire saw device, if a wire is deflected as cutting of a workpiece progresses and the deflection cannot be controlled, the wire will be disconnected. In addition, processing accuracy is also reduced. Therefore, various wire saw devices as shown below have been proposed in order to control the deflection and realize a stable traveling control of the wire.

In a wire saw device which presses a workpiece against a multi-strand wire row formed between groove rollers in a single direction or in a reciprocating direction while supplying a processing liquid, a dancer roller that applies a predetermined tension to the traveling wire is provided. This device is a wire saw device that includes a load cell that detects a load applied to the dancer roller and is disposed in the vicinity of the dancer roller, and a displacement detection device that measures an amount of displacement of the dancer roller from a reference point, transmits detection results from the load cell and the displacement detection device to a control device, adjusts a feeding amount or a winding amount of a wire from a reel, and controls the deflection of a wire (for example, Patent Literature 5).

In addition, a wire saw device includes a tension sensor for measuring the tension of a wire and a mechanism for adjusting deflection of the wire by pressing the wire, and the tension sensor includes a sensor roller that constantly abuts a wire row and a load sensor that detects the amount of deflection of the wire by detecting the pressing force of the wire row via the sensor roller. The mechanism for adjusting the deflection of the wire includes an operating element, an adjusting roller that is provided at a tip end portion of the operating element and abuts the wire row, driving means that moves the adjusting roller via the operating element in a vertical direction in which the adjusting roller is pressed against the wire row and in a horizontal direction parallel to the wire row. The tension of the wire is measured by the tension sensor, and the tension of the wire is adjusted by operating the driving means for moving the adjusting roller in the vertical direction in which the adjusting roller is pressed against the wire row (for example, Patent Literature 6).

Further, for the wire saw device of Patent Literature 1 described above, a structure is employed in which, in the case where a distance between the cutting rollers is long, a guide bar is bridged between both arms so as to prevent the deflection of the wire, a guide roller for preventing deflection is provided at an intermediate position of the guide bar that is an intermediate point between the cutting rollers, an angle of the guide roller is freely changed together with the pair of cutting rollers, and thus the intermediate position of the wire is supported to suppress the deflection of the wire.

Also, conventionally, prior to cutting a workpiece by a processing device including a wire saw or the like, the workpiece is adhered and fixed to a dummy member (for example, carbon, glass, or ceramics) in advance, and this dummy member is attached to a base member and held by attaching the base member to the processing device. For example, in the case of using a wire saw as the processing device, the workpiece adhered and fixed to the dummy member is attached to the wire saw via the base member. Then, when a traveling wire of the wire saw is pressed against the workpiece, the workpiece is cut into a thin plate shape.

In recent years, lightweight and high rigidity materials have been required to improve efficiency of aircraft and automobiles, and a honeycomb core member is known as one of the materials. The honeycomb core member is formed by assembling a large number of cells formed of light weight members of, for example, a fiber reinforced resin such as aramid resin or aluminum into a honeycomb arrangement. Therefore, the honeycomb core member has a mechanical characteristic that it is high in strength with respect to weight, and as described in Patent Literature 1, the honeycomb core member is cut using a wire saw.

Further, prior to processing the honeycomb core member, it is necessary to fix the honeycomb core member, and this fixing is performed by, for example, clamping the honeycomb core member or adhering the honeycomb core member to the table. Fixing is also performed by screwing a wood screw larger than the cell diameter into a cell of the honeycomb core member (for example, Patent Literature 7).

CITATIONS LIST

Patent Literature

Patent Literature 1: JP 2014-73549 A
Patent Literature 2: JP 2014-133273 A
Patent Literature 3: JP 2014-136300 A
Patent Literature 4: JP 7-276231 A
Patent Literature 5: JP 10-119031 A
Patent Literature 6: JP 4,390,363 B2
Patent Literature 7: JP 2003-117750 A

SUMMARY OF INVENTION

Technical Problems

The wire saw device disclosed in Patent Literature 1 is characterized by processing a large workpiece into a curved surface shape. Therefore, in order to prevent the left and right cutting rollers, on which the wire is suspended, from interfering with the workpiece, it is necessary to arrange the left and right cutting rollers at a certain distance or more. As a result, there is a problem that the device becomes large.

In the wire saw device disclosed in Patent Literature 2, since the robot arm can be controlled multi-axis and is rotatable, the robot arm can move freely. However, since a base end of the robot arm is attached to a base and the workpiece is held only by the opening and closing of the chuck attached to the tip end of the robot arm, the holding force of the workpiece lacks stability depending on the size and weight of the workpiece. For this reason, the workpiece may fall off from the chuck due to the load applied during a cutting process of the workpiece.

In the wire saw device disclosed in Patent Literature 3, considering that two robot arms are fixed on bases and that one of the robot arms needs to be moved in synchronization with a movement of the other robot arm due to the wire suspended from the wire heads, the movable range of the robot arms is limited. As a result, a place where the workpiece is placed is limited. In addition, it is difficult to synchronize the robot arms with each other, and thus there is a problem that control becomes complicated.

In the wire saw device disclosed in Patent Literature 4, since the cooling water scatters to surroundings and contaminates the surroundings, measures such as putting the wire saw device in an object having an enclosure such as a box must be taken to prevent scattering. In particular, there is no convenience in places where use of cooling water is restricted. Further, since the cutting waste is mixed with the cooling water, the mixed cooling water must be disposed of as industrial waste, resulting in a problem of cost.

For collecting information for deflection control of the wire, the wire saw device disclosed in Patent Literature 5 requires a plurality of mechanisms for detection of the tension of the wire, such as the dancer roller that applies a predetermined tension to the wire, the load cell that detects a load applied to the dancer roller, and the displacement detection device that measures the amount of displacement of the dance roller from the reference point. Furthermore, since it is a prerequisite to use a processing liquid containing abrasive grains, it is essential to partition the dancer roller, load cell, and displacement detection device with iron plates or the like so as not to be exposed to the processing fluid, and thus an inner structure of the device becomes complicated.

In the wire saw device disclosed in Patent Literature 6, although the detection of the tension of the wire is performed by a simple configuration, the adjustment of the tension of the wire is performed by a complicated configuration such that a pressing roller is provided and moved at the tip end of the operating element. Furthermore, since the load sensor for detecting the tension of the wire is arranged near the processing region, there is a possibility that the tension detecting function deteriorates in the case of using a processing liquid containing abrasive grains.

In addition, the wire saw device disclosed in Patent Literature 1 is characterized by processing a large workpiece into a curved surface shape. Therefore, in order to prevent the left and right cutting rollers, on which the wire is suspended, from interfering with the workpiece, it is necessary to arrange the left and right cutting rollers at a certain distance or more. In addition, when the size of the workpiece increases, in order to provide a deflection preventing mechanism, it is necessary to increase the distance between the cutting rollers and also to increase the length the guide bar supporting the deflection preventing roller. Therefore, a larger load is applied to the arm supporting the guide bar, and thus durability of the arm is indispensable.

In addition, a honeycomb-shaped member such as the workpiece disclosed in Patent Literature 1 is formed by assembling hexagonal tubular bodies in a honeycomb arrangement. However, in the honeycomb-shaped member, the tubular bodies have a space in a longitudinal direction, and thus the honeycomb-shaped member has air permeability in the longitudinal direction of the tubular bodies.

Here, in the case where the honeycomb-shaped member is to be processed, the honeycomb-shaped member is to be held. However, a side surface portion of the honeycomb-shaped member has a narrow holding area and cannot be sufficiently held when a load is applied by the processing device, which is a problem. In addition, in order to replace the workpiece with next workpiece after completing processing with the processing device, it is necessary that the honeycomb-shaped member is easily attached to and detached from a holding member.

Therefore, it is preferable to hold the honeycomb-shaped member in a plane direction, and suction fixation is suitable for easy attachment and detachment. However, since the honeycomb-shaped member has air permeability in a plane direction, the honeycomb-shaped member cannot be simply held by suction.

Also, the honeycomb core member has a problem that the strength is high along an axial direction of the cells, but is not so high in an orthogonal direction orthogonal to the axial direction, and there is a problem that the honeycomb core member is broken when being fixed by a clamp in the direction orthogonal to the direction of the cell axis.

Further, in the method disclosed in Patent Literature 7, since the wood screw is screwed into a cell and the cell is damaged, a use area of the honeycomb core member is narrowed, and there is a problem that the material cannot be effectively used. In addition, there is a problem that it is necessary to remove a plurality of wood screws from the cell in order to replace the workpiece with the next workpiece after completing processing by the processing device, and it takes time to replace the honeycomb core member.

Therefore, it is preferable to hold the honeycomb core member in the axial direction from the viewpoint of strength, and suction fixation is suitable for easy attachment and detachment. However, since the honeycomb core member has air permeability in the axial direction, there is a problem that the honeycomb core member cannot be simply held by suction. Even when the honeycomb core member is held by suction in the direction of cell axis, in the case where curved surface processing or the like is performed by the processing device, since a force in a rotational direction is also applied to the honeycomb core member, it is necessary to increase the suction holding force.

Therefore, an object of the present invention is to provide a wire saw device capable of securing a wide movable range of a robot arm when cutting a workpiece of the wire saw device, and capable of, within the movable range, performing a variety of cutting processing regardless of an orientation and direction of the workpiece, flexibly dealing with the type and size of the workpiece and the place of use of the device, and reduce the cost with a simple mechanism.

Another object of the present invention is to provide a wire saw device capable of, while achieving suppression of deflection of a wire with a simple structure, securing a wide movable range of a robot arm for cutting a workpiece without impairing the mobility of the device, and capable of, within the movable range, performing a variety of cutting processing regardless of the orientation and direction of the workpiece, and flexibly dealing with the type and size of the workpiece.

Another object of the present invention is to provide a processing method and a processing device for processing a workpiece having air permeability so as not to interfere with the processing device while holding the workpiece so as to withstand a load of the processing device in a processing method using the wire saw described above.

Solutions to Problems

A first aspect of the invention is a wire saw device including a robot arm freely movable by multi-axis control, a wire saw unit connected to the robot arm, a plurality of pulleys rotatably supported in the wire saw unit, a wire suspended between the pulleys, and a cutting processing region of a workpiece set between the pulleys, the wire saw device configured to cut the workpiece by causing the wire of the wire saw unit to travel and pressing the wire in the cutting processing region against the workpiece while moving the robot arm in a preset direction, wherein a tool changer is provided at a tip end of the robot arm, and the robot arm and the wire saw unit are configured to be attachable to and detachable from each other via the tool changer.

A second aspect of the invention is the wire saw device according to the first aspect, wherein the wire saw unit includes at least one nozzle that jets air, and the nozzle jets air onto the wire in the cutting processing region of the workpiece and a cut surface of the workpiece to remove cutting waste.

A third aspect of the invention is the wire saw device according to the first or second aspect, wherein at least one air suction nozzle is provided near the wire in the cutting processing region, and an air flow is generated around the wire in the cutting processing region by performing suction by the air suction nozzle.

A fourth aspect of the invention is the wire saw device according to the third aspect, wherein at least one air jetting nozzle is provided at a position opposing the air suction nozzle across the workpiece, and gas is jetted from the air jetting nozzle and sucked by the suction nozzle.

A fifth aspect of the invention is the wire saw device according to the fourth aspect, wherein the air suction nozzle and the air jetting nozzle are formed as a pair, the pair of nozzles is disposed on each side of a feeding side of the wire in the cutting processing region and a recovery side of the wire, and operation of the air jetting nozzle and the air suction nozzle is switched in accordance with a traveling direction of the wire such that gas is jetted from the air jetting nozzle on the feeding side and the gas is sucked by the air suction nozzle on the recovery side of the wire when the wire is traveling.

A sixth aspect of the invention is the wire saw device according to any one of the first to fifth aspects, wherein a fan is provided on a rotary shaft of at least one of the pulleys of the wire saw unit, and the fan is rotationally driven in accordance with rotation of the pulleys.

A seventh aspect of the invention is the wire saw device according to any one of the first to sixth aspects, wherein a rotary shaft is provided in the wire saw unit, and cutting processing of the workpiece is progressed while swinging the wire saw unit at a predetermined angle about the rotary shaft.

An eighth aspect of the invention is the wire saw device according to any one of the first to sixth aspects, wherein cutting processing of the workpiece is progressed while swinging the robot arm.

A ninth aspect of the invention is the wire saw device according to any one of the first to eighth aspects, including a pair of guide pulleys that form a cutting region for the workpiece at a tip end of the wire saw unit and the wire is suspended therebetween, a load cell provided on a rotary shaft of at least one of the guide pulleys, and a control device that measures a load applied to the wire by the load cell and controls deflection of the wire.

A tenth aspect of the invention is the wire saw device according to the ninth aspect, wherein the control device adjusts, based on a result of the measurement, a speed at which the wire is pressed against the workpiece.

An eleventh aspect of the invention is the wire saw device according to the ninth aspect, wherein the control device adjusts, based on a result of the measurement, a traveling speed of the wire with respect to the workpiece.

A twelfth aspect of the invention is a method of processing a workpiece in which the workpiece is held on a table and the workpiece that is held is processed by a processing device, wherein the table is provided with a plurality of suction holes in a holding surface for the workpiece, the workpiece is sucked and held on the holding surface of the table by generating a suction force by placing the workpiece having air permeability on the table and covering an upper portion of the workpiece at a position opposing the suction holes of the table with an air-impermeable member, and the workpiece is processed by a processing unit.

A thirteenth aspect of the invention is the method of processing a workpiece according to the twelfth aspect, wherein the processing unit is a wire saw or a band saw, and the wire saw or the band saw is detachably mounted on a robot arm that is freely movable.

A fourteenth aspect of the invention is the method of processing a workpiece according to the twelfth or thirteenth aspect, wherein the holding surface of the table is provided on a table front surface and a table side surface, the air-impermeable member is formed in such a size as to cover a side surface portion of the workpiece and the table side surface, a part of the air-impermeable member protruding from a side surface of the workpiece is sucked and held on the table side surface, and the workpiece is processed by the processing device.

A fifteenth aspect of the invention is the method of processing a workpiece according to the twelfth or thirteenth aspect, wherein the table is separately formed as a plurality of suction regions, each of the suction regions is independently connected to a suction line, and the suction regions are each independently subjected to suction control.

A sixteenth aspect of the invention is the method of processing a workpiece according to the twelfth or thirteenth aspect, wherein the table is separately formed as a plurality of tables that are capable of being individually separated and moving in a horizontal direction, and processing is performed such that the processing device passes through gaps between the tables that are individually separated when processing the workpiece.

A seventeenth aspect of the invention is the method of processing a workpiece according to the twelfth or thirteenth aspect, wherein the table is formed to be capable of moving horizontally and rotating, and the workpiece is processed into an arbitrary shape by horizontally moving and/or rotating the table when processing the workpiece.

An eighteenth aspect of the invention is the method of processing a workpiece according to the twelfth or thirteenth aspect, wherein the table is separately formed as a plurality of tables and configured to be vertically movable, and when processing the workpiece, the workpiece is processed such that each table does not interfere with the processing device by vertically and independently moving each of the tables separately formed.

A nineteenth aspect of the invention is the method of processing a workpiece according to any one of the twelfth to eighteenth aspects, wherein the processing unit is configured to swing arcuately along a processing progress direction of the workpiece.

A twentieth aspect of the invention is a processing device of a workpiece, the processing device including a table that is provided with a plurality of suction portions in a holding surface and holds the workpiece, and a processing unit that processes the workpiece held on the table, wherein the workpiece has air permeability with respect to the holding surface, the processing unit includes a freely movable robot arm and a tool changer provided at a tip end of the robot arm, the table is configured to suck and hold the workpiece by generating a suction force on the holding surface of the table by placing the workpiece on the holding surface and covering an upper portion of the workpiece at a position opposing suction holes in the table with an air-impermeable member, and the workpiece is processed in a state in which the workpiece is held on the table.

A twenty-first aspect of the invention is the processing device of a workpiece according to the twentieth aspect, wherein the processing unit is a wire saw or a band saw, and the wire saw or the band saw is detachably mounted on the freely movable robot arm via the tool changer.

A twenty-second aspect of the invention is the processing device of a workpiece according to the twentieth or twenty-first aspect, wherein the table is separately formed as a plurality of tables and configured to be capable of freely moving in a horizontal direction separately and independently.

A twenty-third aspect of the invention is the processing device of a workpiece according to the twentieth or twenty-first aspect, wherein the table is formed to be capable of moving horizontally and rotating, and is configured to move horizontally and/or rotate when processing the workpiece.

A twenty-fourth aspect of the invention is the processing device of a workpiece according to the twentieth or twenty-first aspect, wherein the table is separately formed as a plurality of tables and configured to be vertically movable, and each of the separately formed tables is configured to move vertically and independently when holding and processing the workpiece.

A twenty-fifth aspect of the invention is the processing device of a workpiece according to any one of the twentieth to twenty-fourth aspects, wherein the processing unit is configured to swing arcuately along a processing progress direction of the workpiece.

A twenty-sixth aspect of the invention is a processing device of a workpiece that processes the workpiece by a processing unit in a state in which the workpiece is held on a table, wherein the table includes an inner table having a placement surface for the workpiece and a plurality of suction holes provided in the placement surface, an outer casing that is provided so as to surround an outer side of the inner table and forms a suction chamber by fitting with the inner table, and a plurality of ascending/descending pins capable of projecting and retracting provided in the outer casing and inserted in the suction holes of the inner table, the inner table is provided to be relatively and vertically movable with respect to the outer casing, and configured to be positioned at a raised position when placing the workpiece and descend to a lowered position when negative pressure acts in the suction chamber, and the ascending/descending pins are urged toward the placement surface by elastic members, and are configured to be positioned in the suction holes of the inner table when the inner table is at the raised position and project from the placement surface of the inner table when the inner table is at the lowered position.

A twenty-seventh aspect of the invention is the processing device of a workpiece according to the twenty-sixth aspect, wherein the processing unit is a wire saw provided at a tip end of a freely movable robot arm.

A twenty-eighth aspect of the invention is the processing device of a workpiece according to the twenty-sixth or twenty-seventh aspect, wherein a plurality of openings are defined on at least one surface of the workpiece, and at least one of the ascending/descending pins is inserted in an opening of the workpiece and the workpiece is fixed to the table by suction and the ascending/descending pin by placing the workpiece on the inner table, generating a suction force on the placement surface of the inner table to suck and hold the workpiece, thus causing the inner table to descend to the lowered position, and causing the ascending/descending pins to project.

A twenty-ninth aspect of the invention is the processing device of a workpiece according to any one of the twenty-sixth to twenty-eighth aspects, wherein the workpiece is a honeycomb core member formed by assembling tubular cells, and a suction force is generated on the placement surface of the table by placing an air-impermeable member over the honeycomb core member.

A thirtieth aspect of the invention is the processing device of a workpiece according to any one of the twenty-sixth to twenty-ninth aspects, wherein the ascending/descending pins are urged toward the placement surface by the elastic members, and only the ascending/descending pins corresponding to an opening portion of the workpiece project from the placement surface of the table.

A thirty-first aspect of the invention is a method of processing a workpiece in which the workpiece is held on a table and is processed in a state in which the workpiece is fixed to the table, wherein the table is formed of an inner table provided with a plurality of suction holes in a placement surface for the workpiece and an outer casing that is provided to surround an outer side of the inner table and forms a suction chamber by fitting with the inner table, a plurality of ascending/descending pins capable of projecting and retracting are inserted in the suction holes of the inner table, and the ascending/descending pins at positions not interfering with a suction surface of the workpiece is capable of projecting from the placement surface by placing the workpiece on the placement surface of the inner table, setting the suction chamber to negative pressure, and causing the table to descend to a lowered position.

A thirty-second aspect of the invention is the method of processing a workpiece according to the thirty-first aspect, wherein the processing is performed by a wire saw provided at a tip end of a freely movable robot arm.

Advantageous Effects of Invention

In the wire saw device according to the present invention, a robot arm and a wire saw unit are connected via a tool changer having a rotatable motion function. In addition, since the robot arm is an integral robot arm, it is easy to replace the robot arm in accordance with the shape and size of the workpiece, and a large installation space for the device is not required.

In terms of convenience, the wire saw unit provided at the tip end of the robot arm is detachable since the wire saw unit is provided via the tool changer connecting the robot arm and the wire saw unit. Since the wire saw unit is removed from the main body of the robot arm when replacing the wire and the pulleys, a worker can easily carry out fine work at a distance closer to the worker. Therefore, excellent maintainability is achieved. Also, depending on the type and size of the workpiece, the wire saw unit and the wire can be easily selectively replaced.

Since the wire saw unit can move freely by an operation of the robot arm, various processing modes such as not only cutting the workpiece into a flat plane shape but also cutting the workpiece into a curved surface shape by pressing the wire suspended on the wire saw unit against the workpiece.

In terms of cost, as a result of adopting a method (dry method) of removing cutting waste by air blown out from a nozzle, it is not necessary to use a cleaning liquid discharged towards a processing part for a cleaning purpose, and thus the cost can be reduced. Besides, there is no need to discard the cleaning liquid contaminated with the cutting waste, and it also has an advantage for the environment.

Furthermore, by the jetting and suction function of air, the removal of processing waste of the workpiece and a dust collection effect can be achieved, rise in the frictional heat of the wire can be alleviated without using the cooling water, and decrease in the cutting processing accuracy can be suppressed. In other words, by adopting a dry method as the method of removing the cutting waste, the cost can be reduced since cooling water or the like discharged toward the processing part for cleaning purposes is not used, and the cooling water does not need to be discarded, which is environmentally friendly. Further, it is possible to cut even a material having poor compatibility with the processing liquid.

Particularly, when a fan is rotationally driven together with the rotation of pulleys, an air flow is generated around the traveling wire, and thus improvement of the above effect is achieved. In addition, by providing fans on rotary shafts of the pulleys, the fans can be rotated with a drive source that causes the wire to travel without providing another drive source.

Depending on the type of the workpiece, it is sometimes difficult to cut the workpiece by merely pressing the traveling wire against the surface of the workpiece. In such a case, the cutting process can be more easily performed by swinging the robot arm or the wire saw unit. Generally, as the contact length of the workpiece increases in accordance with the size of the workpiece, the load on the wire increases and the processing accuracy decreases. However, by bringing the contact of the wire closer to point contact, pressure is focused on the processing point, the load of the wire is reduced, and the lowering of the processing accuracy is suppressed. Also, due to the motion of the swinging wire saw, cutting waste is hardly accumulated.

In terms of processing accuracy, by providing a load cell in the vicinity of the cutting processing region, it is possible to more accurately grasp the deflection state of the wire. In curved surface processing, since the load applied to the wire is not in one direction, if the wire is deflected excessively, the wire will derail from the pulleys and processing with high accuracy cannot be performed in a state where the wire is deflected. According to the present device, the deflection of the wire is reduced and suppressed, and thus these problems can be solved.

Further, according to the processing method and the processing device of the workpiece of the present invention, even if the workpiece is a member having air permeability, since at least the upper surface is covered with the air-impermeable member, it is possible to suck and hold the workpiece so that the workpiece can be efficiently processed. Also, since fixing is not performed by adhesion, the workpiece after processing can be easily detached.

According to the present invention, since the processing device is a wire saw or band saw which is attachable to and detachable from a robot arm, the workpiece can be processed into an arbitrary shape such as a curved line or a straight line by movement of the robot arm.

Further, according to the present invention, since suction lines of a table can be separately and independently controlled, workpieces of various shapes can be freely held and processed.

Further, according to the present invention, since tables are formed separately and independently so as to be freely capable of horizontal movement and/or ascending/descending, the workpiece can be efficiently processed into an arbitrary shape by moving respective tables so as not to interfere with the processing device.

Further, according to the present invention, the table is formed so as to be horizontally movable and rotatable and is configured to horizontally move and/or rotate when processing the workpiece, and thus the workpiece can be processed into an arbitrary shape by moving and rotating the table even when the processing device side is fixed. Further, even if it is difficult to move the processing device, the workpiece can be processed into an arbitrary shape.

Further, according to the present invention, since the processing unit is configured to swing arcuately along a processing progress direction of the workpiece, a cutting load at the time of processing is reduced, and thus effects are obtained that processing speed is improved, and processing accuracy is improved due to reduction of shaking of the wire caused by application of an excessive load. In addition, it becomes easier to discharge processing waste, and thus the processing speed can be improved and the processing accuracy can be improved.

Further, according to the present invention, since it is possible to firmly fix the workpiece by fixing by suction of the workpiece and fixing by ascending/descending pins, and furthermore, the workpiece can be fixed by a plurality of ascending/descending pins such that the workpiece can withstand a force in a rotational direction from curved surface processing or the like, processing with high accuracy can be performed. Further, since both of suction fixing and fixing by the ascending/descending pins can be released by only releasing the suction after the processing is completed, time for replacement can be shortened and efficient processing can be performed. In addition, even an air-permeable workpiece can be strongly sucked and fixed.

In addition, since the ascending/descending pins are configured not to project from a placement surface of the table in the case of receiving resistance, tips of the ascending/descending pins do not come into contact with the workpiece to damage the workpiece.

BRIEF DESCRIPTION OF DRAWINGS

FIG. 17 is an explanatory diagram of a deflection control method according to the third embodiment of the present invention.

DESCRIPTION OF EMBODIMENTS

Hereinafter, embodiments of the present invention will be described with reference to drawings, but the present invention is not limited to the following embodiments.

Figure 1:
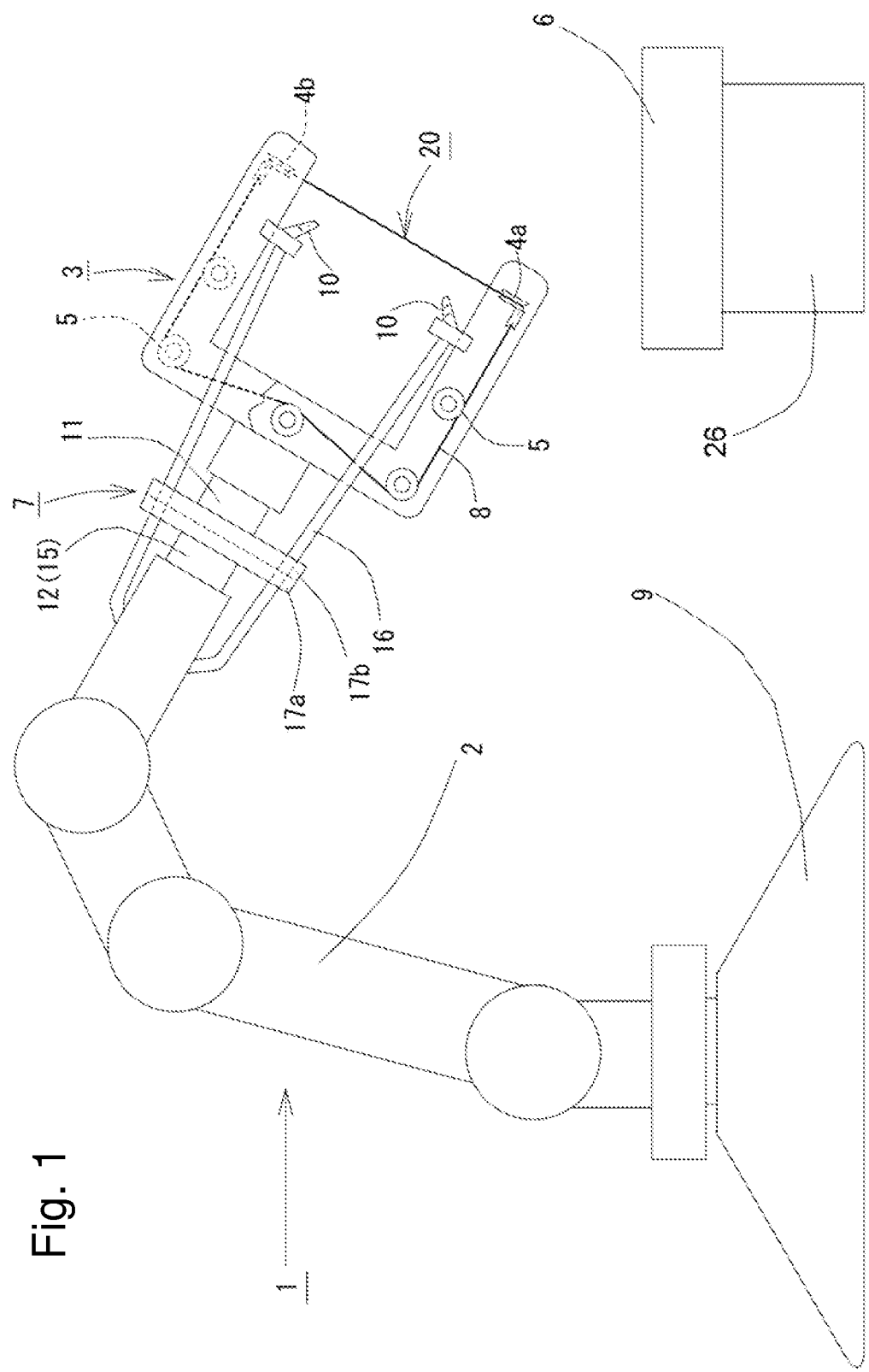
FIG. 1 is a partially broken overall view of a wire saw device according to a first embodiment of the present invention.

FIGS. 1 to 6 show a first embodiment of a wire saw device of the present invention, and FIG. 1 is a partially broken overall view of this wire saw device 1.

The wire saw device 1 includes a wire saw unit 3 detachably connected thereto via a tool changer 7 connected to a tip end portion of a robot arm 2.

The wire saw unit 3 shown in FIGS. 2, 3, 4, and 5 is detachably attached to the robot arm 2 by engagement between a male portion 18 of the tool changer 7 (shown in FIG. 6) on the robot arm 2 side and a female portion 19 of the tool changer 7 on the wire saw unit 3 side via appropriate means such as a plunger (not shown). By operating an internal motor (not shown) of the robot arm 2, a rotary shaft 15 is driven and rotation of a rotatable body 12 is appropriately controlled by a drive control device (not shown), whereby the tool changer 7 can rotate. In accordance with movement of the rotatable body 12, the wire saw unit 3 can also rotate by 360 degrees via the tool changer 7. However, actually, in the case of cutting processing, a rotation angle is controlled by the drive control device. The inside of the wire saw unit 3 is provided with two guide pulleys 4a and 4b, a plurality of rotary pulleys 5, and a drive source (not shown) that rotates the rotary pulleys 5. Here, at least one of the plurality of rotary pulleys 5 is a tension pulley for adjusting tension. Further, a wire 8 passes over V grooves of the guide pulleys 4a and 4b provided at a tip end portion of the wire saw unit 3, and thus a cutting processing region 20 is formed between the guide pulleys 4a and 4b. The entire wire saw unit 3 can also be covered with a covering of a member (for example, carbon fiber) that is lightweight and excellent in durability.

The wire 8 wound around the rotary pulleys 5 inside the wire saw unit 3 is formed in an endless shape. It is preferable to use a fixed abrasive type wire in which abrasive grains such as diamond are fixed to a surface of the wire by electrodeposition, resin, or the like.

Further, instead of forming the wire 8 in an endless loop shape, a configuration may be adopted in which a supply reel and a recovery reel for the wire are provided inside the wire saw unit 3, both ends of the wire are wound around the respective reels, the wire fed from the reel on the supply side is wound up by the recovery reel on the recovery side, and, meanwhile, the wire 8 is fed and wound up by reversing the supply side and the recovery side when a traveling direction of the wire 8 is switched.

A base end of the robot arm 2 is attached to a base 9. The robot arm 2 is an articulated multi-axis controllable robot arm, and is capable of freely ascending, descending, rotating, and moving. The robot arm 2 is moved by an internal motor (not shown) of the robot arm 2 with the base 9 serving as a fulcrum, and a movement path of the robot arm 2 is controlled by a drive control device (not shown). Due to the controlled movement of the robot arm 2, the wire 8 is pressed in not a thrust direction but a radial direction of the V grooves of the guide pulleys 4a and 4b, and thus a workpiece 6 is cut.

Figure 6:
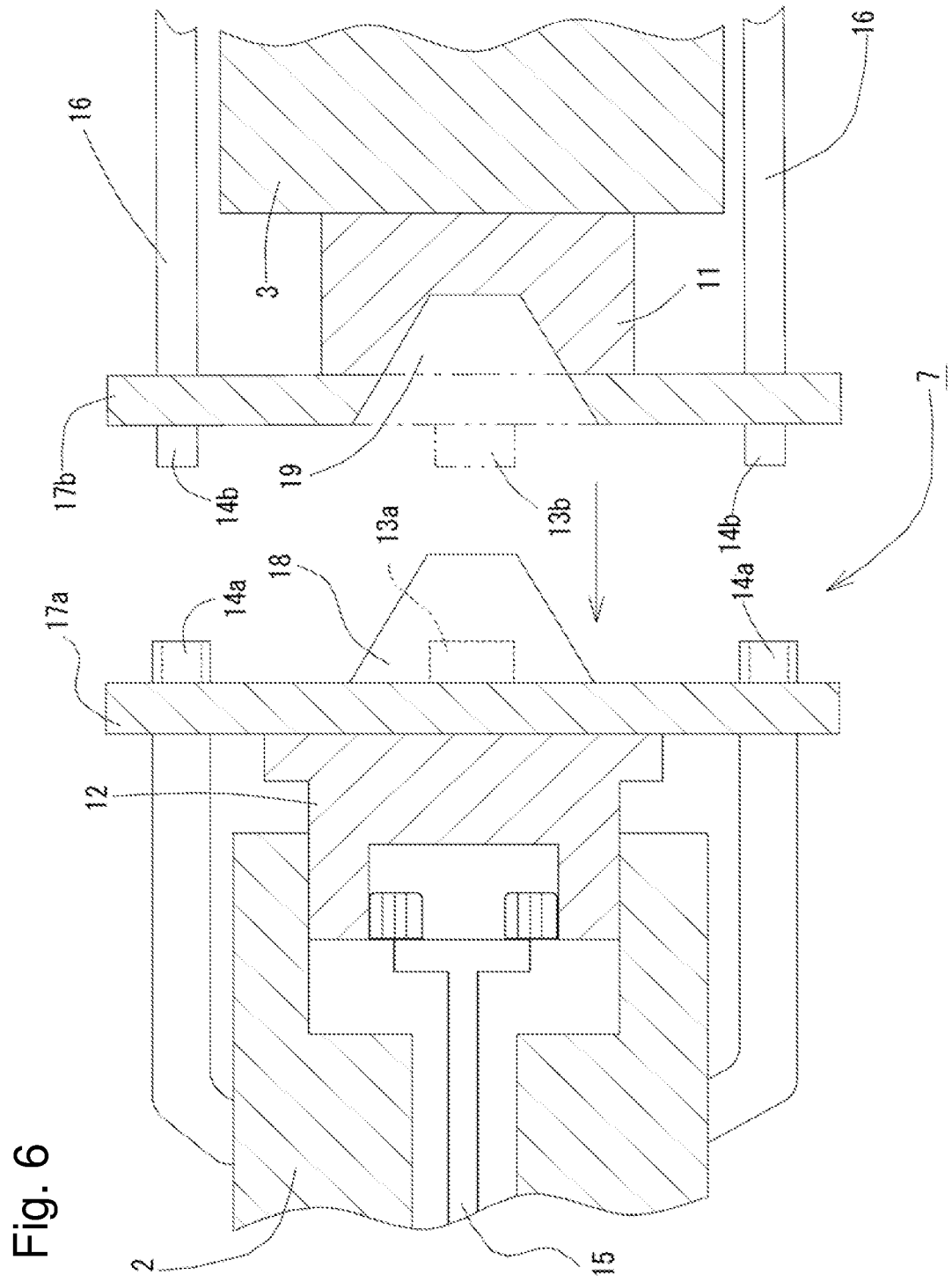
FIG. 6 is an enlarged sectional view of a tool changer according to the first embodiment of the present invention.

FIG. 6 shows one embodiment of attachment and detachment of the robot arm 2 and the wire saw unit 3. A substrate 17a of the tool changer 7 is mounted on the rotatable body 12 that is rotatable and disposed on the robot arm 2 side. Meanwhile, a substrate 17b of the tool changer 7 is mounted on a connection bracket 11 disposed on the wire saw unit 3 side. The substrate 17a includes the male portion 18 and the substrate 17b includes the female portion 19, and when the substrate 17a and the substrate 17b are brought into contact with each other, the male portion 18 is engaged with the female portion 19. As a result, the robot arm 2 and the wire saw unit 3 can be attached and detached. A connecting portion of the tool changer 7 on the wire saw unit 3 side is formed in the connection bracket 11. That is, connection of the tool changer 7 is performed in the connection bracket 11, and the robot arm 2 and the wire saw unit 3 are brought into contact and engaged with each other. Therefore, even if the wire saw unit 3 rotatably moves, a load applied to the connecting portion of the tool changer 7 becomes small.

In addition, the substrates 17a and 17b of the tool changer 7 are provided with a plurality of connectors facing each other. Among these, connectors 13a and 13b are connectors for supplying power to the wire saw unit 3, and connectors 14a and 14b are connectors for supplying air to nozzles. Simultaneously with the engagement of the male portion 18 and the female portion 19, the opposing connectors 14a and 14b are engaged with each other.

Nozzles 10 are disposed on an upper surface of a main body of the wire saw unit 3, and blow air onto a cut surface of the workpiece to blow off and remove cutting waste. In order to prevent deviation of a range where air is discharged, it is desirable to provide a pair of nozzles substantially symmetrically with a center line of the wire saw unit 3 therebetween. As a preferable disposing position of the nozzles 10, it is desirable that air discharge ports of the nozzles 10 do not project further than the wire 8 suspended in the cutting processing region 20 of the wire saw unit 3 such that the nozzles 10 do not come into contact with the workpiece when cutting the workpiece, and that the nozzles 10 are provided within a range in which the air sufficiently reaches the cut surface of the workpiece, that is, in the vicinity of the tip end of the wire saw unit 3. Further, supply of air to the nozzles 10 is performed by an air supply source (not shown) inside the robot arm 2 discharging air. The air discharged from the air supply source passes through an air supply hose 16 in the robot arm 2, and reaches the nozzles 10 through the air supply hose 16 disposed on the upper part of the main body of the wire saw unit 3 connected to the connector via air supply connectors 14a and 14b of the tool changer 7. In this case, a suitable cooling mechanism may be provided in the wire saw device 1 and air for cooling the cut surface of the workpiece may be discharged. Further, a function to separately collect dust of cutting waste may be additionally provided. For example, a suction source (not shown) is disposed in the wire saw device 1 so that one of the nozzles 10 can suck in the cutting waste, or a suction blower device is combined with the wire saw device 1 separately from the nozzles 10. By doing so, it becomes possible to suppress scattering of cutting waste to the surroundings and to reduce contamination.

With the series of configurations described above, the wire saw device 1 of the present invention can flexibly deal with various processing modes. The wire saw unit 3 is moved to a position of the workpiece 6 held by appropriate means by an operation of the robot arm 2 in a predetermined direction. The wire 8 suspended in the wire saw unit 3 circularly travels in accordance with rotation of the rotary pulleys 5. According to the movement of the robot arm 2, in the example shown in FIG. 4, the cutting processing region 20 of the wire 8 is pressed against the workpiece 6, and in the example shown in FIG. 5, the cutting processing region 20 of the wire 8 is pressed against the workpiece 6, the rotatable wire saw unit 3 is appropriately cut while adjusting a swing angle, and thus the workpiece 6 is cut into a desired shape while removing the cutting waste with air discharged from the nozzles 10.

In the wire saw device 1 of the present invention, the articulated robot arm 2 capable of freely ascending, descending, rotating and moving can freely move, and in conjunction with movement of the rotatable wire saw unit 3, the workpiece can be cut into not only a planar shape but also a curved surface shape. Besides such flexible cutting processing performance, the wire saw device 1 is also excellent in an aspect of cooperativeness with external devices. Support can be received from an external device in the movable range regardless of direction and orientation thereof as long as the external device is in the movable range of the robot arm 2. Therefore, it is unnecessary to add an extra mechanism to the present device, and thus mobility thereof is not degraded. For example, a device capable of detecting a wire diameter of the wire 8 at a high speed is installed within the movable range of the robot arm 2. If the wire 8 is periodically moved to the device by the movement of the robot arm 2, even if the wire saw device 1 itself of the present invention does not include a mechanism for detecting wear of the wire 8, wire replacement can be performed spontaneously before the wire 8 is disconnected by the wear in accordance with detection data of the external device.

Further, by not providing an extra mechanism to the wire saw device 1 of the present invention, the main body of the device is simplified, increase in size is prevented, and an extra space for the installing place becomes unnecessary. For example, two of the present devices are arranged side by side and operated simultaneously, and a dimension detection device of the wire 8 is installed between the two devices. By doing so, it is also possible for two of the present devices to share the one detection device, which increases operation efficiency in a limited installation space.

Figure 7:
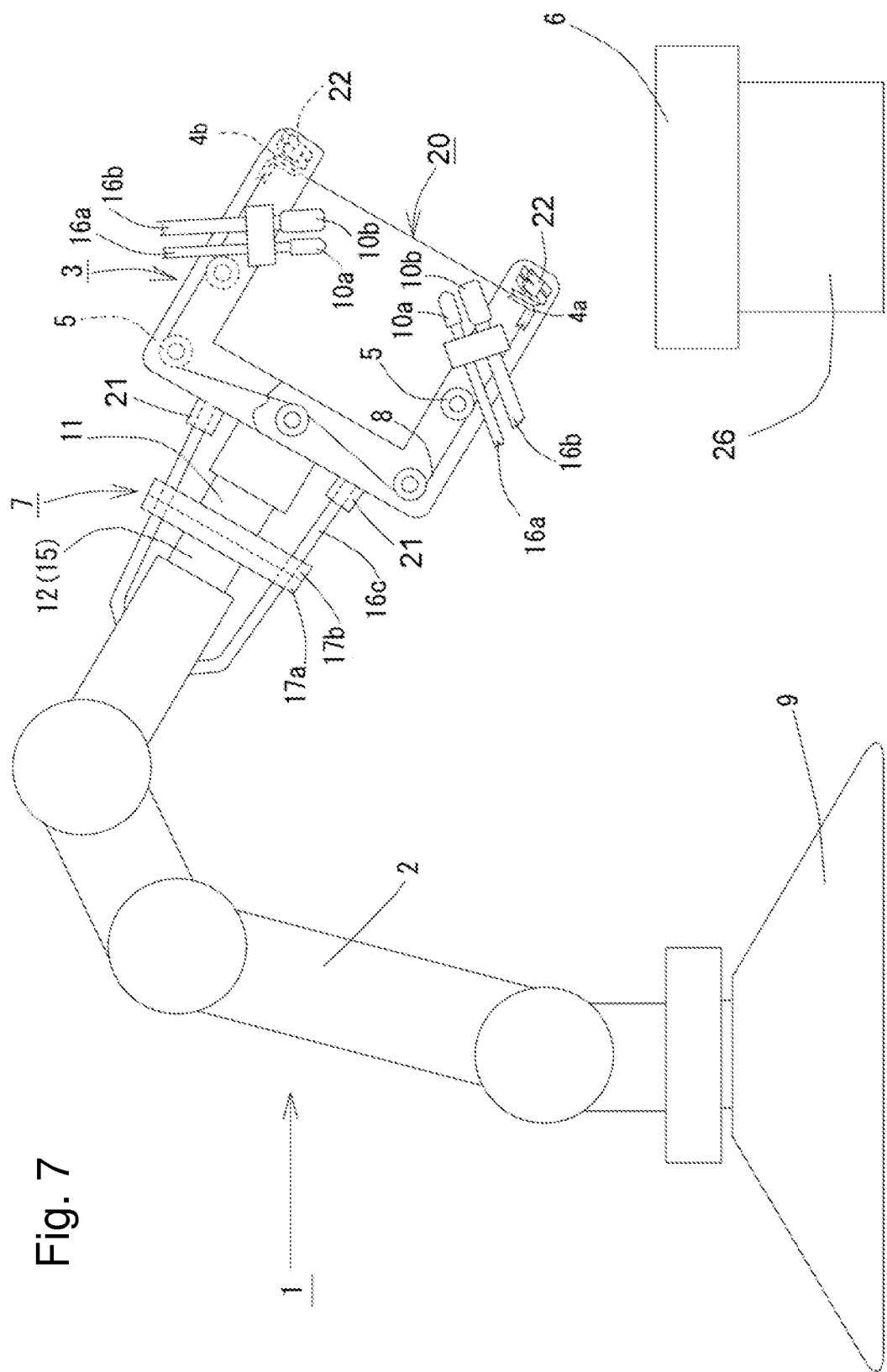
FIG. 7 is a partially broken overall view of a wire saw device according to a second embodiment of the present invention.

Next, a second embodiment of the wire saw device shown in FIGS. 7 to 11 will be described. FIG. 7 is a partially broken overall view of the wire saw device 1 of this embodiment.

The main configurations of the robot arm 2 and the tool changer 7 of this embodiment are the same as those of the first embodiment, and therefore detailed description thereof will be omitted. Also in the wire saw unit 3, parts that perform the same actions as those of the first embodiment are denoted by the same reference signs, and description thereof will be omitted.

Figure 8:
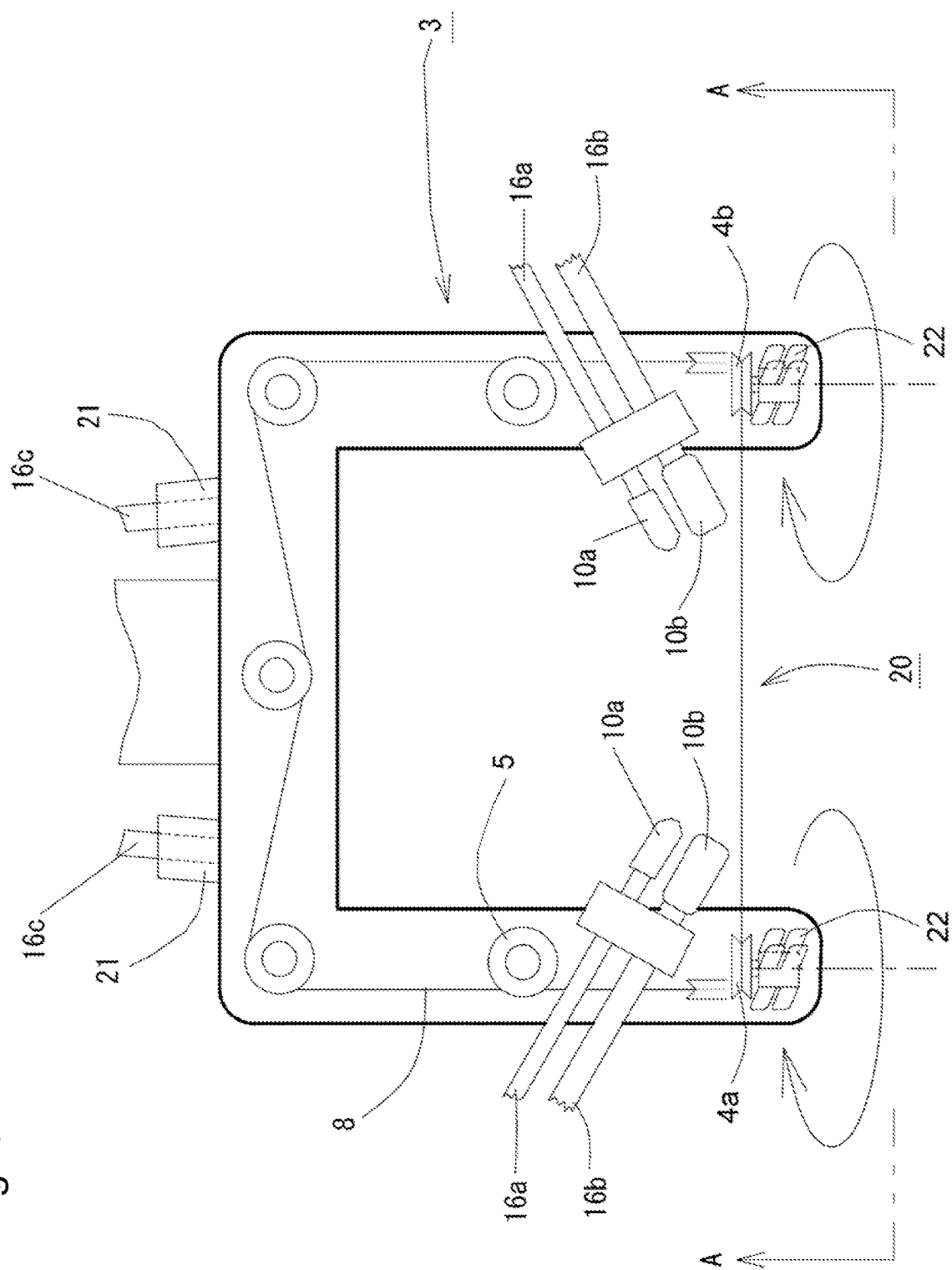
FIG. 8 is an enlarged plan view of the wire saw unit according to the second embodiment of the present invention.
Figure 9:
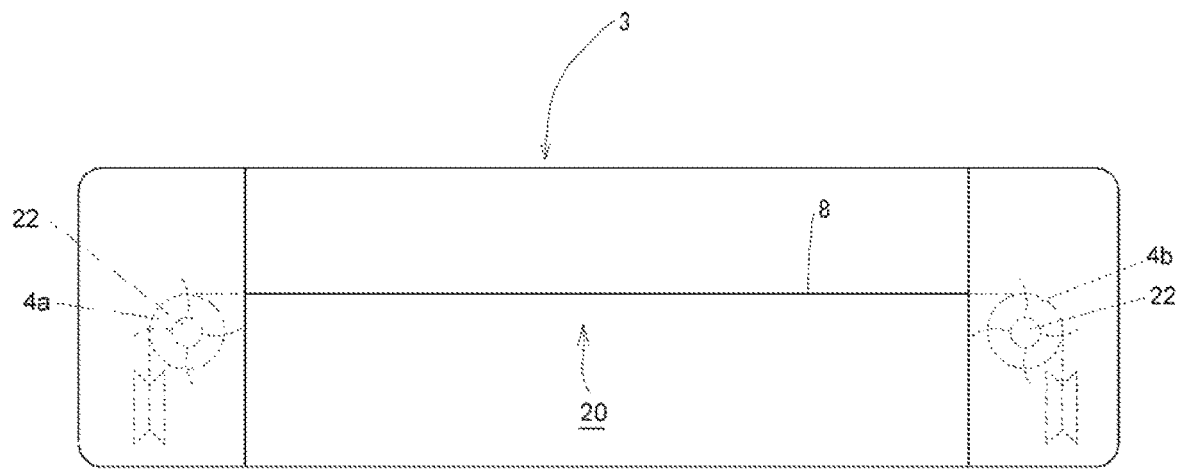
FIG. 9 is an enlarged front view of the second embodiment according to the present invention taken along an A-A direction in FIG. 8.

As shown in FIG. 8, air jetting nozzles 10a and air suction nozzles 10b at both ends of the wire saw unit 3 are provided as pairs adjacent to each other. The air jetting nozzles 10a blow air onto the cut surface of the workpiece to blow off and remove cutting waste. The air suction nozzles 10b suck air to collect the cutting waste. In order to prevent deviation of the range where air is jetted or sucked, for the both nozzles, it is desirable to provide pairs of nozzles substantially symmetrically with a center line of the wire saw unit 3 therebetween. As a preferable arrangement of the nozzles, a configuration is adopted in which air jetting ports and air suction ports of the nozzles are oriented toward the cut surface of the workpiece and the wire 8 of the cutting processing region 20 at a position that does not interfere with cutting of the workpiece in the tip end of the wire saw unit 3.

It is preferable that the entire wire saw unit 3 is covered with a covering of a member (for example, carbon fiber) that is lightweight and excellent in durability. Then, interior of the wire saw unit 3 is pressurized so as to prevent entering of cutting waste. For example, the air discharged from the air supply source (not shown) in the robot arm 2 passes through pressurizing hoses 16c in the robot arm 2, and is supplied to the inside of the wire saw unit 3 through the pressurizing hoses 16c disposed on the upper part of the main body wire saw unit 3 connected to the connector via the air supply connectors 14a and 14b of the tool changer 7, and thus pressurization of the inside of the wire saw unit 3 is achieved. Connection between the wire saw unit 3 and the pressurizing hoses 16c is performed via nipples 21 provided in the wire saw unit 3. There is an entrance/exit of the wire 8 as a relief port for air from the pressurized state of the wire saw unit 3, but it is also possible to provide a relief port for air by appropriately attaching a filter to a part of a cover of the wire saw unit 3.

In this second embodiment, as an example, a mode in which fans 22 are attached to tip ends of rotary shafts of the guide pulleys 4a and 4b extending toward the tip end portion that are disposed at the tip end of the wire saw unit 3 is illustrated. When the wire 8 travels, the guide pulleys 4a and 4b rotate, and the fans 22 also turn together. As a result, an air flow is generated around the wire 8 and plays an auxiliary role in removal of cutting waste, dust collection effect, and cooling effect. In particular, if the purpose is to alleviate the rise in frictional heat of the wire 8 with respect to the workpiece, it is preferable that the fans 22 are arranged as described above. The shape of the fans 22 is not particularly limited as long as the rotation of the guide pulleys 4*a* and 4*b* between which the wire 8 is suspended is not hindered and the air flow can be generated.

Regarding the supply of air to the air jetting nozzles 10*a*, air is discharged from an air supply source (not shown) disposed in the vicinity of the wire saw device 1, and reaches the air jetting nozzle 10*a* via air supply hoses 16*a*. The air suction function to the air suction nozzles 10*b* is achieved via air suction hoses 16*b* from an air suction source (not shown) also installed externally. In this respect, a compressor may be used as the air supply source, and a ring blower may be used as the air suction source. In addition, it is possible to use air supply and suction sources by adjusting the amount of air by opening/closing a damper using only a ring blower. The supply and suction sources of air and are controlled by an external control device.

Figure 11A:
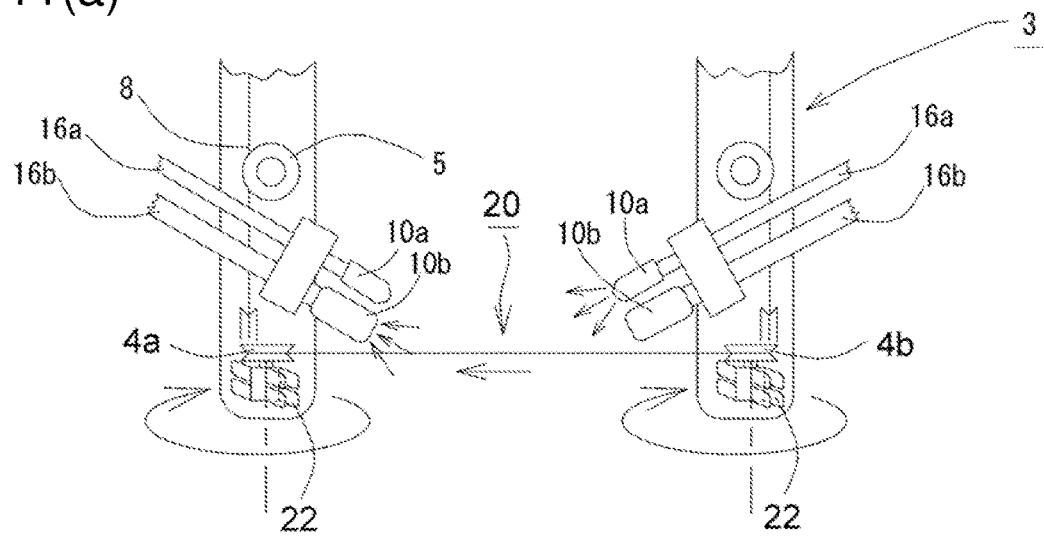
FIGS. 11(a) and 11(b) are operation diagrams of jetting and suction of air according to a traveling direction of a wire according to the second embodiment of the present invention.
Figure 11B:
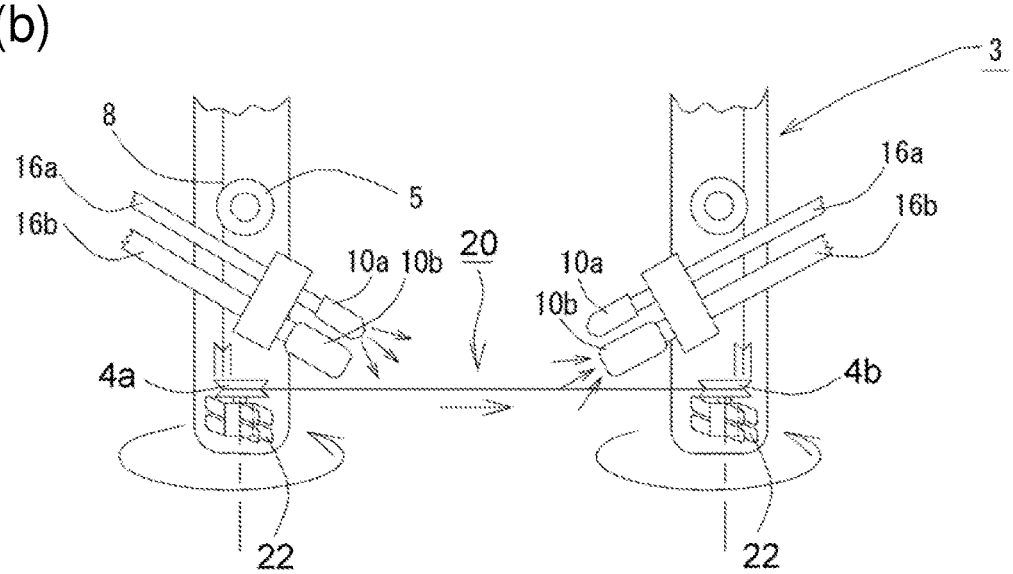

FIGS. 11(*a*) and 11(*b*) show a mode in which, when the wire 8 travels, an air jetting nozzle 10*a* is operated among the nozzles provided on the feeding side of the wire 8, and at the same time, an air suction nozzle 10*b* is operated among the nozzles provided on the recovery side of the wire. Switching of air jetting and suction directions according to the traveling direction of the wire is also performed by the control device described above. By these jetting and suction of air, a flow of air occurs around the traveling wire 8, and a cooling effect is also generated. Furthermore, the fans 22 provided at the tip ends of the rotary shafts of the guide pulleys 4*a* and 4*b* extending toward the tip end portion that are disposed at the tip end of the wire saw unit 3 plays an auxiliary role for the effect described above. With the series of configurations described above, the wire saw device 1 of the present invention can flexibly deal with various processing modes.

Figure 12:
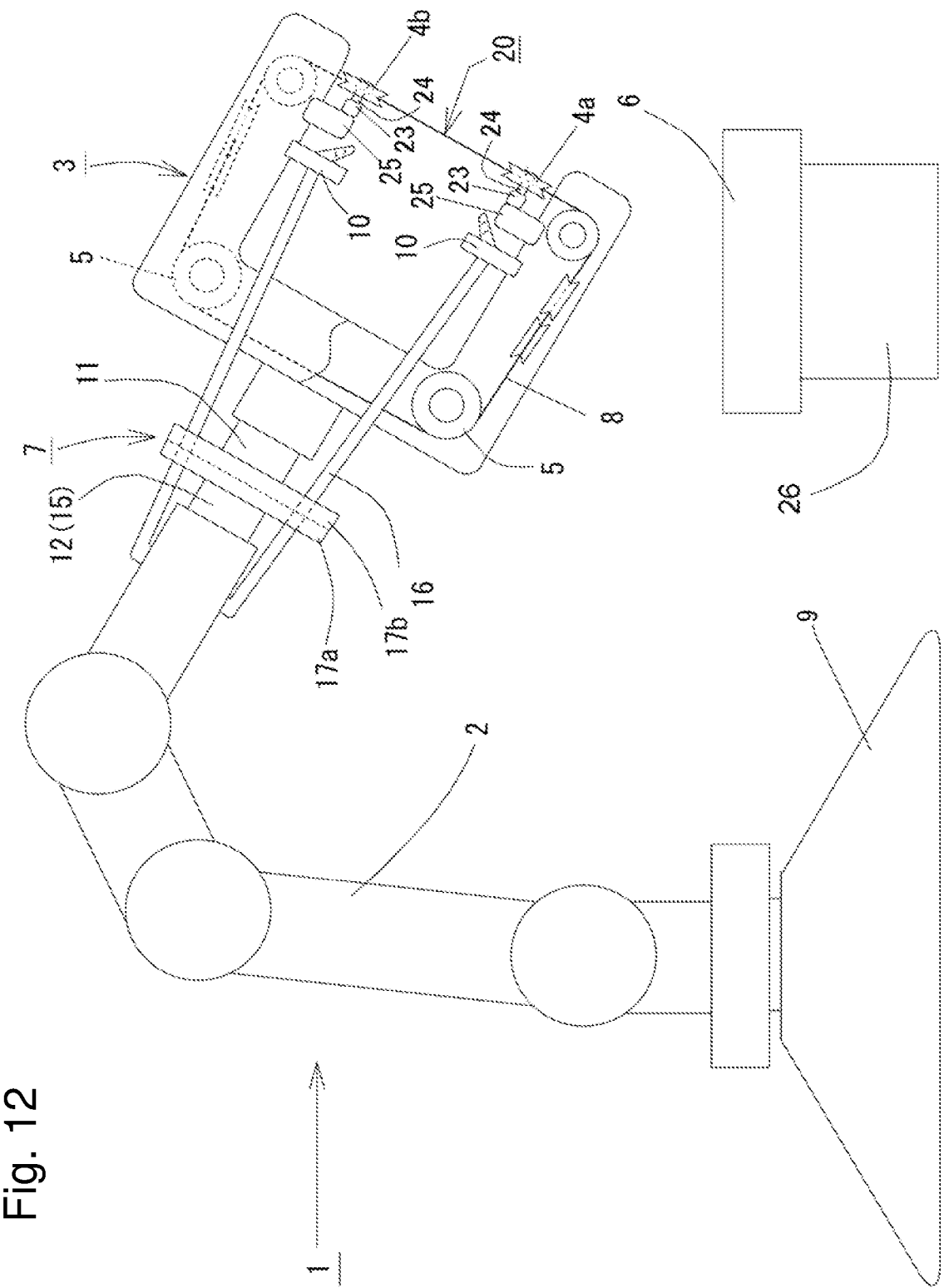
FIG. 12 is a partially broken overall view of a wire saw device according to a third embodiment of the present invention.

Next, a third embodiment of the wire saw device shown in FIGS. 12 to 17 will be described. FIG. 12 is a partially broken overall view of the wire saw device 1 of this embodiment.

The main configurations of the robot arm 2 and the tool changer 7 of this third embodiment are the same as those of the first embodiment and the second embodiment, and therefore detailed description thereof will be omitted. Also in the wire saw unit 3, parts that perform the same actions as those of the first embodiment and the second embodiment are denoted by the same reference signs, and description thereof will be omitted.

Figure 2:
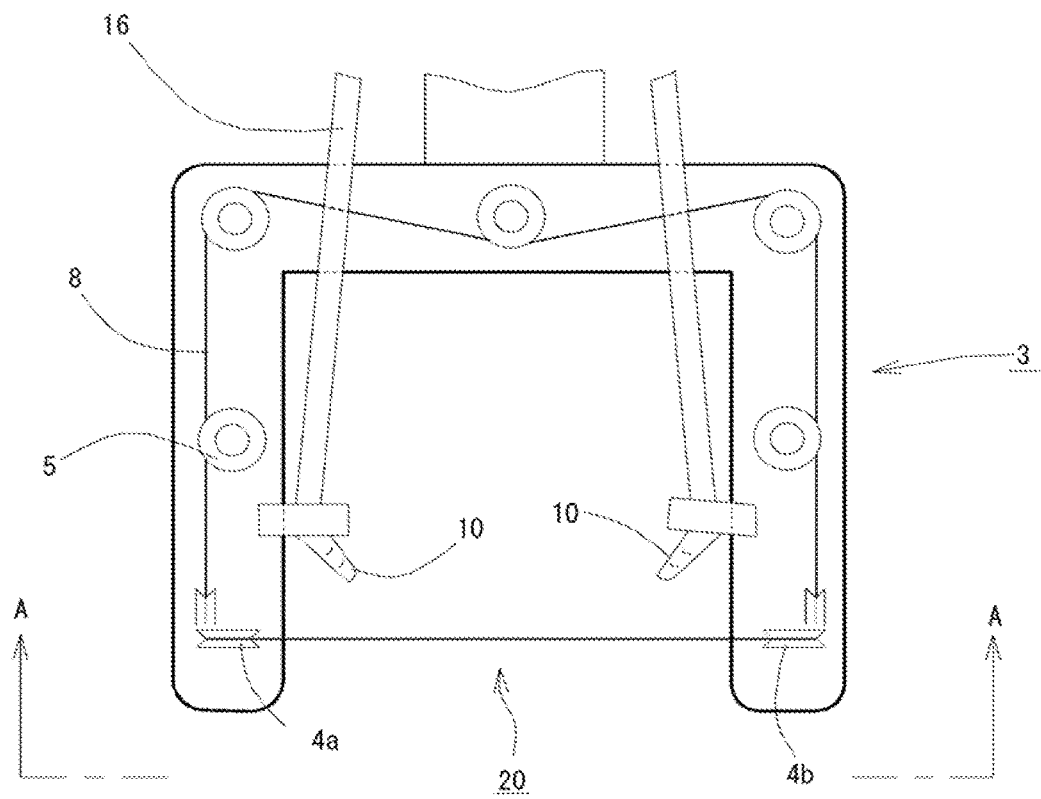
FIG. 2 is an enlarged plan view of the wire saw unit according to the first embodiment of the present invention.
Figure 3:
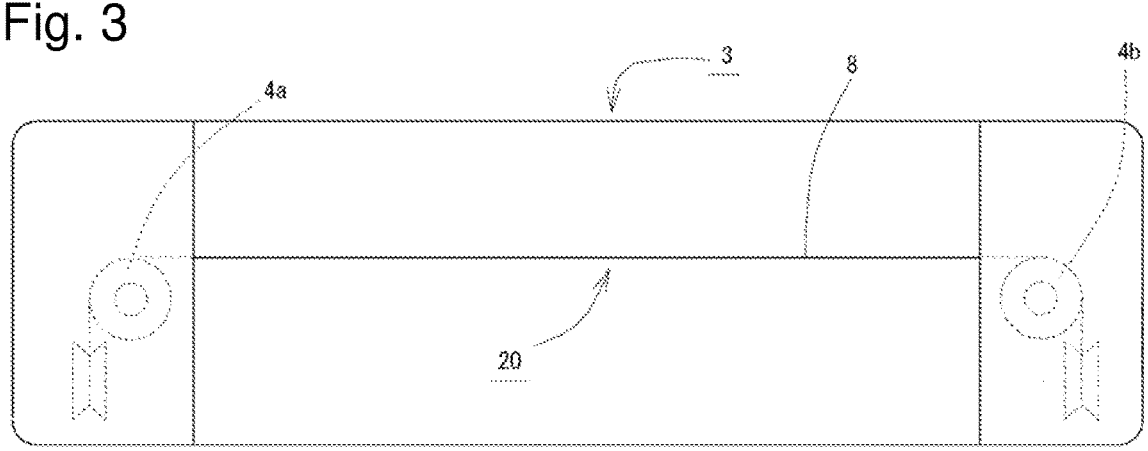
FIG. 3 is an enlarged front view of the first embodiment according to the present invention taken along an A-A direction in FIG. 2.
Figure 13:
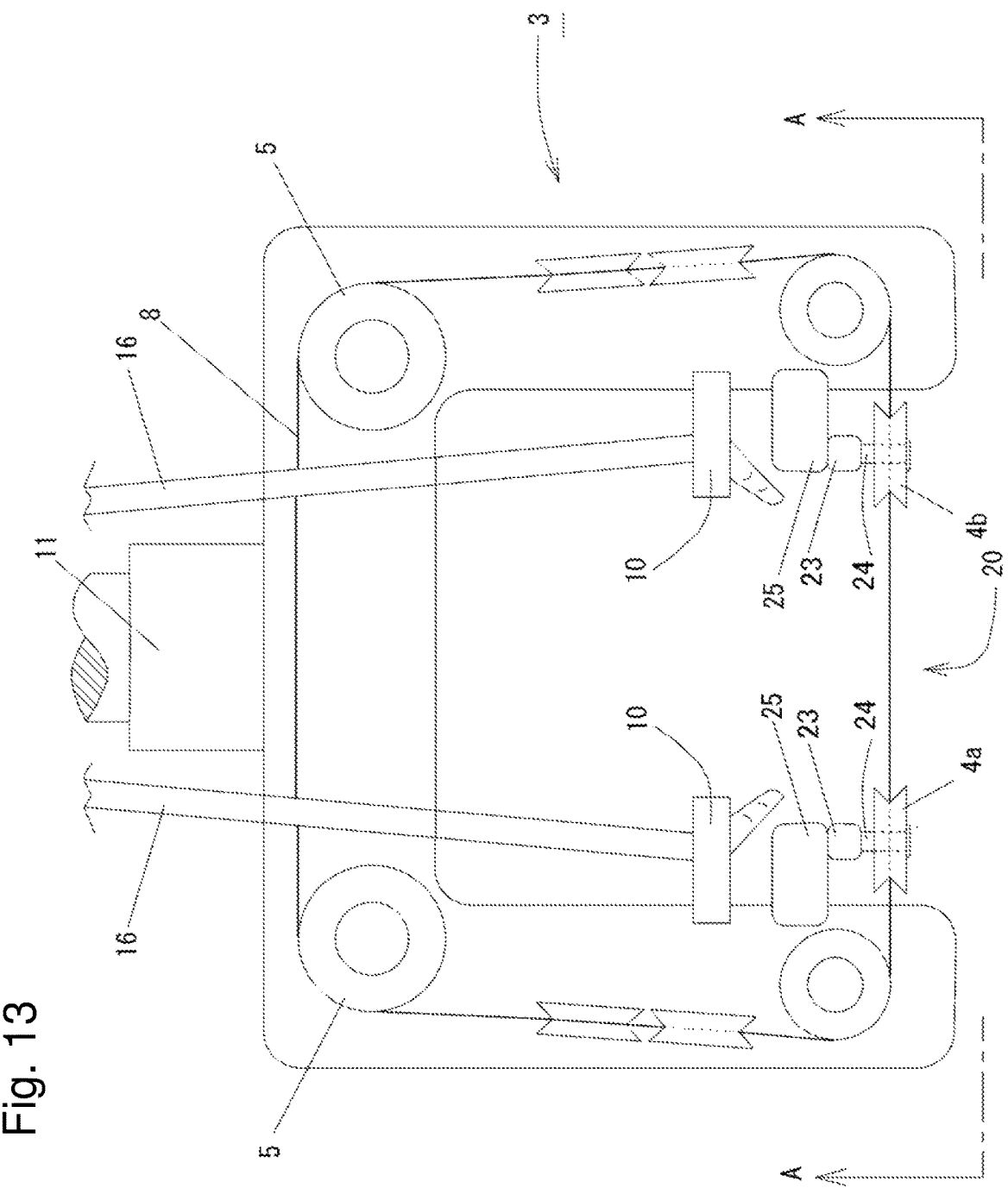
FIG. 13 is an enlarged plan view of the wire saw unit according to the third embodiment of the present invention.
Figure 14:
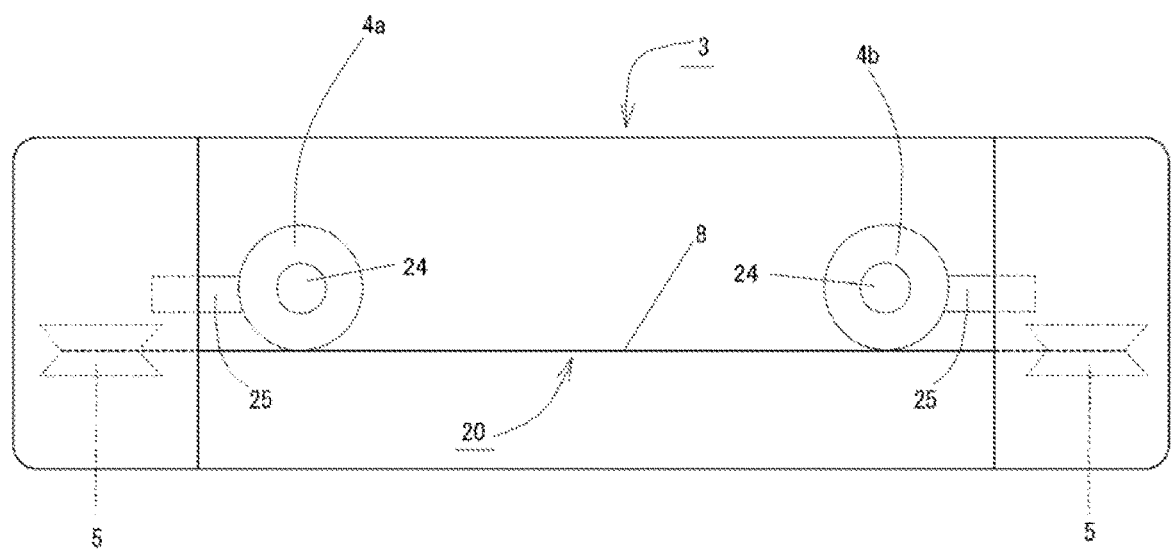
FIG. 14 is an enlarged front view of the third embodiment according to the present invention taken along an A-A direction in FIG. 13.

In FIG. 13, actions of the guide pulleys 4*a* and 4*b*, the rotary pulleys 5, the wire 8, and the nozzles 10 are the same as those of the guide pulleys 4*a* and 4*b*, the rotary pulleys 5, the wire 8, and the nozzles 10 shown in FIG. 2 of the first embodiment, and thus detailed description thereof will be omitted.

Figure 16:
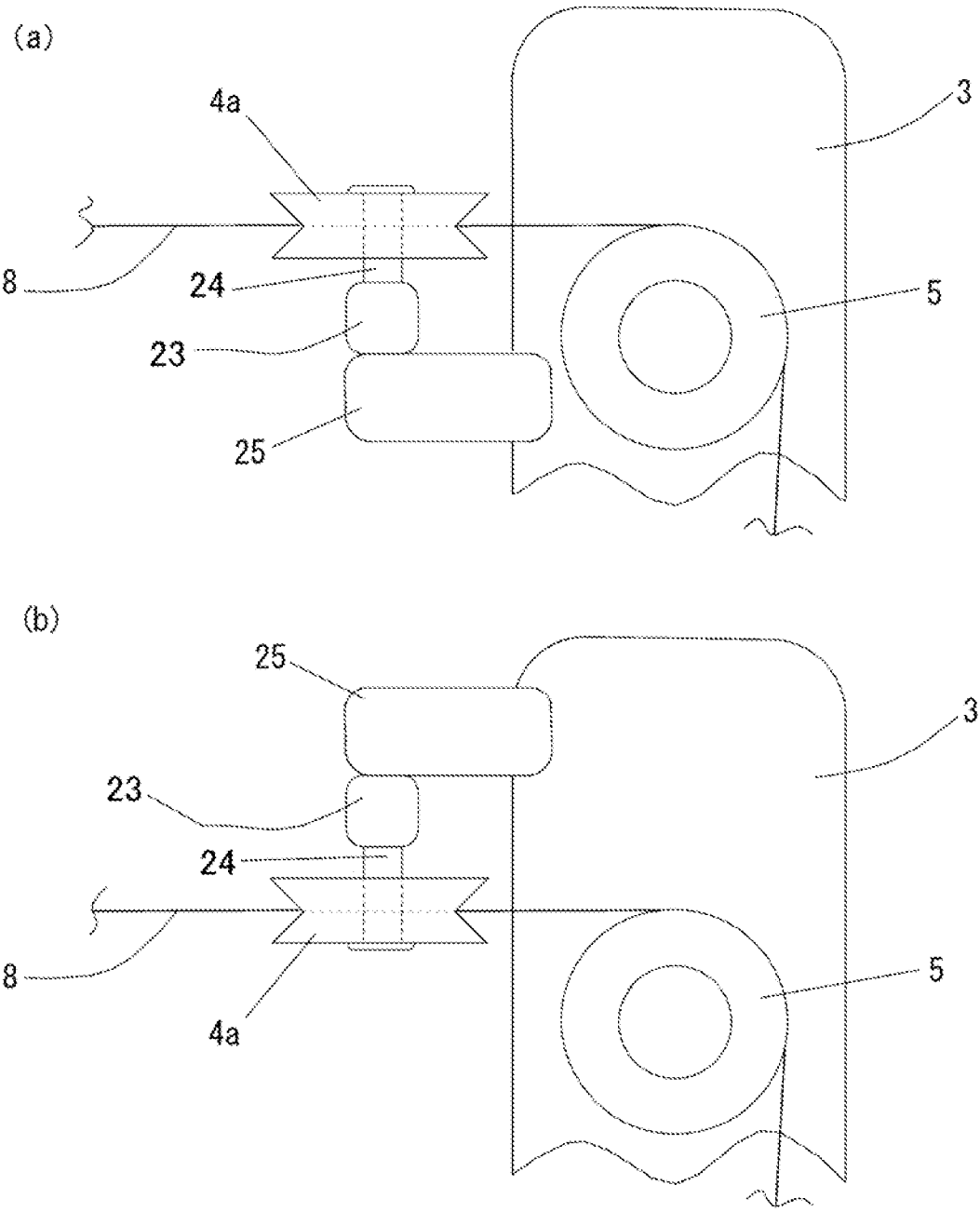
FIG. 16 is an enlarged view of a portion in the vicinity of a guide pulley in which a load cell according to the third embodiment of the present invention is disposed.

In this embodiment, a load cell 23 is provided on a rotary shaft 24 of the guide pulleys 4*a* and 4*b* for deflection control of the wire, and FIG. 16 is an enlarged view of that portion. The load cell 23 is rotatably supported by the rotary shaft 24 of the guide pulley 4*a*, and the rotary shaft 24 is fixed to the wire saw unit 3 by a bracket 25. The load cell 23 may be provided at such a position as shown in FIG. 16(*a*) or 16(*b*) as long as the load cell 23 is rotatably supported by the rotary shaft 24 and provided near the wire 8. In FIG. 16(*a*), a configuration in which the rotary shaft 24 extends from the inner side of the wire saw unit 3, and the guide pulley 4*a* is provided at the tip end of the wire saw unit 3 is adopted. In this case, the load cell 23 is rotatably supported by the rotary shaft 24 from the inner side of the wire saw unit 3. In FIG. 16(*b*), a configuration in which the rotary shaft 24 extends from the outer side of the wire saw unit 3, and the guide pulley 4*a* is provided at the tip end is adopted. In this case, the load cell 23 is rotatably supported by the rotary shaft 24 from the outer side of the wire saw unit 3.

FIG. 17 complements a method of deflection control of the wire described below.

For example, as a first method (FIG. 17(*a*)), a load applied to the wire 8 in the case of cutting the workpiece may be detected by a load cell 23 provided on one or both of the guide pulleys 4*a* and 4*b*, a speed at which the wire 8 is pressed against the workpiece by movement of the robot arm 2 or the traveling speed of the wire 8 may be adjusted by a drive control device (not shown) to reduce the cutting speed for cutting the workpiece of the wire 8 until the load is eliminated, and thus deflection control of the wire 8 may be performed.

As a second method (FIG. 17(*b*)), the load cell 23 is provided on any one of the guide pulleys 4*a* and 4*b*, and first, an arbitrary pressing force is determined. The wire 8 is pressed against the workpiece by the movement of the robot arm 2 by the drive control device (not shown), and an analog value of the pressing force is registered in the load cell 23. When cutting the workpiece, a deflection amount is calculated from a state of load applied to the load cell 23 based on the value. The speed at which the wire 8 is pressed against the workpiece 6 by the movement of the robot arm 2 or the traveling speed of the wire 8 may be adjusted based on the deflection amount, and thus the deflection control of the wire 8 may be performed.

Furthermore, as a third method (FIG. 17(*c*)), the deflection of the wire 8 may be controlled by providing the load cell 23 (two component forces load cell) capable of measuring forces in two directions (X-axis direction and Y-axis direction) on any one of the guide pulleys 4*a* and 4*b*, and adjusting the speed at which the wire 8 is pressed against the workpiece by movement of the robot arm 2 or the traveling speed of the wire 8 by the drive control device (not shown) while calculating a deflection state by measuring the forces applied in the X-axis direction and the Y-axis direction (tan θ=Y/X) when the wire 8 is pressed against the workpiece 6.

In the case of adjusting the traveling speed of the wire 8 as the method of deflection control described above, for example, control may be performed such that when the amount of occurrence of deflection of the wire 8 is small, the wire 8 is caused to travel slowly, and when the amount of occurrence of deflection of the wire 8 is large, cutting is progressed by increasing the traveling speed of the wire 8.

Figure 18A:
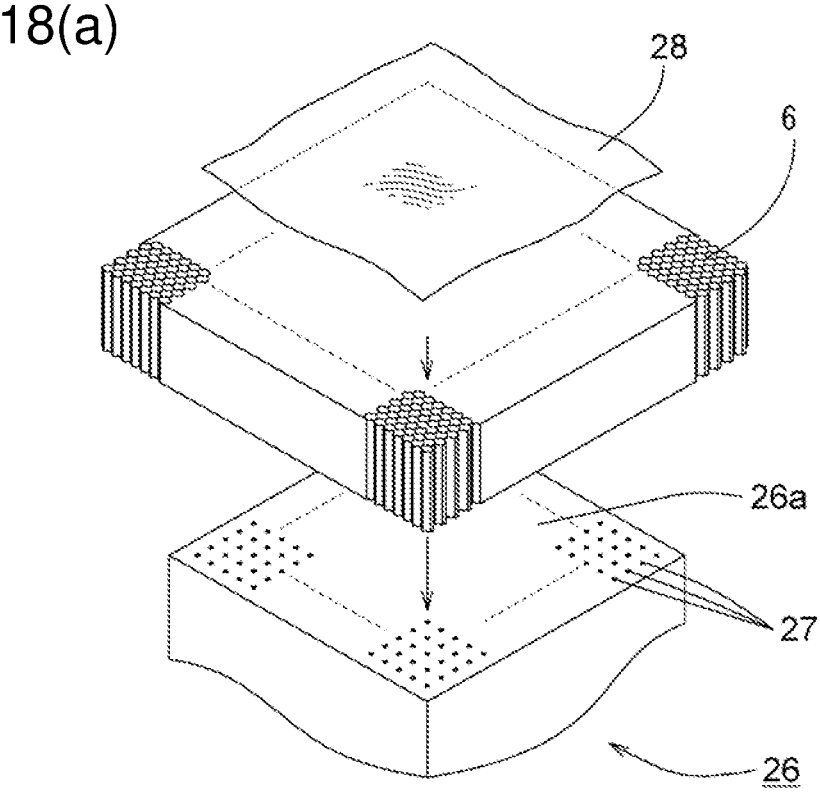
FIG. 18(a) is an explanatory diagram showing a method of holding an air-permeable member that is a workpiece according to the present invention.
Figure 18B:
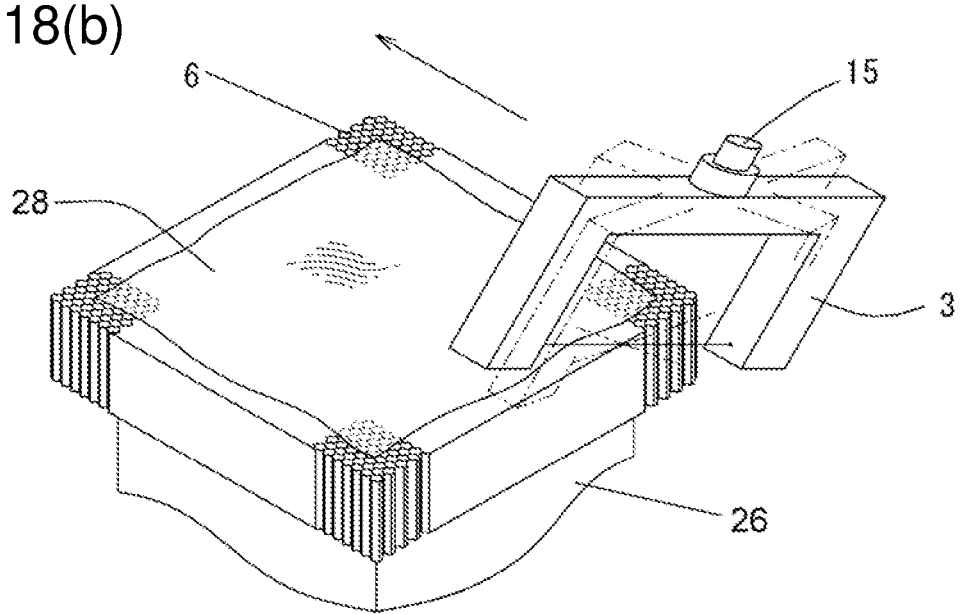
FIG. 18(b) is an explanatory diagram showing a method of cutting a workpiece that is a honeycomb member while swinging the wire saw unit according to the present invention.

Next, an embodiment of the present invention as an embodiment of cutting processing according to the type of the workpiece using the wire saw device of the first to third embodiments will be shown with reference to FIGS. 18(*a*) and 18(*b*). For example, a method of cutting a honeycomb member that is lightweight, high in strength, and excellent in a shock absorption property will be mentioned.

In the honeycomb member, a large number of through holes are arranged in parallel in a longitudinal direction with cell walls therebetween. Because of the through hole shape, the honeycomb member has air permeability. When cutting a workpiece that is the honeycomb member, a table 26 as shown in FIG. 18(*a*) is used. The table 26 has suction holes 27, and the workpiece 6 is placed on a holding surface 26*a* thereof in a vertical direction. Incidentally, a material of the honeycomb member of the workpiece 6 is made of, for example, aramid fiber, aluminum or the like. Further, the workpiece 6 may be formed by sandwiching a honeycomb-shaped member by carbon fiber reinforced resin (CFRP), or may be one of various air-permeable members instead of having a honeycomb shape. The workpiece 6 is formed to be larger than the table 26. The table 26 does not interfere with the wire saw unit 3 at the time of cutting processing when a part to be processed protrudes from the table 26.

After placing the workpiece 6 on the table 26, an upper surface of the table 26 is covered with an air-impermeable member 28. In this case, a nylon sheet, a resin plate, or the like is used as the air-impermeable member 28. When a suction mechanism (not shown) inside the table 26 is operated, the air-impermeable member 28 is sucked via the suction holes 27 of the table 26 and is attracted to the table 26. Since the workpiece 6 has air permeability, the suction force acting on the air-impermeable member 28 covering the upper surface of the workpiece 6 presses the entire workpiece 6 against the table 26. In this manner, the workpiece 6 fixed to the table 26 can be stably cut.

Further, when the cutting processing is progressed, in the case where the workpiece 6 is a honeycomb member, a load is applied to the cell walls having a hollow shape that is unique to the honeycomb member. In the wire saw device 1 according to the first to third embodiments of the present invention, the cutting processing accuracy of the wire 8 is stabilized by the removal of the cutting waste and possibly further the suction and the cooling effect, and thus excessive load is not applied to the workpiece 6 and an effect of not deforming the hollow shape is achieved. Also, generated burr may be sometimes removed by an action of air.

Figure 4:
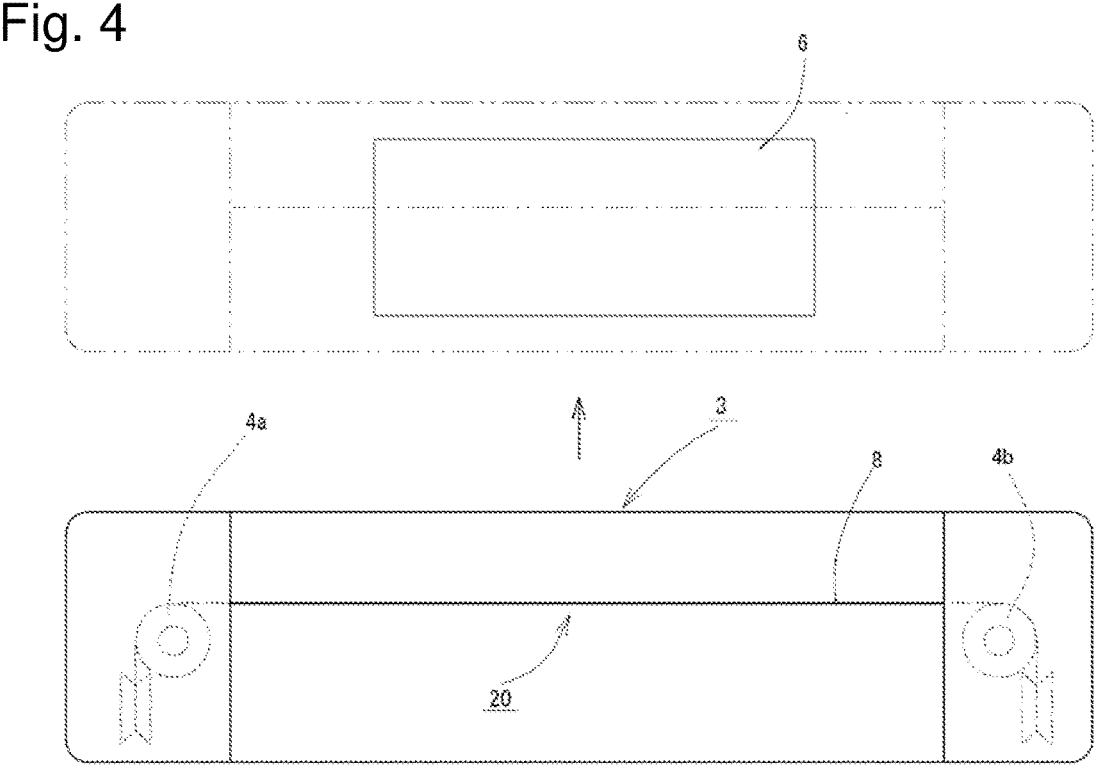
FIG. 4 is an enlarged front view of the first embodiment according to the present invention taken along the A-A direction in FIG. 2 showing a cutting operation.
Figure 10:
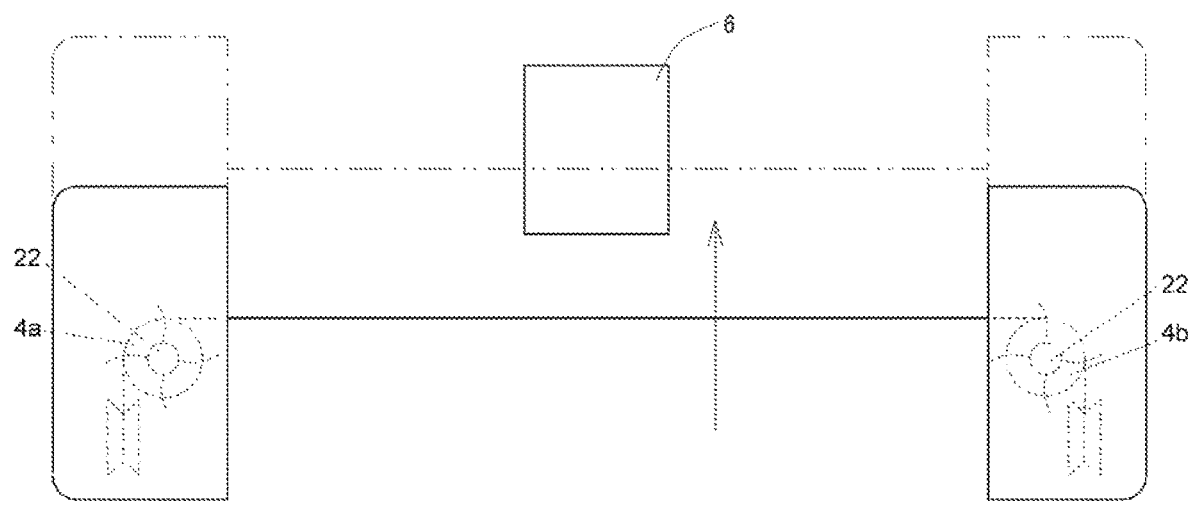
FIG. 10 is an explanatory diagram of an enlarged front view of the second embodiment according to the present invention taken along the A-A direction in FIG. 8 showing a cutting processing operation.
Figure 15:
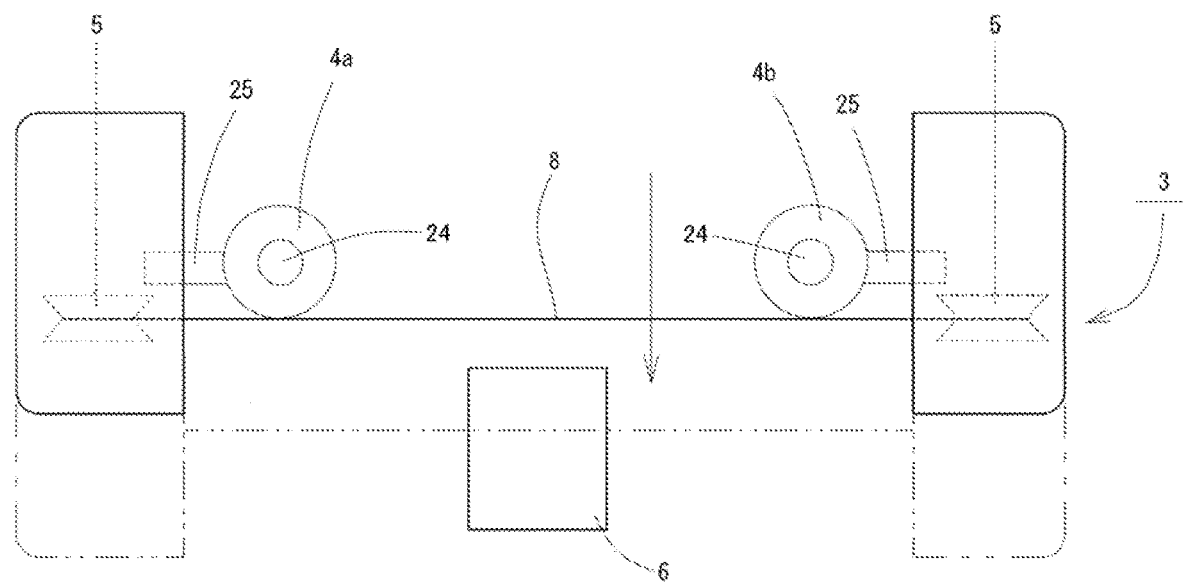
FIG. 15 is an explanatory diagram of an enlarged front view of the third embodiment according to the present invention taken along the A-A direction in FIG. 13 showing a cutting processing operation.

FIGS. 4, 10, and 15 of the first, second, and third embodiments show a mode in which the wire 8 traveling on the front side of the guide pulleys 4*a* and 4*b* is pressed against the workpiece 6 to be opposed to a lower surface of the workpiece 6 to cut the workpiece 6. If the cutting processing is progressed in this state, in the case where the workpiece 6 is a honeycomb member, an excessive load is applied to the cell walls having a unique hollow shape, and the hollow shape is deformed. In order to prevent the hollow shape from being deformed, it is preferable to perform the cutting processing while swinging the wire saw unit 3 to a predetermined angle. That is, cutting the workpiece 6 by angling the wire 8 with respect to the workpiece 6 while swinging the wire saw unit 3 in addition to simply pressing to cut leads to a reduction in deflection of the wire 8.

Depending on different cutting processing conditions, the robot arm 2 may be swung without swinging the wire saw unit 3. The wire 8 comes into point contact with the workpiece 6, a pressure is concentrated on the processing point, thus the contact surface of the wire 8 becomes small, and the processing accuracy increases. Further, by performing the swinging cutting processing, occurrence of burrs can be suppressed. Meanwhile, also in the swinging cutting processing described above, the characteristic point contact of the wire 8 with the workpiece becomes difficult when the wire 8 is excessively deflected. Therefore, it is necessary to control the deflection of the wire 8, and thus the technique using the load cell shown in the third embodiment of the present invention is useful.

Figure 5:
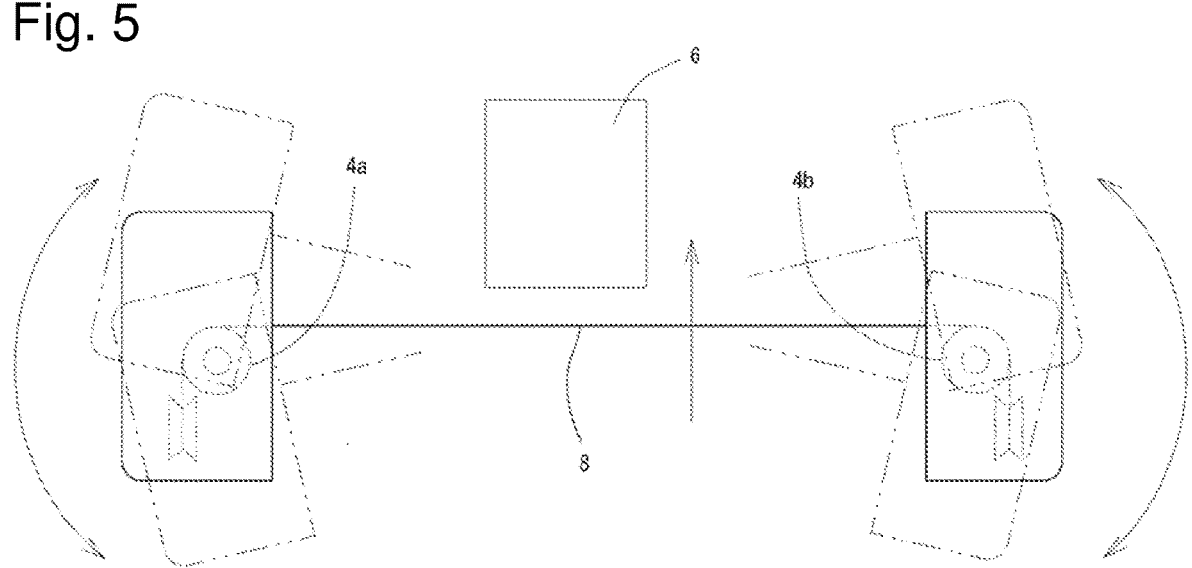
FIG. 5 is an enlarged front view of the first embodiment according to the present invention taken along the A-A direction in FIG. 2 showing a swinging operation.

In the case of swinging the wire saw unit 3, for example, as shown in FIG. 5 of the first embodiment, the guide pulleys 4*a* and 4*b* are arranged vertically with respect to the tip end and front surface of the wire saw unit 3, and the drive source (not shown) is provided in the wire saw unit 3. In this way, swinging can be performed with the rotary shaft 15 as a fulcrum, and thus the control can be simplified. A swing angle can be controlled by the drive control device (not shown). In FIG. 5, the tip end of a U-shape of the wire saw unit 3 is vertically swung. Since the guide pulleys 4*a* and 4*b* are vertically arranged, a load is applied in the vertical direction of the V groove, and thus the wire is less likely to be disconnected. In contrast, in the case where the wire saw unit 3 is caused to reciprocally swing in a left-right parallel direction with the rotary shaft 15 as a fulcrum, it is preferable that the guide pulleys 4*a* and 4*b* are provided horizontally with respect to the tip end and front surface of the wire saw unit 3 such that the load is applied in the vertical direction of the V groove of the guide pulleys 4*a* and 4*b*. The direction in which the guide pulleys 4*a* and 4*b* are placed can be appropriately adjusted depending on the manner of swinging. In accordance therewith, the arrangement of the rotary pulleys 5 provided in the vicinity of the guide pulleys 4*a* and 4*b* may be appropriately adjusted.

Meanwhile, in the case of swinging the robot arm 2, there is no particular limitation as long as a swingable mechanism is adopted. For example, swinging may be realized by providing an actuator in at least one joint among a plurality of joints interconnecting a plurality of links.

As a result, the swing of the wire 8 is generated, a contact length of the wire 8 with the workpiece 6 is shortened, the load on both the workpiece 6 and the wire 8 is reduced, burden on the hollow cell walls of the workpiece 6 is reduced, and the processing accuracy is stabilized.

Figure 20:
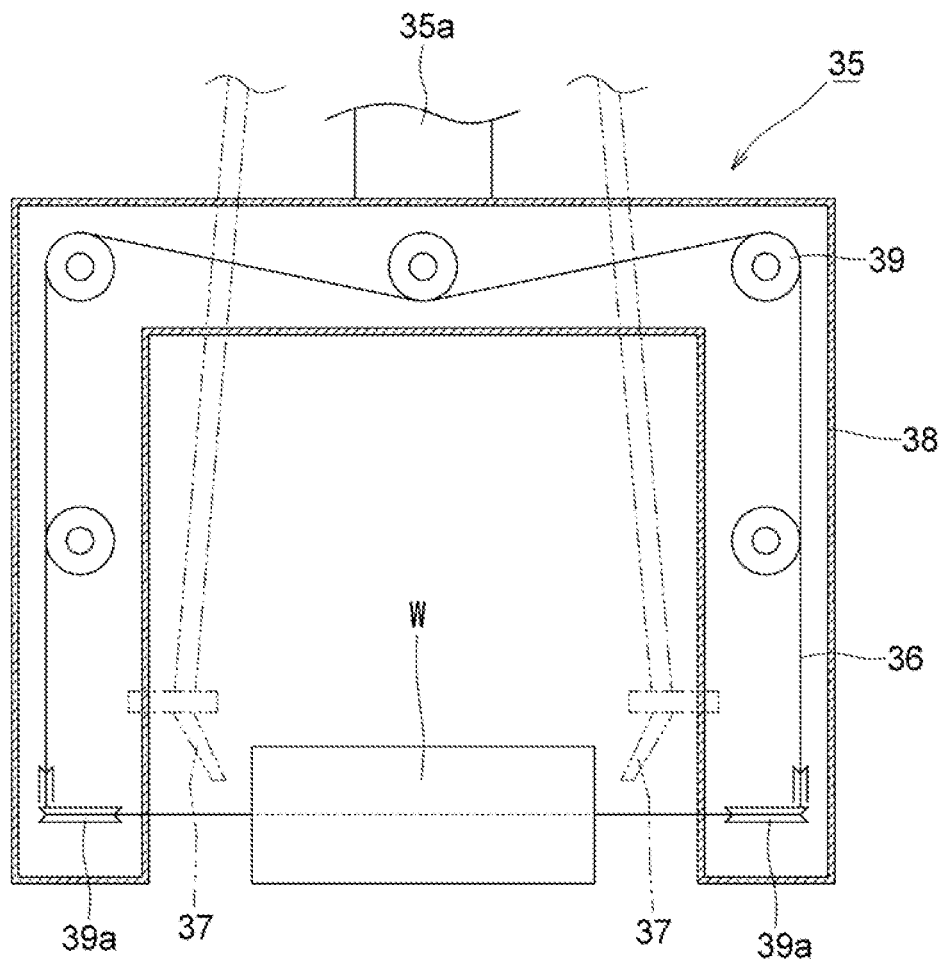
FIG. 20 is a partial cutaway plan view of a processing unit portion in the case where a wire saw is used as the processing unit of the present invention.
Figure 21:
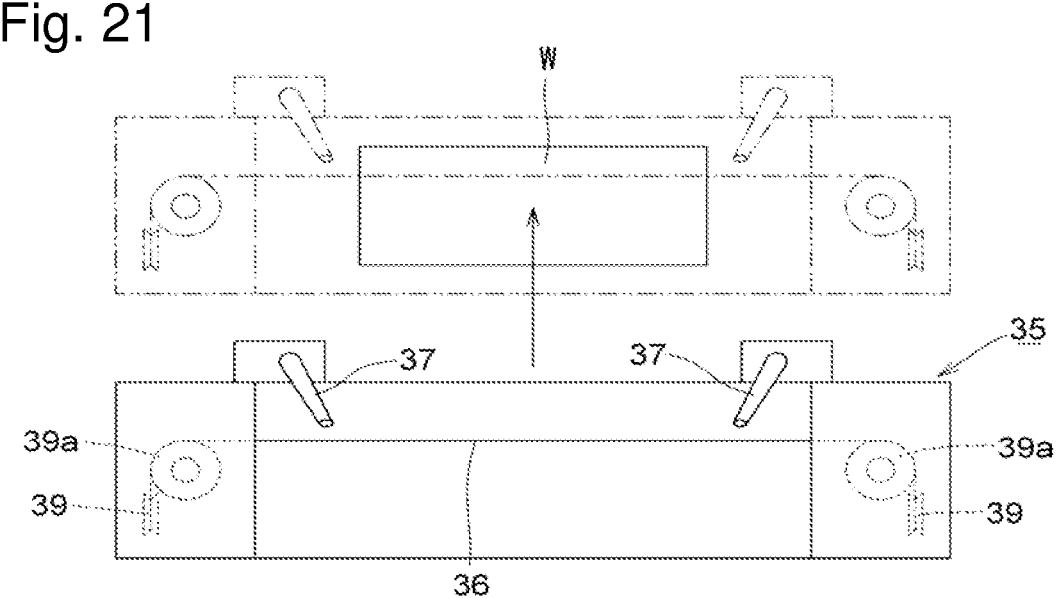
FIG. 21 is an explanatory diagram of the cutting processing operation in a front direction of FIG. 20.

Next, a processing device 31 according to the present invention will be described. An embodiment will be described below with reference to FIGS. 19 to 21.

Figure 19:
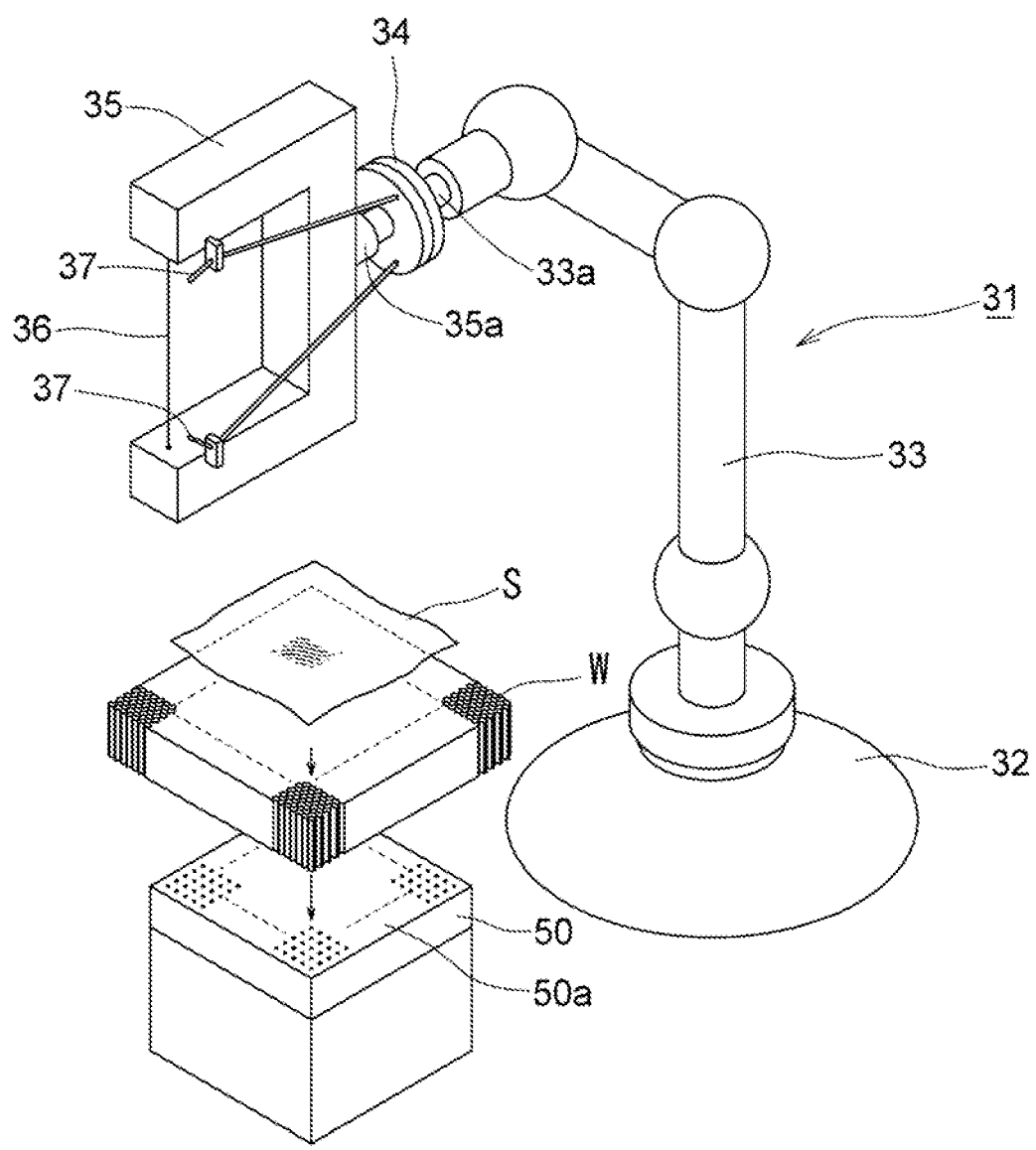
FIG. 19 is an overall perspective view of a processing device according to an embodiment of the present invention.

As shown in FIG. 19, the processing device 31 of the present invention includes a machine base 32, a movable robot arm 33 erected on the machine base 32, a tool changer 34 provided on an arm tip end shaft 33*a* of the robot arm 33, processing unit 35 detachably provided via the tool changer 34, and a table 50 for placing and fixing a workpiece W to be processed thereon.

The machine base 32 is fixed to an appropriate floor surface, wall surface, or the like. The robot arm 33 is provided on the machine base 32, and the arm is movably controlled by a control mechanism (not shown). Further, the tip end shaft 33*a* of the arm of the robot arm 33 can be freely rotated by an appropriate drive source (not shown).

A tool changer 34 is provided at a tip end of the tip end shaft 33*a*. The tool changer 34 includes, for example, a ball plunger, and the processing unit 35 is detachably supported. As the tool changer 34, appropriate means such as an engageable engaging pin or an electromagnet can be used.

In the present embodiment, a wire saw is used as the processing unit 35. The processing unit 35 includes a U-shaped frame 38, a plurality of guide pulleys 39 accommodated in the frame 38, an endless wire 36 suspended between the guide pulleys 39, and gas jetting nozzles 37 for cooling the wire 36 and blowing off processing waste that are provided in the vicinity of the wire 36.

The guide pulleys 39 are rotatably supported on an inner wall of the frame 38, and at least one guide pulley 39 is provided with an appropriate drive source (not shown). In addition, the wire 36 in a cutting region for processing the workpiece W is provided such that shafts of the guide pulleys 39*a* on both sides are perpendicular to a processing direction of the workpiece W and resistance at the time of processing the workpiece W is received by grooves of the guide pulleys 39*a*. Therefore, as the tip end shaft 33*a* of the robot arm 33 rotates, the wire 36 in the cutting region swings arcuately along the processing direction of the workpiece W. By causing the wire 36 to swing arcuately, the contact between the wire 36 and the workpiece W becomes closer to point contact, the cutting load is reduced, thus the processing speed is improved, shaking of the wire 36 due to an excessive load is reduced, and thus the processing accuracy is improved. Furthermore, discharge of processing waste becomes easier, the processing speed improves, and the processing accuracy is improved as well. Note that the robot arm 33 may be controlled in accordance with a cutting load by providing a load sensor such as a load cell on at least one pulley shaft of the guide pulleys 39a.

In addition, as described above, since the shafts of the guide pulleys 39a on both sides are provided so as to be perpendicular to the processing direction of the workpiece W such that the resistance at the time of processing the workpiece W is received by the grooves of the guide pulleys 39a, processing can be performed independently of a pocket portion of the frame 38 of the processing unit 35. That is, interference of the processing unit 35 with the table and the like can be reduced, and thus the workpiece W can be easily processed into an arbitrary shape.

Although the wire 36 is configured to swing arcuately only by the rotation of the tip end shaft 33a of the robot arm 33 in the present embodiment, the wire 36 may be configured to swing in a predetermined direction by moving the robot arm 33 itself. However, it is preferable that the wire 36 is configured to swing arcuately only by the rotation of the tip end shaft 33a of the robot arm 33 in view of ease of control and narrowing a movable range of the robot arm 33.

In the present embodiment, a fixed abrasive wire which is endless and in which diamond abrasive grains are fixed to a core wire of the wire 36 by electrodeposition, resin, or the like is used as the wire 36. Note that suitable abrasive grains such as silicon carbide, boron, and alumina may be used in accordance with a material to be processed. Further, in the case of using a single long wire instead of an endless type, a supply reel and a recovery reel may be provided, and processing may be performed while supplying the wire from the supply reel. Further, the wire 36 is driven to travel by a drive source (not shown) and provided on the guide pulleys 39, and thus the wire 36 is capable of traveling in one direction or traveling reciprocally. Further, a tension mechanism for applying a predetermined tension to the wire 36 may be provided.

The jetting nozzles 37 are provided in the vicinity of the cutting region of the wire 36 for cutting the workpiece W. Cooling air is blown from an appropriate pump (not shown) to the jetting nozzles 37 and is jetted from tip ends of the jetting nozzles 37. The cooling air may be appropriately cooled by a cooling mechanism in accordance with the material of the workpiece W.

Since the processing is performed while performing cooling with the cooling air as described above, it is possible to perform cutting in a dry environment, and thus the present embodiment can be also preferably applied to the workpiece W that is weak against a processing liquid (for example, one which causes chemical change or one which dissolves in a liquid). In the case of processing the workpiece W to which applying a processing liquid does not cause a problem, a processing liquid can be also used instead of the cooling air.

The table 50 is provided in the vicinity of the processing unit 35 and erected on a base (not shown). A large number of suction holes 51 are bored in the upper surface of the table 50. A suction pump (not shown) is connected to the suction holes 51 so as to generate a negative pressure on a holding surface 50a of the table 50.

In the embodiment of the present invention, a member having air permeability in a holding direction on the table 50 is used as the workpiece W. As the workpiece W, one in which a large number of hexagonal tubular bodies are arranged in a honeycomb shape along the holding direction is used. The workpiece W is used as, for example, a structural member of an aircraft. Since the workpiece W has air permeability, even if an attempt is made to hold the workpiece W on the table 50 as it is, a suction failure occurs and the workpiece W cannot be held. Therefore, in the embodiment of the present invention, the workpiece W is placed on the table 50, and an air-impermeable sheet S is placed over the upper surface of the workpiece W. The air-impermeable sheet S may have a size at least to cover a position facing the suction holes 51 of the table 50. Thereafter, by applying a vacuum pump to the suction holes 51 to generate a negative pressure, the workpiece W is sucked and held on the holding surface 50a of the table 50.

Another embodiment of the processing unit 35 will be described below with reference to FIGS. 22 and 23. The same reference signs are denoted to members common to those described above.

Figure 22:
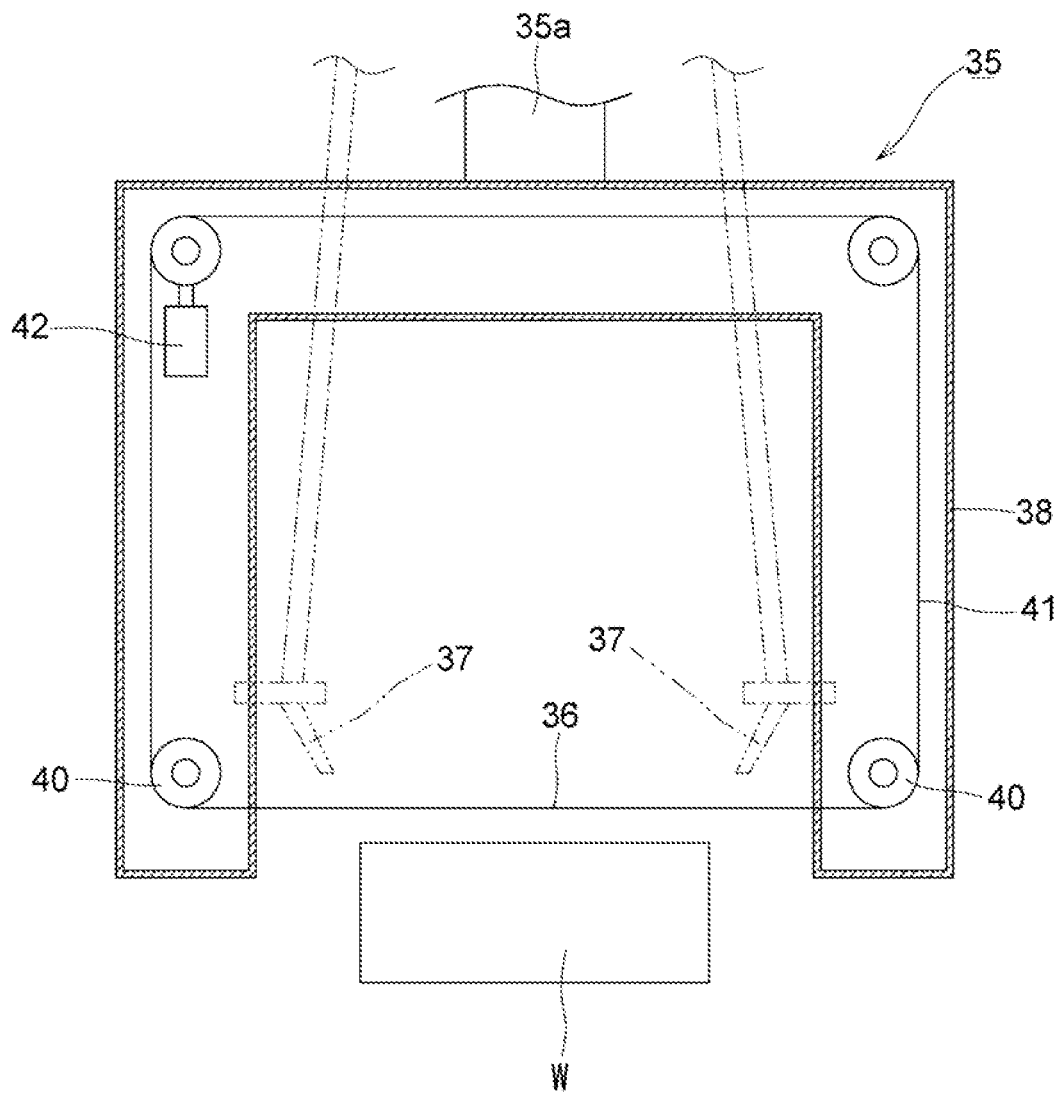
FIG. 22 is a partial cutaway plan view of a processing unit portion in the case where a band saw is used as the processing unit of the present invention.
Figure 23:
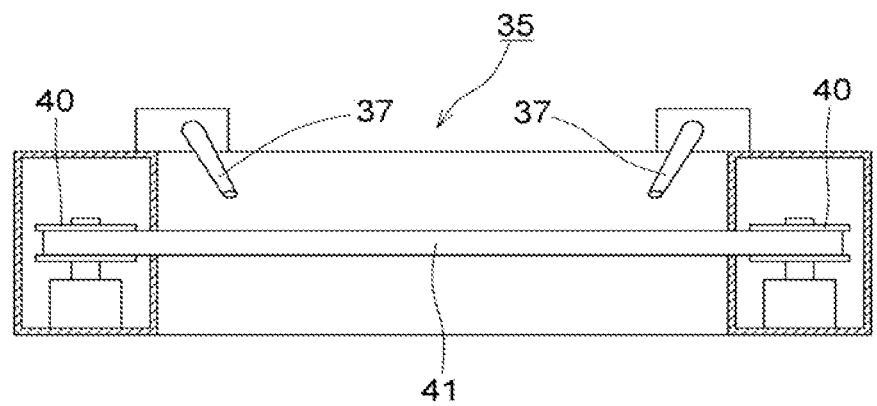
FIG. 23 is a partially cutaway explanatory diagram in a front direction of FIG. 22.

As shown in FIGS. 22 and 23, a band saw is used instead of a wire saw in the processing unit 35 in the present embodiment. Similarly to the case of a wire saw, the processing unit 35 includes a U-shaped frame 38, a plurality of guide pulleys 40 that are accommodated in the frame 38 and are rotatably supported, an endless band saw 41 suspended between the guide pulleys 40, and a cylinder 42 for applying a tension to the band saw 41.

The band saw 41 is formed by fixing diamond abrasive grains by electrodeposition, resin, or the like on a surface of an endless belt made of resin or metal. In addition, at least one of the guide pulleys 40 is provided with a drive source (not shown). By driving the guide pulleys 40, the band saw 41 can travel in one direction or travel reciprocally. Further, in the band saw 41, a processing region to be used can be a front surface of the belt or a side surface of the belt.

Since the jetting nozzles 37 are the same as described above, the description thereof will be omitted.

Next, various embodiments of the processing device 31 will be described below with reference to FIGS. 24 to 38. The same reference signs are given to the common members in the respective embodiments. In addition, the jetting nozzles 37 in the processing unit 35 are omitted in the illustration for the sake of convenience.

Figure 24A:
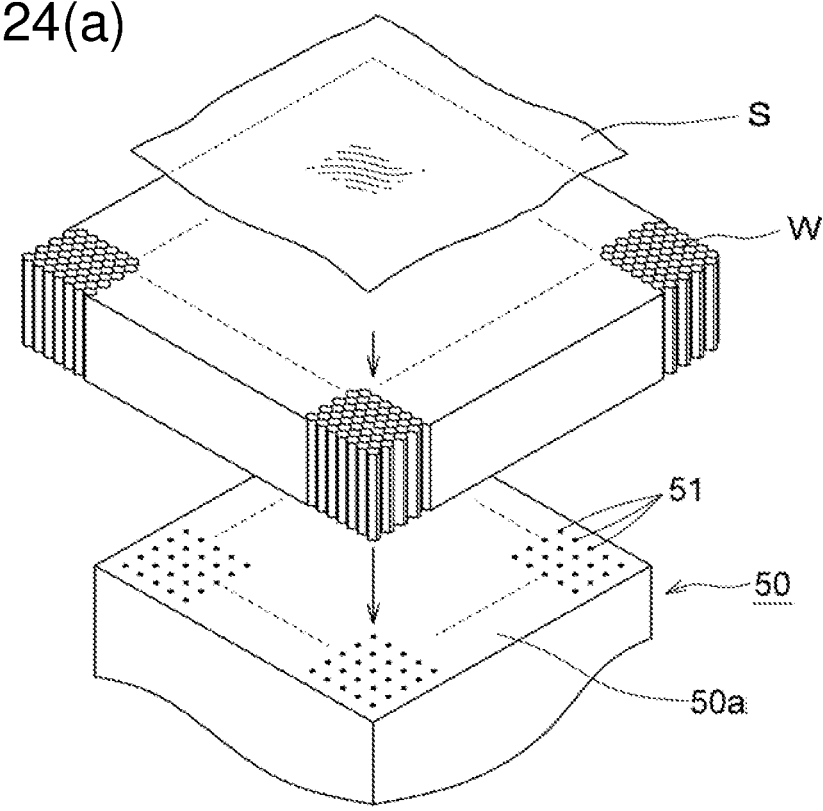
FIGS. 24(a) and 24(b) are explanatory diagrams of a processing method according to the first embodiment concerning the method of holding the workpiece of the present invention.
Figure 24B:
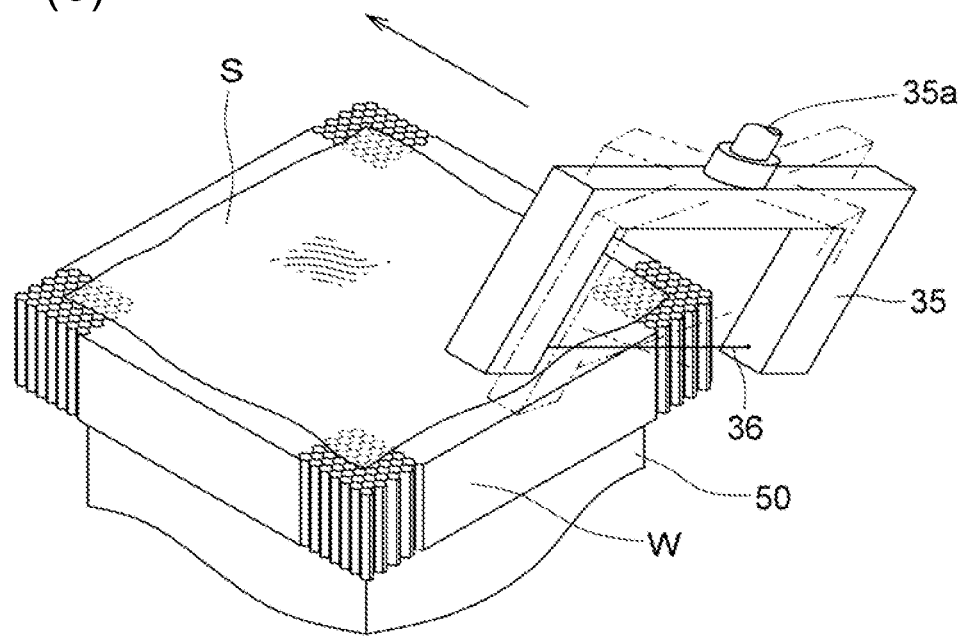

FIGS. 24(a) and 24(b) show a first embodiment of a method of holding a workpiece on the table on which the workpiece is placed in the processing device 31. As shown in FIG. 24(a), a large number of suction holes 51 are bored in the holding surface 50a for the workpiece W in the table 50. A honeycomb-shaped workpiece W having air permeability in a direction perpendicular to the holding surface 50a is placed on the holding surface 50a. In addition, the workpiece W may be one in which a honeycomb-shaped member is sandwiched between carbon fiber reinforced resin (hereinafter referred to as CFRP). Further, various air-permeable members which are not in the shape of a honeycomb can be processed. Further, the workpiece W is formed to be larger than the table 50, and thus interference with the processing device 31 at the time of processing becomes less likely to occur in the case where a part to be processed protrudes from the table 50.

Subsequently, the air-impermeable sheet S is placed over an air-permeable portion of the workpiece W so as to cover the air-permeable portion. The air-impermeable sheet S may have a size at least covering only a portion of the table 50 opposed to the suction holes 51.

Next, by generating a negative pressure in the suction holes 51 as shown in FIG. 24(b), the workpiece W is held on the table 50. Subsequently, the processing unit 35 is caused to approach a processed portion of the workpiece W by controlling the robot arm 33. In the present embodiment, a wire saw is used for the processing unit 35.

In the wire saw, the wire 36 is caused to travel in one direction or travel reciprocally by driving the guide pulleys 39 with a drive source (not shown). Further, the tip end shaft 33a of the robot arm 33 is rotationally driven at a predetermined angle by a suitable drive source (not shown) in forward and backward directions, and thus the processing unit 35 is caused to swing arcuately. By pressing the wire 36 of the processing unit 35 against the workpiece W, the workpiece W is cut. At this time, the robot arm 33 is controlled to drive in an appropriate direction so that curved surface processing or the like can be performed freely.

Next, a second embodiment of the processing device of the present invention will be described with reference to FIGS. 25(a), 25(b) and 26.

Figure 25A:
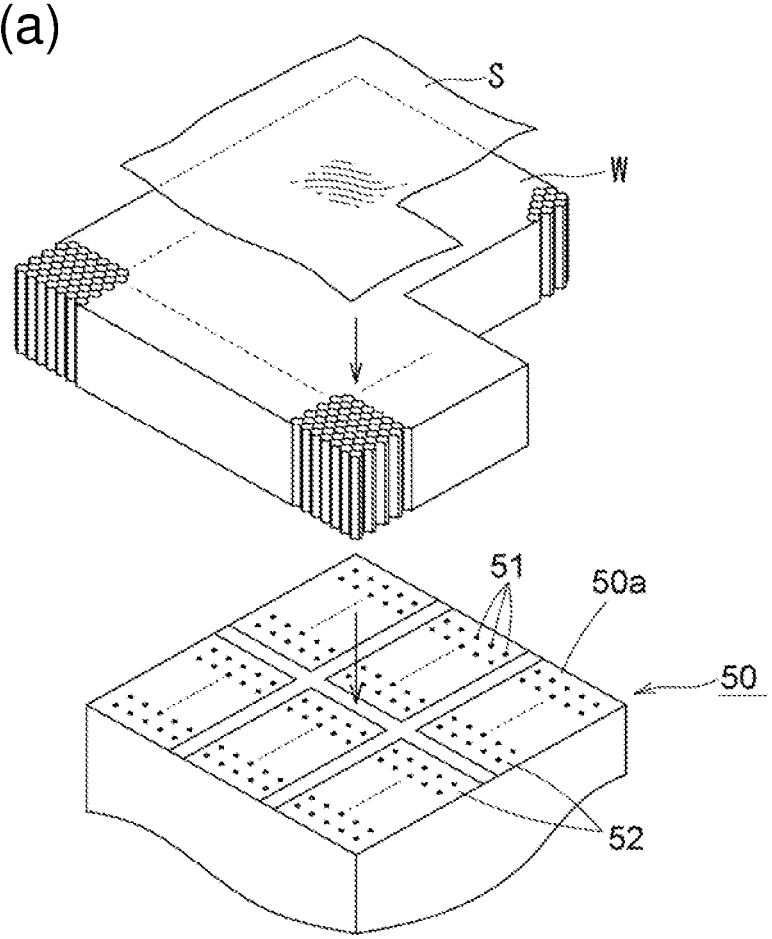
FIGS. 25(a) and 25(b) are explanatory diagrams of a processing method according to the second embodiment concerning the method of holding the workpiece of the present invention.
Figure 25B:
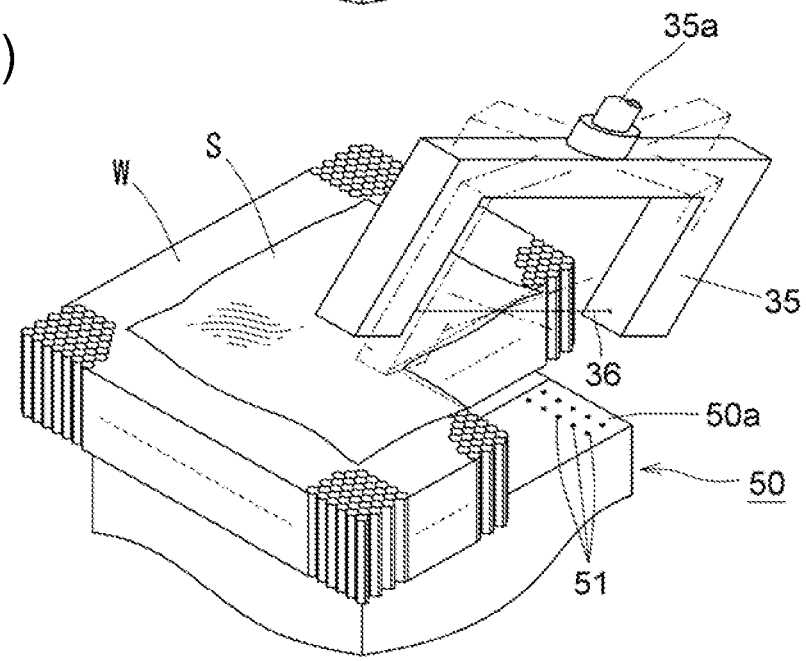
Figure 26:
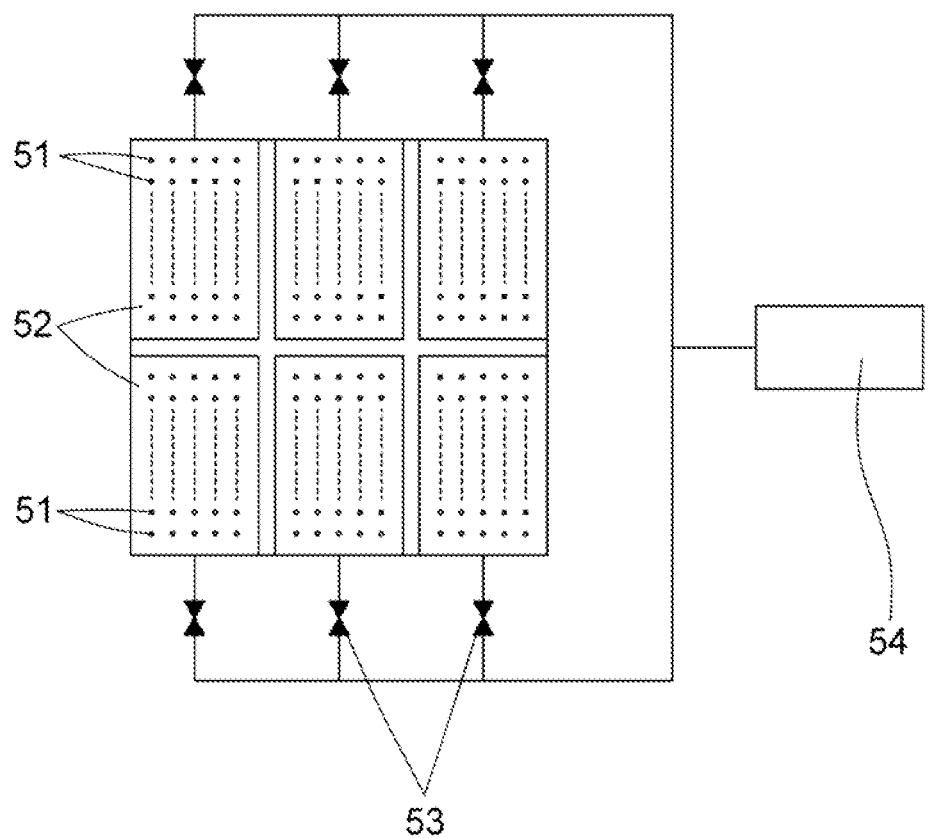
FIG. 26 is an explanatory diagram of a table according to the second embodiment concerning the method of holding the workpiece of the present invention.

As shown in FIG. 25(a), in the present embodiment, the holding surface 50a of the table 50 is divided into a plurality of suction regions 52. Further, in the suction regions 52, a plurality of suction holes 51 are bored. Each suction region 52 is connected to a vacuum pump 54 via a switching valve 53 (see FIG. 26). Therefore, negative pressure can be generated independently in each suction region 52.

Further, in the present embodiment, a honeycomb-shaped member in which a part of the workpiece W is cut off is processed. In the honeycomb-shaped member in which a part of the workpiece W is cut off as described above, it is not possible to use the table 50 that generates the negative pressure on the entire surface as in the first embodiment. Therefore, only the suction holes 51 in the suction regions 52 where the workpiece W is present is caused to act by opening and closing the switching valves 53. As a result, the holding force can be maintained even with the irregularly shaped workpiece W. By operating the processing device 31 in this state, the workpiece W is cut into a predetermined shape.

Next, a third embodiment of the processing device of the present invention will be described with reference to FIGS. 27 to 29.

Figure 27A:
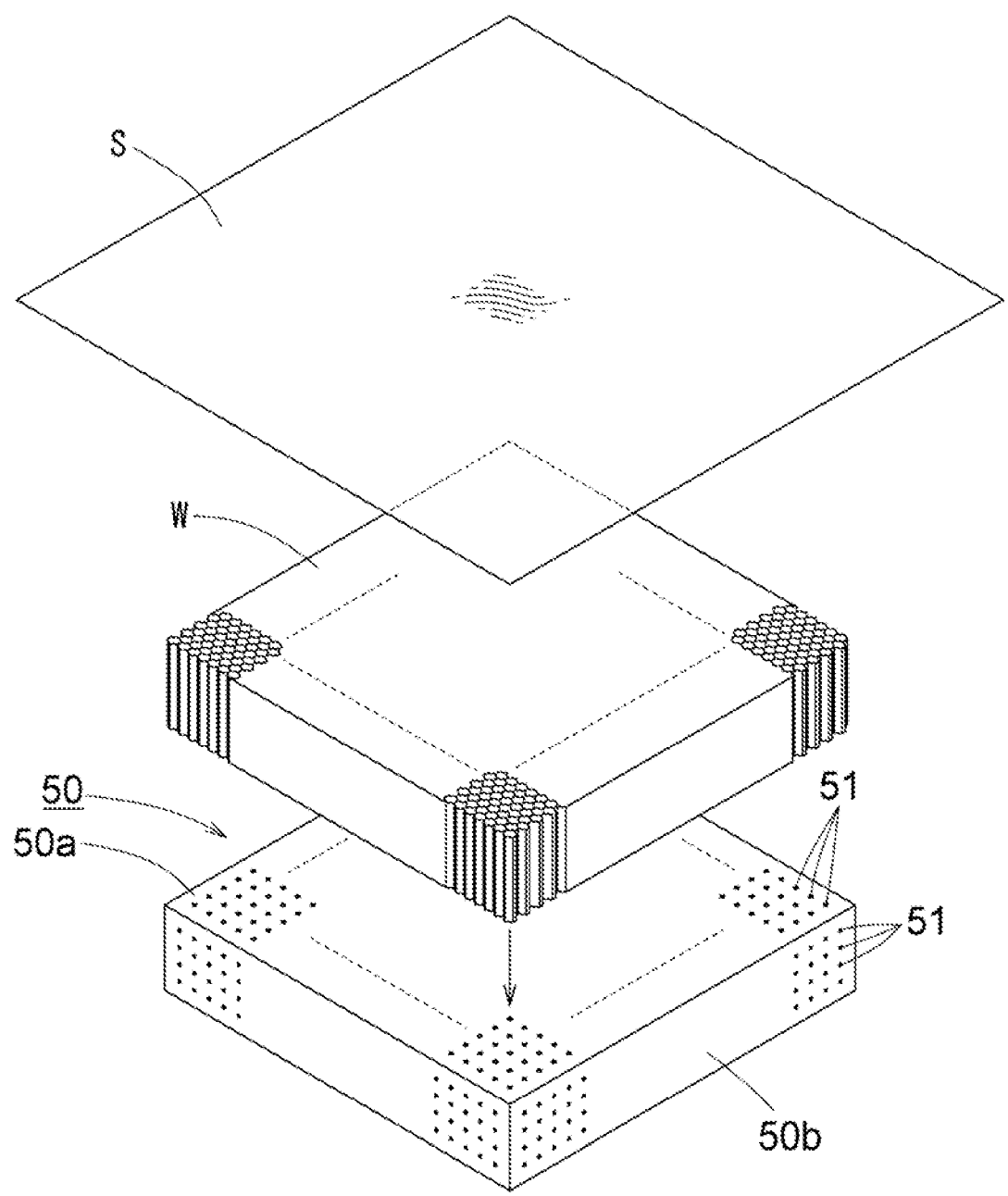
FIG. 27(a) is an explanatory diagram of a processing method according to the third embodiment concerning the method of holding the workpiece of the present invention.

As shown in FIG. 27(a), suction holes 51 are bored not only in the holding surface 50a that is the upper surface of the table 50 but also in side surfaces of the table 50 to form a side surface holding portion 50b. Note that a switching valve may be provided for each suction region similarly to the second embodiment if necessary, and the suction region may be switched.

In the present embodiment, the size of the workpiece W is approximately the same as the size of the table 50. Also, an air-permeable member is used for the workpiece W. The air-impermeable sheet S is formed to be larger than the workpiece W, and is thus formed to have a size reaching side surfaces of the workpiece W and the side surfaces of the table 50.

Figure 28B:
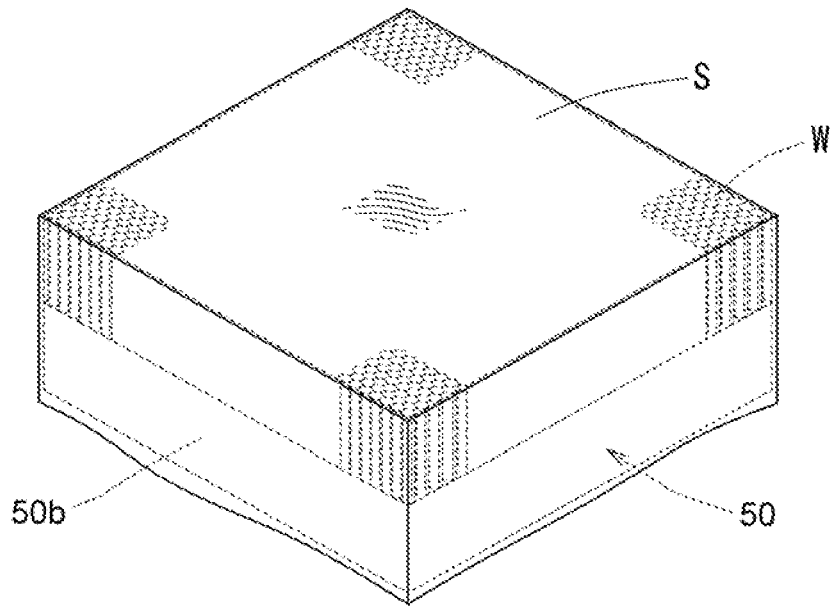
FIGS. 28(b) and 28(c) are explanatory diagrams of the processing method according to the third embodiment concerning the method of holding the workpiece of the present invention.

As shown in FIG. 28(b), the air-impermeable sheet S is placed over the workpiece W, and the air-impermeable sheet S protruding from the workpiece W is bent by the workpiece W to be sucked and held on the side surface holding portion 50b of the table 50.

Figure 28C:
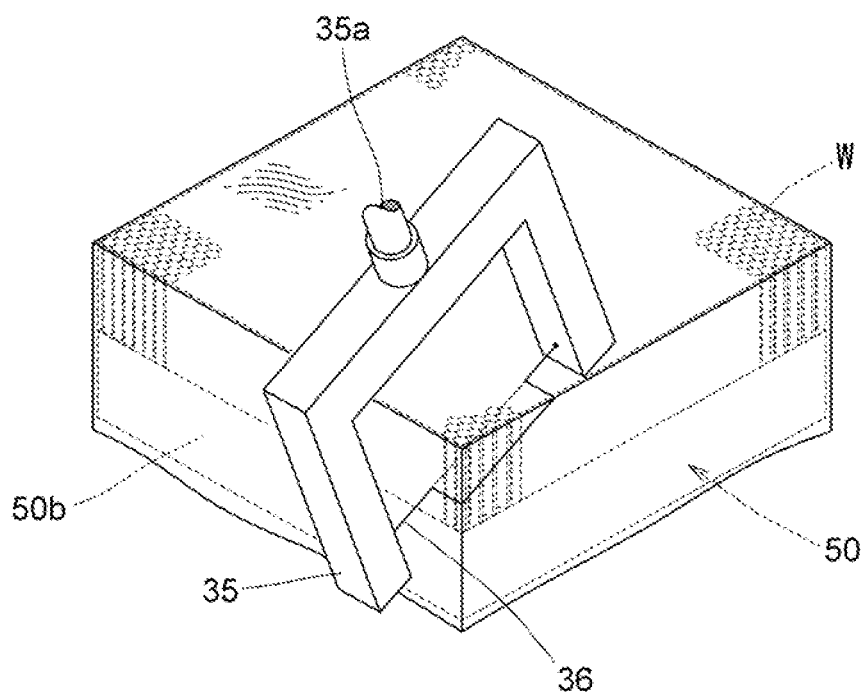
Figure 29D:
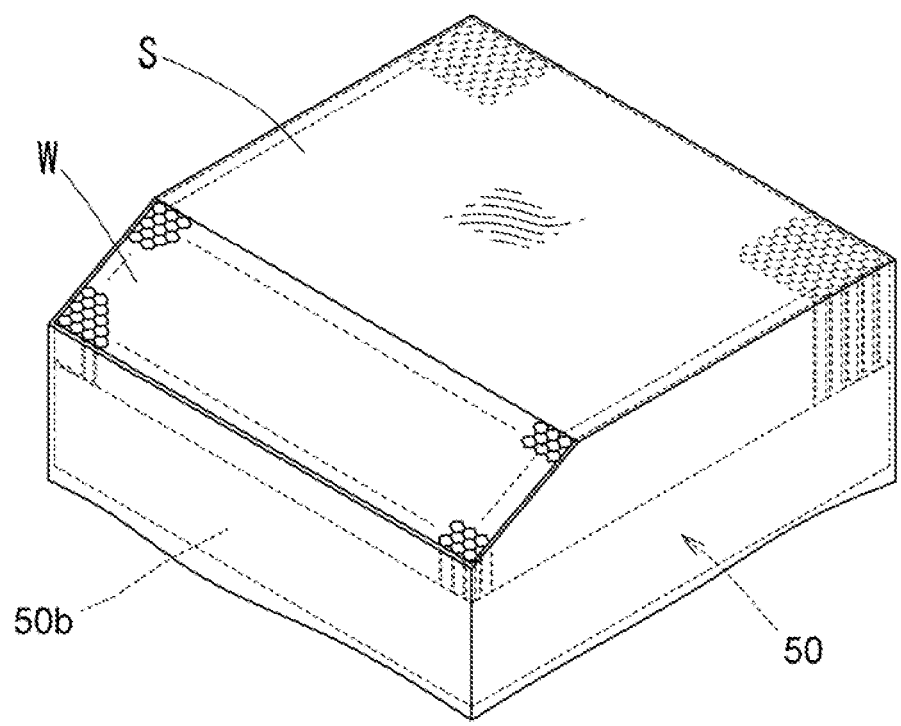
FIG. 29(d) is an explanatory diagram of the processing method according to the third embodiment concerning the method of holding the workpiece of the present invention.

As shown in FIG. 28(c), a wire saw is used as the processing unit 35 in the present embodiment. The processing unit 35 approaches the workpiece W, and the workpiece W is cut into a predetermined shape by pressing the wire 36 against the workpiece W while causing the wire 36 to travel and swing. At this time, since the air-impermeable sheet S is sucked and held on the side surface holding portion 50b as shown in FIG. 29(d), the air-impermeable sheet S is not entangled or interfered with the wire 36. In the swinging of the wire 36, a swing angle, a swing speed, and whether to swing or not may be appropriately selected in accordance with the material to be cut or the like.

Next, a fourth embodiment of the processing device will be described with reference to FIGS. 30(a) and 30(b). In the present embodiment, a case where a wire saw, for example, is used for the processing unit 35 will be shown.

Figure 30A:
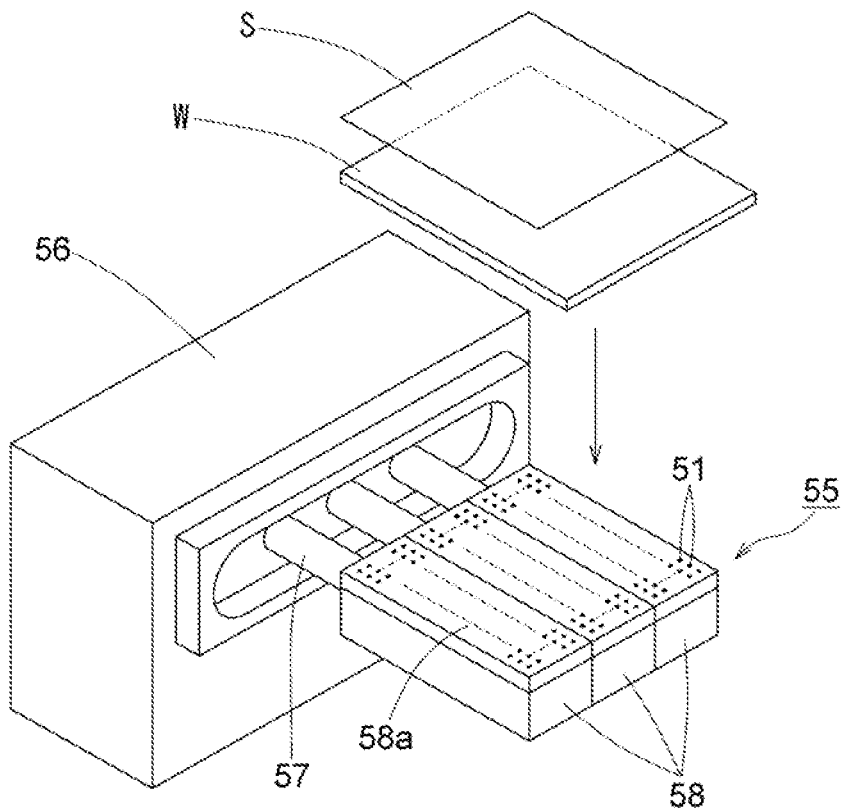
FIGS. 30(a) and 30(b) are explanatory diagrams of a processing method according to a fourth embodiment concerning the method of holding the workpiece of the present invention.

As shown in FIG. 30(a), a table unit 55 includes a support frame 56 provided with an opening along a horizontal direction on one side, a plurality of movable shafts 57 movably supported at an opening portion of the support frame 56, tables 58 fixed to ends of the movable shafts 57, and the like.

A large number of suction holes 51 are bored in a surface of each of the plurality of tables 58. Further, a vacuum pump (not shown) is connected to a holding surface 58a of each of the tables 58 through a switching valve (not shown) such that a negative pressure acts independently.

The other end side of the movable shafts 57 to which the tables 58 are not connected is movably supported on a rail (not shown), and are each controlled to be independently movable by an appropriate drive source (not shown) and a control device (not shown).

In the present embodiment, a state in which the workpiece W having a width of the tables 58 combined is processed is shown. The workpiece W having a size so as to protrude from the tables 58 in a longitudinal direction is processed.

First, the tables 58 are brought close to and into contact with one another. In the case of processing a workpiece W having a large width, the plurality of tables 58 may be separated as appropriate. In this state, the workpiece W is placed on the tables 58, and when the workpiece W has air permeability, the air-impermeable sheet S is placed over the upper surface of the workpiece W, and a region opposing the suction holes 51 of the tables 58 is covered with the air-impermeable sheet S.

Figure 30B:
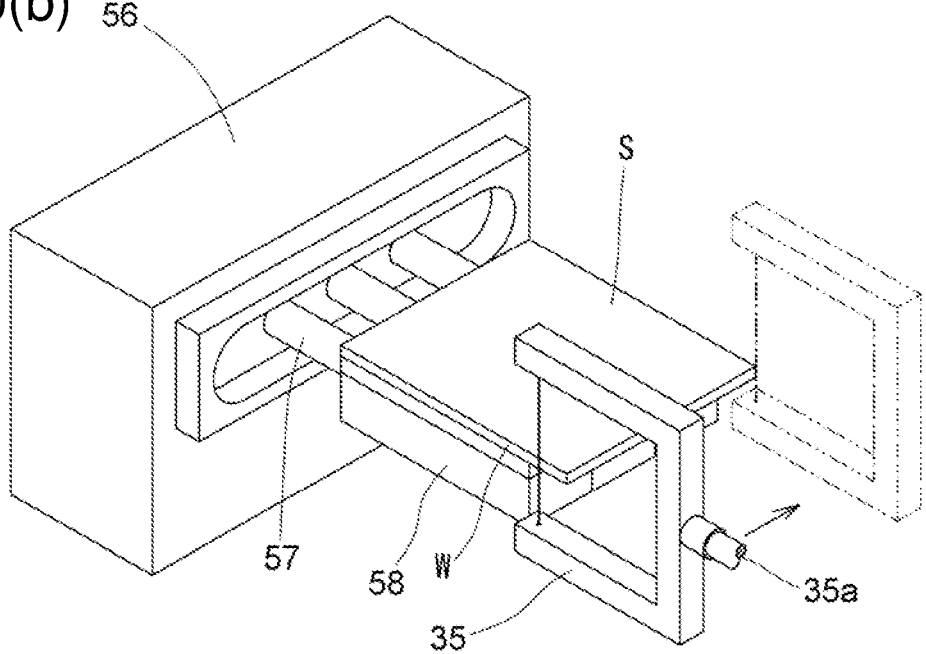

As shown in FIG. 30(b), the processing unit 35 is brought close to the workpiece W, and is caused to act on the part of the workpiece W protruding from the tables 58. As a result, the workpiece W is cut. At this time, since the processing unit 35 acts on the part of the workpiece W protruding from the tables 58, the processing unit 35 and the tables 58 do not interfere with each other. Note that, if necessary, a cut off piece of the workpiece W after cutting may be held by appropriate fixing means.

Figure 31A:
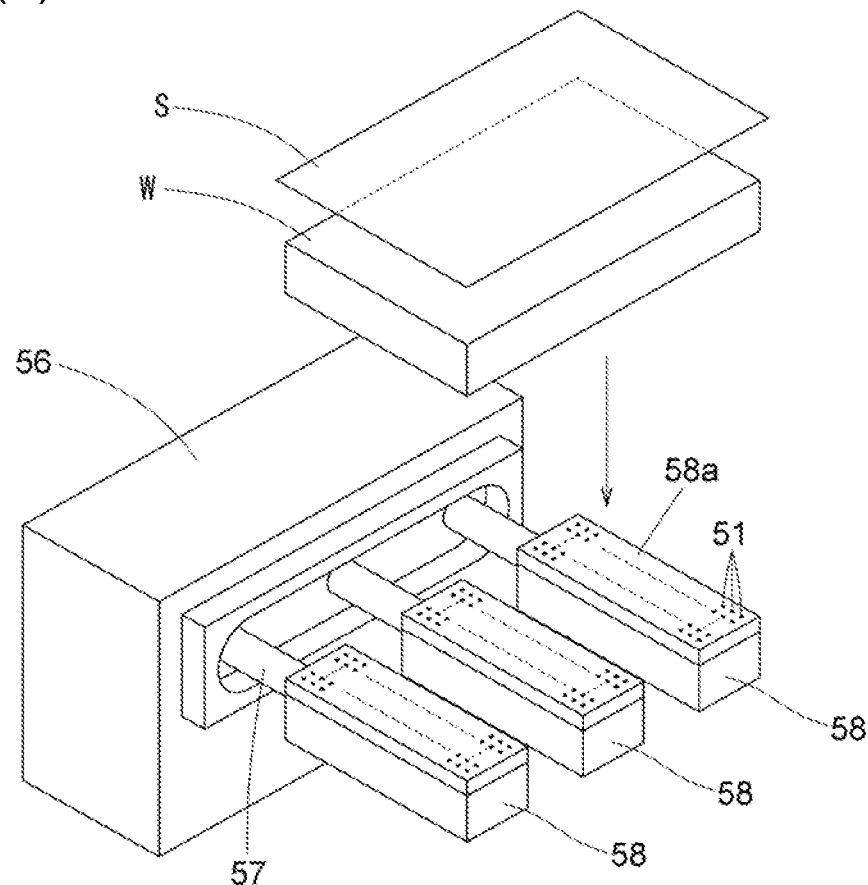
FIGS. 31(a) and 31(b) are explanatory diagrams of another processing method according to the fourth embodiment concerning the method of holding the workpiece of the present invention.
Figure 31B:
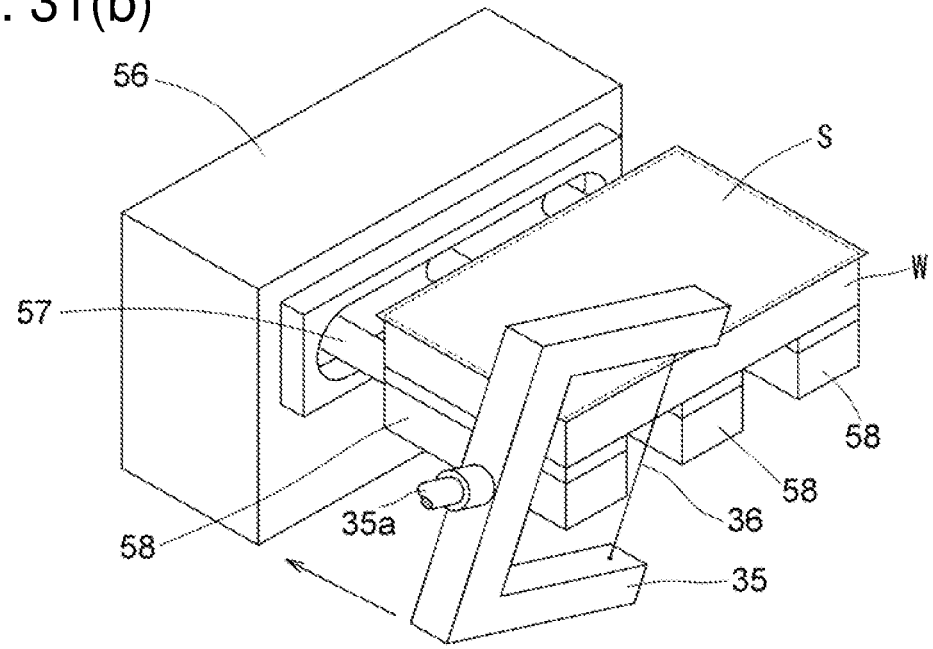

FIGS. 31(a) and 31(b) show an embodiment in the case of processing an intermediate portion of the workpiece W in a fourth embodiment. In the present embodiment, a state where a wire saw, for example, is used for the processing unit 35 will be shown.

As shown in FIG. 31(a), the movable shafts 57 are driven such that the tables 58 are at predetermined intervals. Subsequently, the workpiece W is placed so as to bridge over the holding surfaces 58a of the tables 58. Next, in the case where the workpiece W has air permeability, the air-impermeable sheet S is placed over the workpiece W, and a region opposing the suction holes 51 of the tables 58 is covered with the air-impermeable sheet S.

As shown in FIG. 31(b), in the present embodiment, processing is performed such that the processing region of the processing unit 35 pass through gaps between the tables 58. Further, in the present embodiment, the workpiece W is cut in an inclined state. Also in this case, since the processing unit 35 passes through the gaps between the tables 58, the processing unit 35 and the tables 58 do not interfere with each other.

Next, a fifth embodiment of the processing device of the present invention will be described with reference to FIGS. 32(a) and 32(b). In the embodiment of the present invention, a case where a wire saw, for example, is used for the processing unit 35 is shown.

Figure 32A:
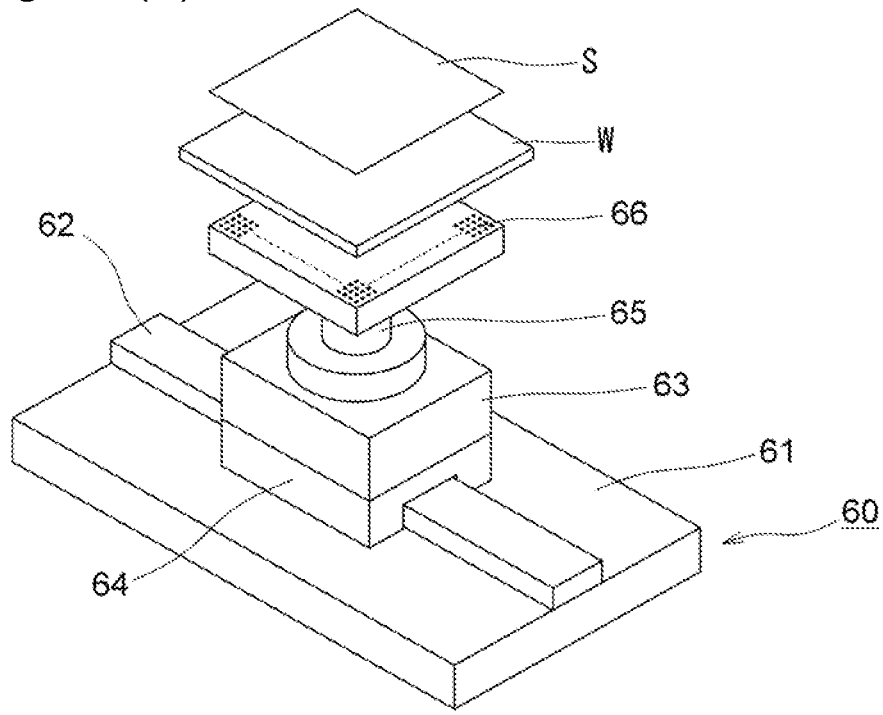
FIGS. 32(a) and 32(b) are explanatory diagrams of a processing method according to a fifth embodiment concerning the method of holding the workpiece of the present invention.

As shown in FIG. 32(a), a table unit 60 of the processing device 31 of the present embodiment includes a support base 61, a rail 62 laid on the support base 61, a movable frame 63 that moves along the rail 62, a rotary shaft 65 rotatably supported on the movable frame 63, a table 66 fixed on the rotary shaft 65, and the like.

A slider 64 provided on a lower surface of the movable frame 63 is slidably fitted on the rail 62, and can be moved along the rail 62 by a drive source (not shown). Further, the movable frame 63 is provided with a motor (not shown) and is connected to the rotary shaft 65. Therefore, by driving the motor, the rotary shaft 65 is rotated, and thus the table 66 is freely rotated.

In addition, a plurality of suction holes 51 are provided on the table 66 and connected to a vacuum pump (not shown).

In the case where the workpiece W is placed on the table 66 and the workpiece W is an air-permeable member, the air-impermeable sheet S is placed over the workpiece W similarly to the other embodiments.

Figure 32B:
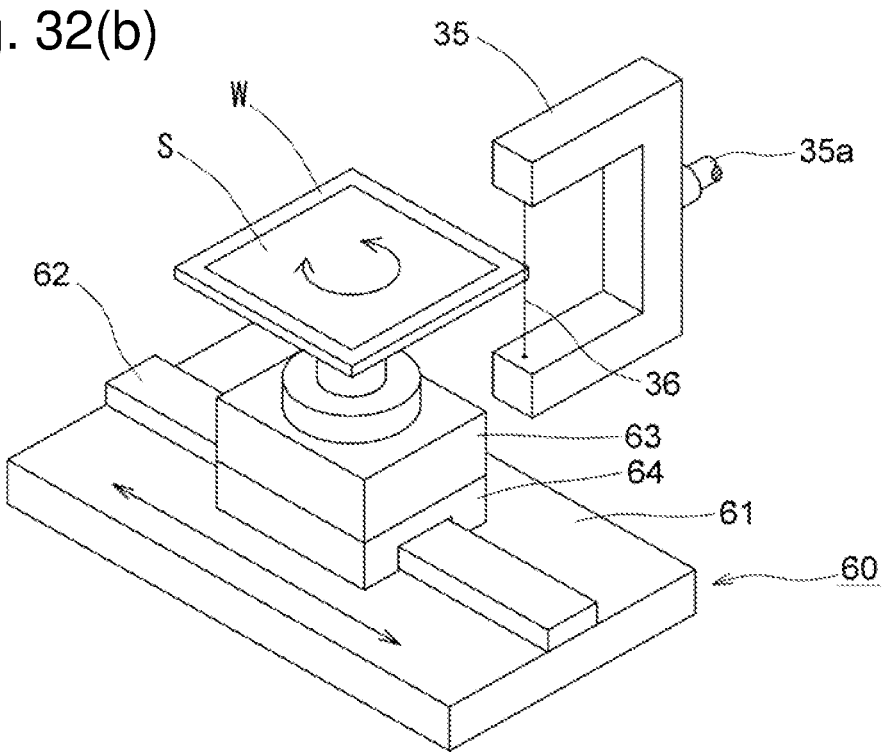

As shown in FIG. 32(b), the table 66 is horizontally moved and/or rotated by a control device (not shown), and thus the workpiece W is processed into an arbitrary shape. It should be noted that the present embodiment can be preferably used when it is difficult to move the robot arm 33. In the present embodiment, the processing unit 35 is fixed at a predetermined position, and the workpiece W can be processed into an arbitrary shape by horizontally moving and/or rotating the table 66. Further, by moving the processing unit 35 by moving the robot arm 33 and horizontally moving and/or rotating the table 66, processing into a more complicated shape can be easily performed.

Figure 33A:
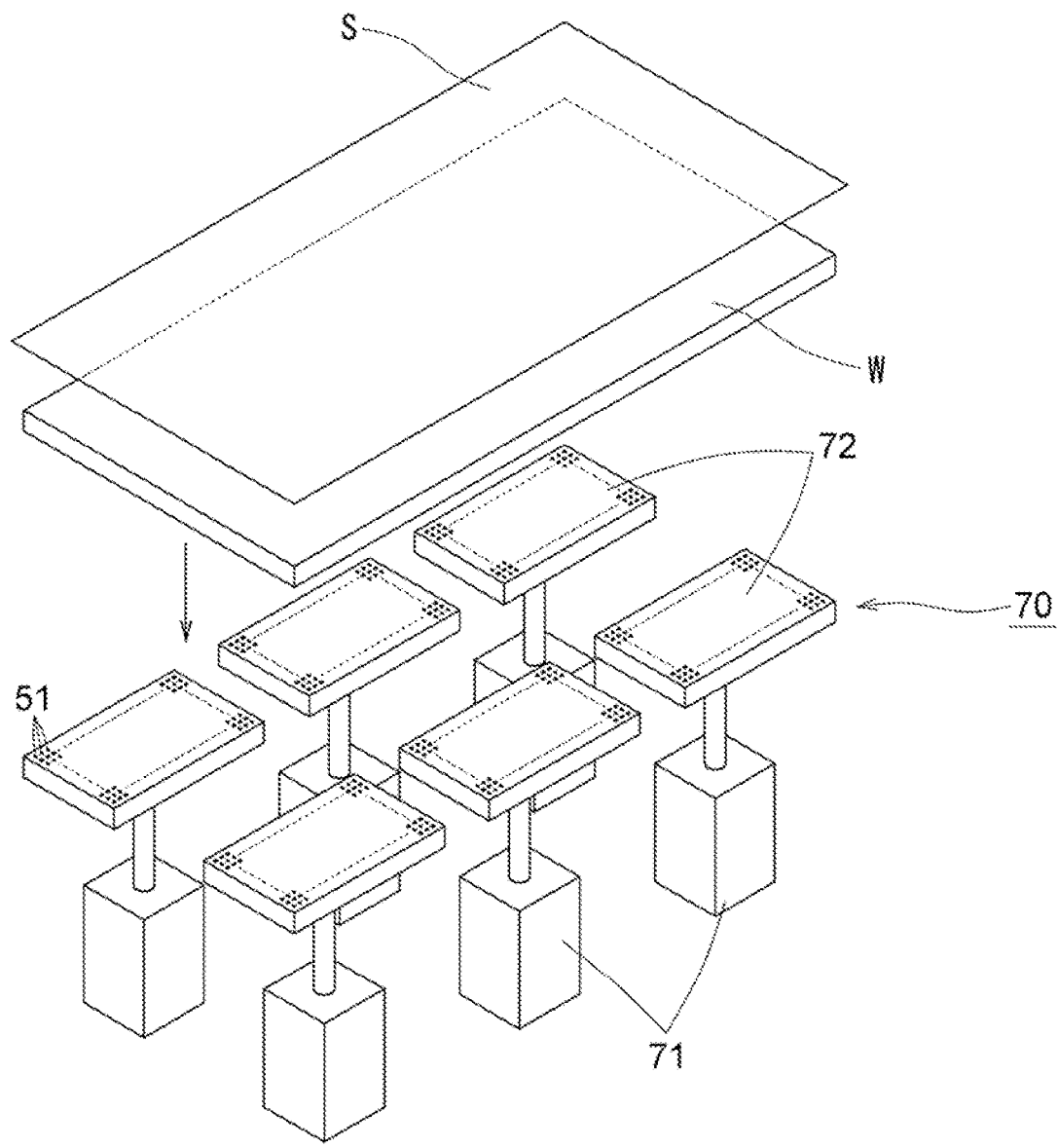
FIG. 33(a) is an explanatory diagram of a processing method according to a sixth embodiment concerning the method of holding the workpiece of the present invention.
Figure 34B:
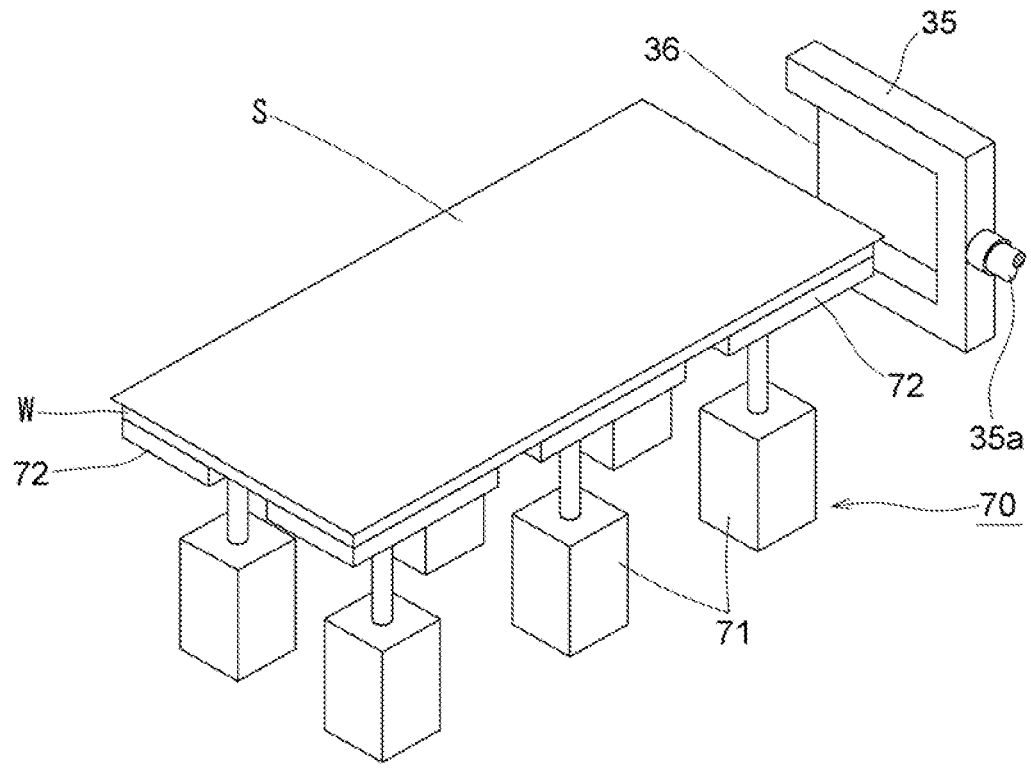
FIGS. 34(b) and 34(c) are explanatory diagrams of the processing method according to the sixth embodiment concerning the method of holding the workpiece of the present invention.
Figure 34C:
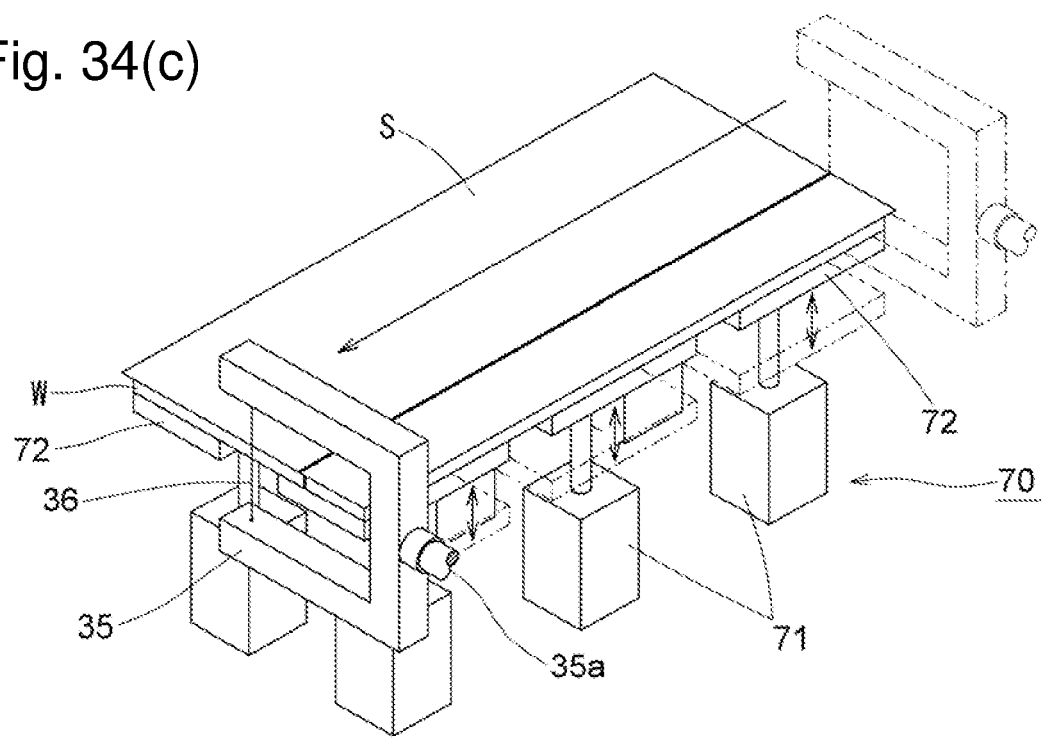

FIGS. 33(a), 34(b) and 34(c) are explanatory diagrams showing a sixth embodiment of the processing device of the present invention. Also in the present embodiment, a case where a wire saw is used for the processing unit 35 is shown.

As shown in FIG. 33(a), a table unit 70 is constituted by a plurality of cylinders 71 arranged on a machine base (not shown), tables 72 fixed to upper ends of cylinder shafts of the cylinders 71, and the like.

The tables 72 are provided with a plurality of suction holes 51 in upper surfaces thereof, an independent suction line is provided for each of the tables 72, and a vacuum pump (not shown) is connected to the suction line. In the present embodiment, when performing processing by the processing device 31, the cylinders 71 are controlled so that upper surfaces of the tables 72 are leveled.

In processing, the workpiece W is first placed on the tables 72. The workpiece W is, for example, a member having air permeability, and an air-impermeable sheet S is placed over a surface of the workpiece W. Subsequently, the workpiece W is sucked and held on the tables 72 by operating the vacuum pump.

As shown in FIG. 34(b), the processing unit 35 is brought close to the workpiece W. In the present embodiment, the wire 36 of the wire saw is positioned near a center of a short side of a rectangular workpiece W. As shown in FIG. 34(c), the tables 72 sequentially descend while releasing the suction, and thus a pocket portion of the frame 38 of the processing unit 35 passes over the tables 72 that have descended. Every time the frame 38 passes over a table 72, the table 72 ascends, and sucks and holds the workpiece W again. Accordingly, it is possible to continuously hold the workpiece W during processing by the processing device 31.

Figure 35A:
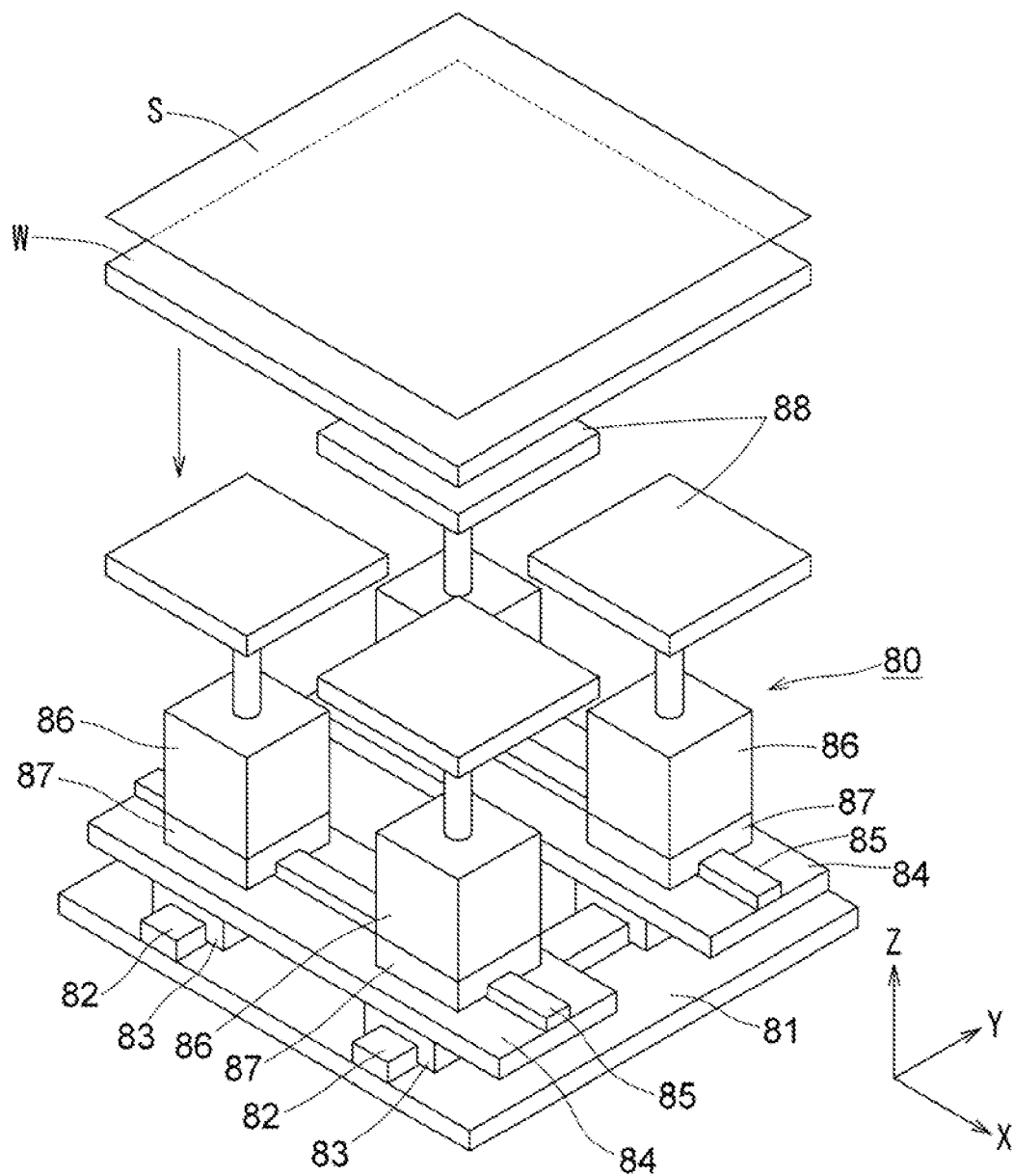
FIG. 35(a) is an explanatory diagram of a processing method according to a seventh embodiment concerning the method of holding the workpiece of the present invention.

Next, a seventh embodiment of the processing device of the present invention will be described with reference to FIGS. 35(a) and 36(b). Also in the present embodiment, a case where a wire saw is used for the processing unit 35 is shown.

A table unit 80 of the present embodiment includes a support base 81, two movable bases 84 and 84 movable on the support base 81 in a Y direction, a plurality of support frames 86 movable on the movable bases 84 in an X direction, tables 88 provided on the support frames 86, and the like.

Two rails 82 and 82 are laid on an upper surface of the support base 81 along the Y direction. The two movable bases 84 and 84 are arranged in parallel along the X direction on the rails 82 and 82, and sliders 83 and 83 respectively provided on lower surfaces of the movable bases 84 and 84 are respectively fitted on the rails 82 and 82. The movable base 84 is movable in the Y direction by a drive source (not shown).

A rail 85 is laid on the movable base 84 along the X direction. A series of two support frames 86 and 86 are provided on the movable base 84. A slider 87 is provided on a lower surface of the support frame 86 and is fitted on the rail 85. The support frame 86 is movable along the X direction by a drive source (not shown).

The support frame 86 is provided with a cylinder, and a table 88 is fixed above a cylinder shaft. The table 88 can ascend and descend by driving the cylinder. Therefore, the table 88 is movable in X, Y, and Z directions.

Figure 36B:
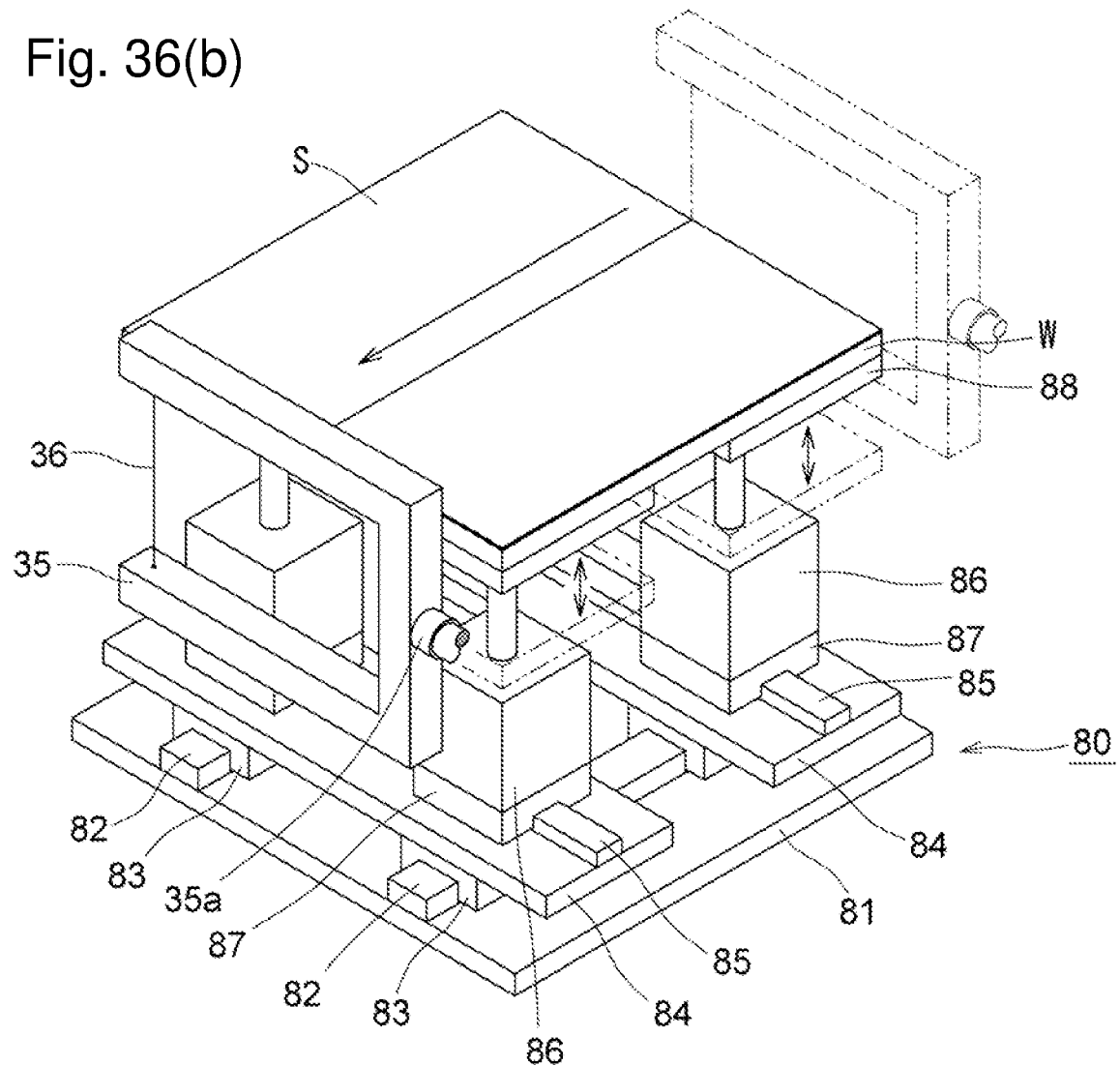
FIG. 36(b) is an explanatory diagram of the processing method according to the seventh embodiment concerning the method of holding the workpiece of the present invention.

As shown in FIG. 36(b), by moving each table 88 in the X and Y directions in accordance with the size of the workpiece W, it is possible to deal with workpieces W of various sizes. In addition, tables 88 suck and hold the workpiece W with appropriate intervals therebetween, and thus the workpiece W can be processed into various shapes without interfering with the processing unit 35.

Next, a processing example in the case of using a band saw as the processing unit 35 of the present invention will be described with reference to FIGS. 37 and 38.

Figure 37:
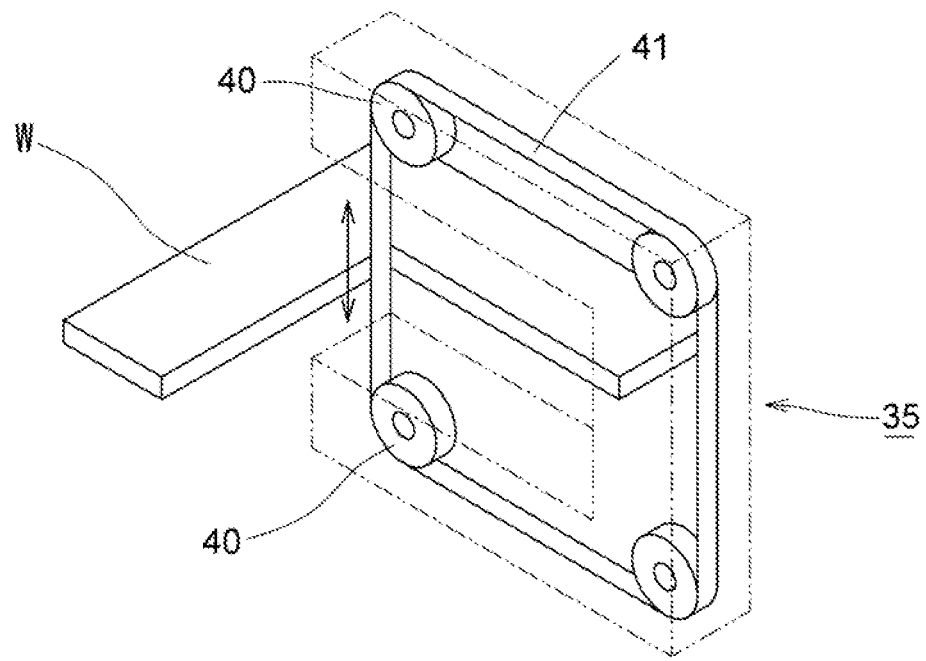
FIG. 37 is an explanatory diagram of a processing method, in the case of using a band saw as a processing unit, concerning the method of holding the workpiece of the present invention.

FIG. 37 shows a state in which a corner portion of the workpiece W is polished using the front surface of the belt of the band saw 41 of the processing unit 35. At this time, the processing region of the band saw 41 is pressed against the workpiece W while causing the band saw 41 to travel in one direction or travel reciprocally. Further, by blowing the cooling air by the jetting nozzles 37 (see FIGS. 22 and 23), it is possible to efficiently perform processing with high accuracy.

Figure 38:
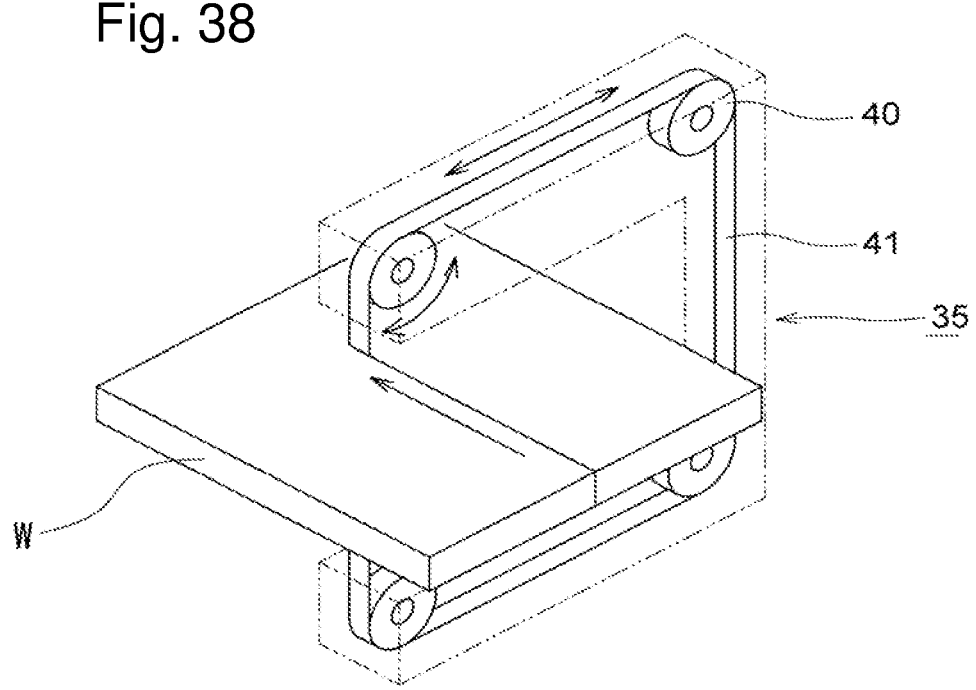
FIG. 38 is an explanatory diagram of another processing method, in the case of using a band saw as a processing unit, concerning the method of holding the workpiece of the present invention.

FIG. 38 shows a state in which the workpiece W is cut using a side surface of the belt of the band saw 41 of the processing unit 35. At this time, the processing region of the band saw 41 is pressed against the workpiece W while causing the band saw 41 to travel in one direction or travel reciprocally. Further, by blowing the cooling air by the jetting nozzles 37, it is possible to efficiently perform processing with high accuracy. Not only the cooling air but also, for example, inert gas such as nitrogen gas or argon from the jetting nozzles 37 can be appropriately selected in accordance with the material of the workpiece W.

Embodiments of the present invention have been described above, but the present invention is not limited to these embodiments and can be appropriately modified within the scope of the invention. For example, not only articulated robots as robot arms but also various industrial robots can be used. The workpiece is not limited to honeycomb members for aircraft, and can be widely applied to carbon fiber reinforced resin (CFRP), various resins, ceramics, various porous bodies, and the like. In addition to wire saws and band saws, various devices such as various cutting tools and polishing whetstones can be used for the processing device.

Next, an eighth embodiment of the processing device of the present invention will be described below with reference to FIGS. 39 to 46.

Figure 39:
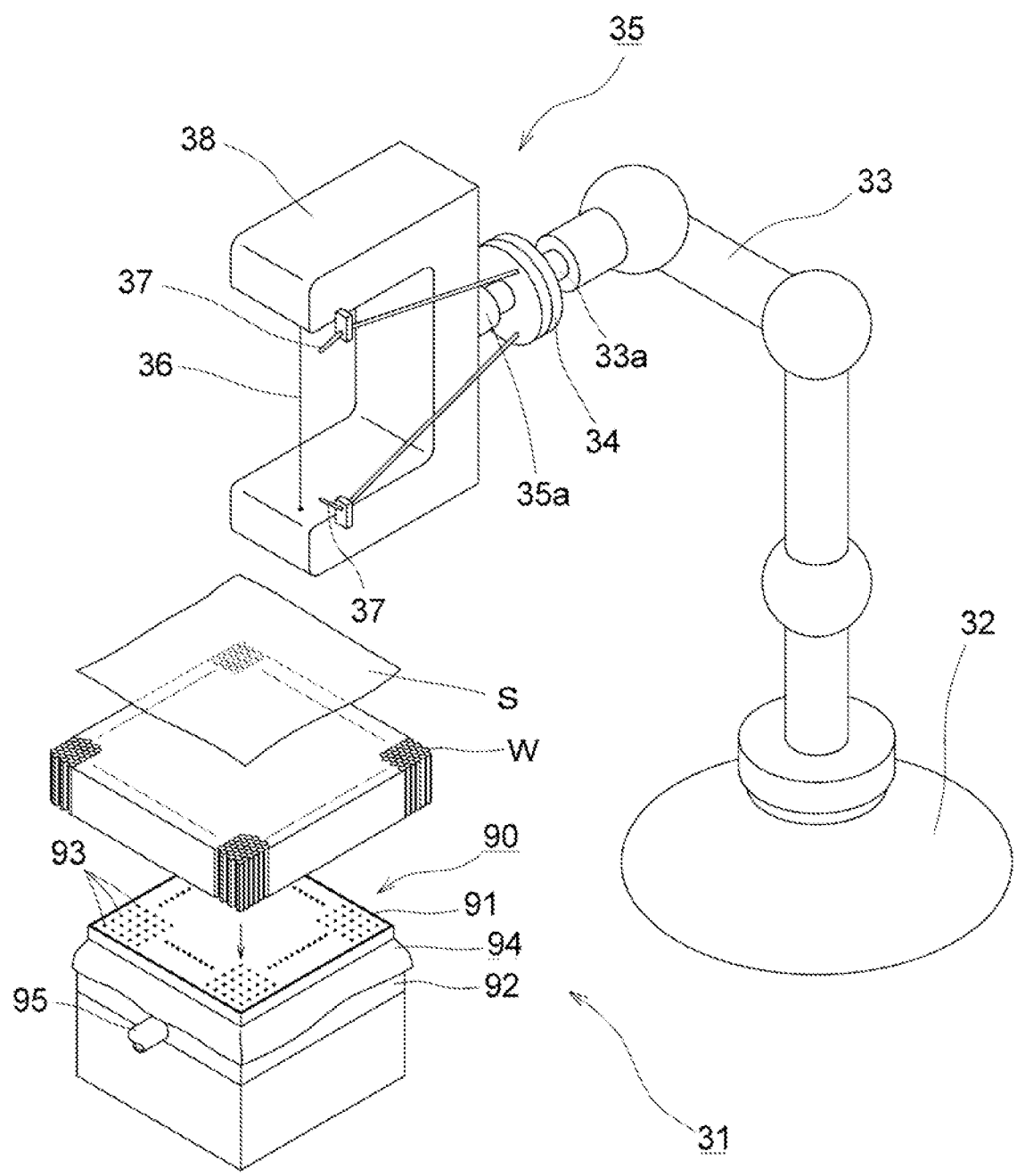
FIG. 39 is an overall perspective view of a processing device including a wire saw according to an eighth embodiment concerning the method of holding the workpiece of the present invention.

Details of the processing unit 35 in the processing device 31 of the present invention shown in FIG. 39 are the same as those in FIG. 19, and thus detailed description thereof will be omitted.

A table 90 of this embodiment is provided in the vicinity of the processing unit 35 and is erected on a base (not shown). The table 90 includes an inner table 91 for placing and fixing the workpiece W on an upper surface thereof, and an outer casing 92 which is provided to surround an outer side of the inner table 91 and in which the inner table 91 is fitted.

Figure 40:
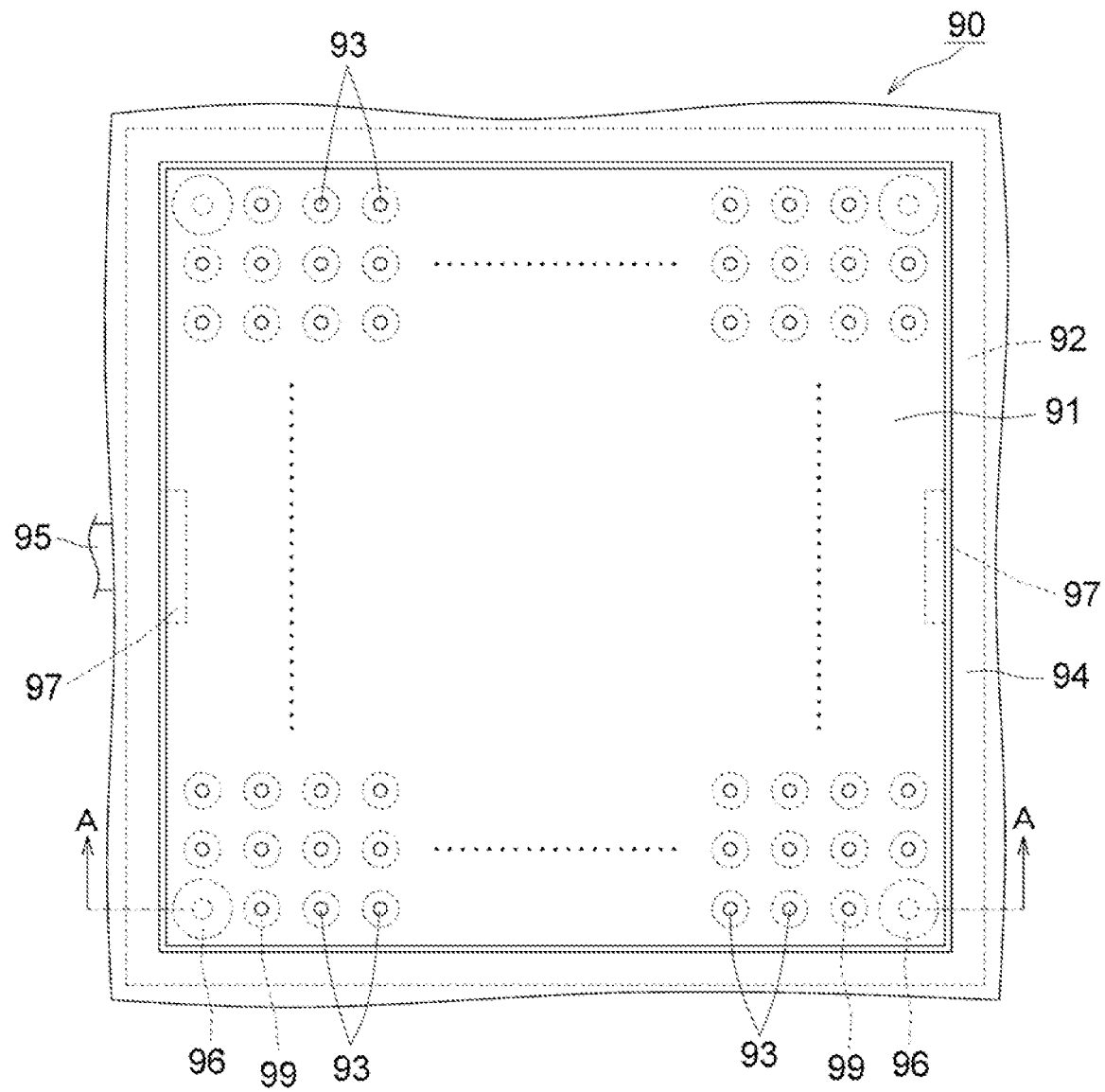
FIG. 40 is a plan view of a table portion of the processing device according to the eighth embodiment.
Figure 41:
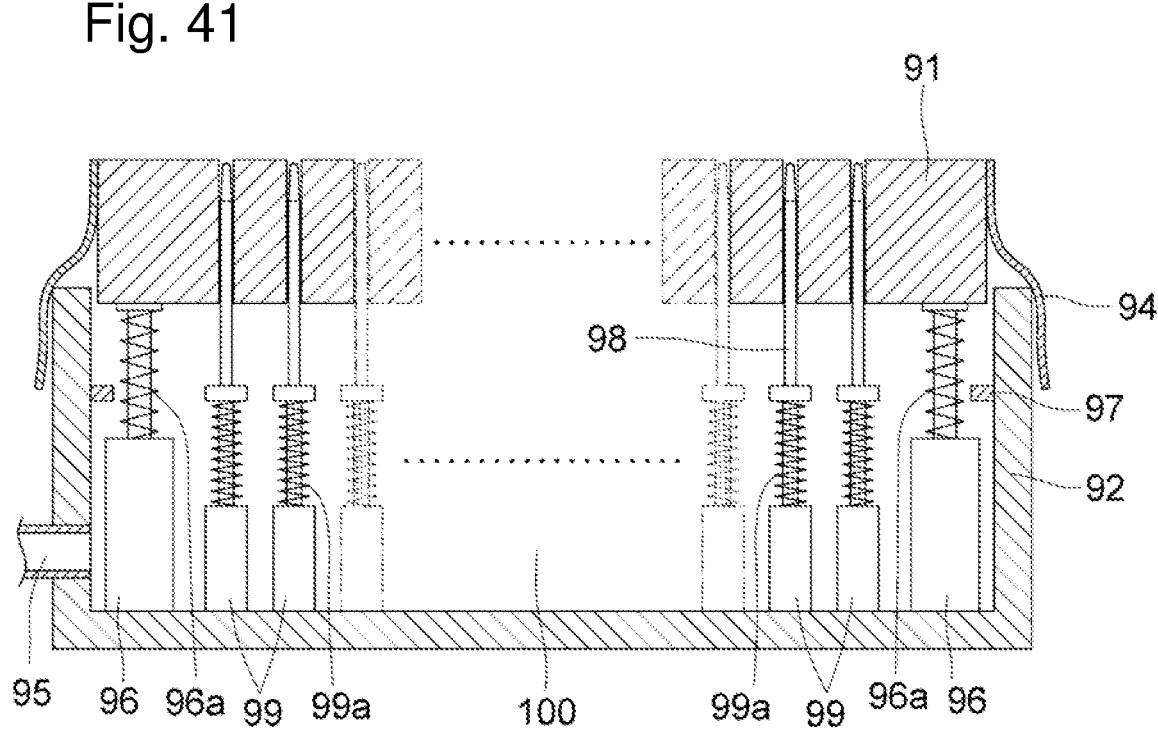
FIG. 41 is an arrow section view taken along an A-A direction in FIG. 40.

As shown in FIGS. 40 and 41, the inner table 91 has a plurality of suction holes 93 bored in a placement surface. In addition, the inner table 91 is supported by guide members 96 provided at four corners of the outer casing 92 and urged upward by elastic members 96a such as springs provided on the guide members 96.

An air-impermeable cover 94 is attached along a side surface portion of the inner table 91, and the cover 94 is placed over the outer side of the outer casing 92. Therefore, the inner table 91 and the outer casing 92 form a suction chamber 100 via the cover 94. A suction adapter 95 is provided on the outer casing 92, and suction means such as a blower (not shown) is connected to the suction adapter 95. When suction is performed by the suction means when the suction holes 93 are blocked, negative pressure is generated in the suction chamber 100.

When the suction chamber 100 is at atmospheric pressure or positive pressure, the inner table 91 is positioned at a raised position, and when the suction chamber 100 is depressurized to negative pressure, the inner table 91 descends against the elastic members 96a, and is positioned at a lowered position. Note that stoppers 97 are provided on inner walls of the outer casing 92 such that the inner table 91 stops at the lowered position when descending.

Ascending/descending pins 98 are inserted in the respective suction holes 93, and tip ends of the ascending/descending pins 98 are provided so as to be flush with or slightly lower than the placement surface of the inner table 91 positioned at the raised position. Lower ends of the ascending/descending pins 98 are supported by guide members 99 erected on a bottom surface of the outer casing 92 so as to be capable of freely ascending and descending. Further, elastic members 99a such as springs are provided on the guide members 99, and the elastic members 99a urge the ascending/descending pins 98 upward.

Therefore, by setting the suction chamber 100 to a negative pressure and lowering the inner table 91 to the lowered position, the ascending/descending pins 98 project from the placement surface of the inner table 91. Further, when the suction holes 93 are blocked by the workpiece W, the ascending/descending pins 98 receive resistance, and the elastic members 99a are compressed such that the ascending/descending pins 98 do not project. A projecting length of the ascending/descending pins 98 may be appropriately changed in accordance with a length of the opening of the workpiece W, and is preferably about 20% to 80% of the length of the opening, for example. However, the present invention is not limited to this, and it is also possible to fix the ascending/descending pins 98 without inserting the ascending/descending pins 98 with a balance with a suction holding force.

In embodiments of the present invention, a honeycomb core member used for, for example, aircraft parts or automobile parts is used as the workpiece W.

The honeycomb core member is formed by assembling a large number of hexagonal cells (tubular bodies) 45 in a honeycomb shape (honeycomb arrangement), and has air permeability along an axial direction of the cells 45. The cells 45 are formed of fiber reinforced resin such as aramid resin, a lightweight metal such as aluminum, or the like, and has high strength with respect to weight. Since the honeycomb core member has air permeability in the axial direction of the cells 45, even if an attempt is made to hold the honeycomb core member on the table 90 as it is, a suction failure occurs and the honeycomb core member cannot be held. Therefore, in the embodiment of the present invention, the honeycomb core member is placed on the table 90, and the air-impermeable sheet S is placed over the upper surface of honeycomb core member. Note that the air-impermeable sheet S may have a size at least to cover a position facing the suction holes 93 of the table 90.

Although the honeycomb core member having air permeability is processed as the workpiece W in the present embodiment, air-permeable members other than the honeycomb core member can also be processed. In this case, as in the case of the honeycomb core member, the air-impermeable sheet S may be placed over the member. In addition, the honeycomb core member is not limited to hexagonal cells, and members formed of cells of various shapes such as rectangular and triangular can be also processed. Further, even an air-impermeable member having an opening through which the ascending/descending pins 98 can be inserted on the placement surface side of the workpiece W can be preferably processed. In this case, the workpiece W can be fixed by suction holding and the ascending/descending pins 98 without using the air-impermeable sheet S.

A configuration of the processing device according to an embodiment of the present invention has been described above, and a method of sucking and holding the workpiece W using the processing device of the present invention will be described below with reference to FIGS. 42 to 45.

Figure 42A:
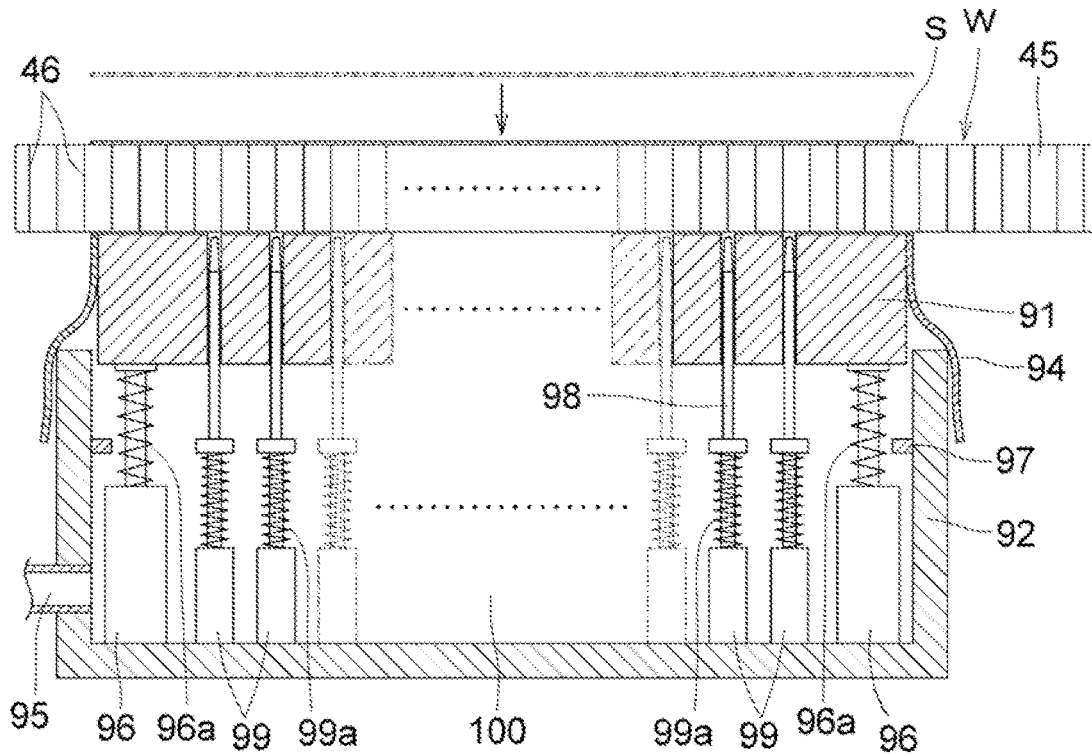
FIGS. 42(a) and 42(b) are explanatory diagrams of a state in which the workpiece is fixed to the table according to the eighth embodiment.
Figure 42B:
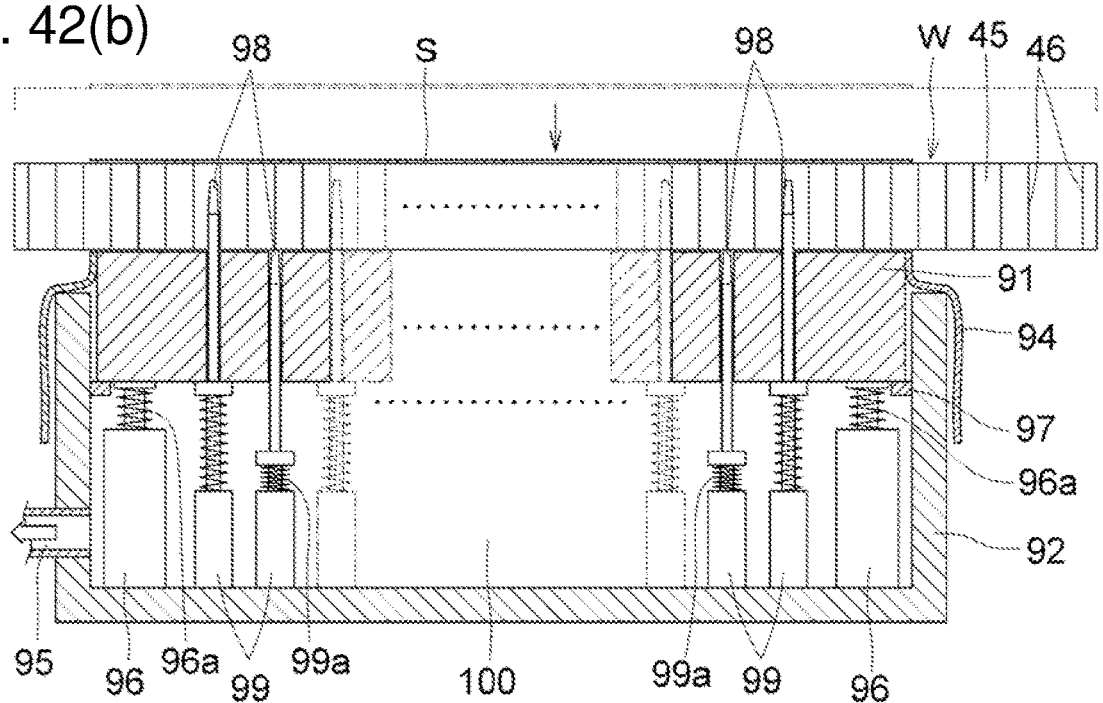

FIGS. 42(a) and 42(b) are explanatory diagrams showing a state in which the workpiece W (honeycomb core member) is fixed to the table 90.

As shown in FIG. 42(a), the inner table 91 is positioned at the raised position, and the workpiece W is placed on the placement surface of the inner table 91. Next, the air-impermeable sheet S is placed over the workpiece W. The air-impermeable sheet S may have a size large enough to cover the plurality of suction holes 93 of the inner table 91 and corresponding cells 45 of the workpiece W.

As shown in FIG. 42(b), depressurization is performed by suction means (not shown) connected to the suction adapter 95 to generate a negative pressure in the suction chamber 100, and thus the inner table 91 descends. When the inner table 91 abuts the stoppers 97, the descending of the inner table 91 is stopped and the inner table 91 is positioned at the lowered position.

Figure 43:
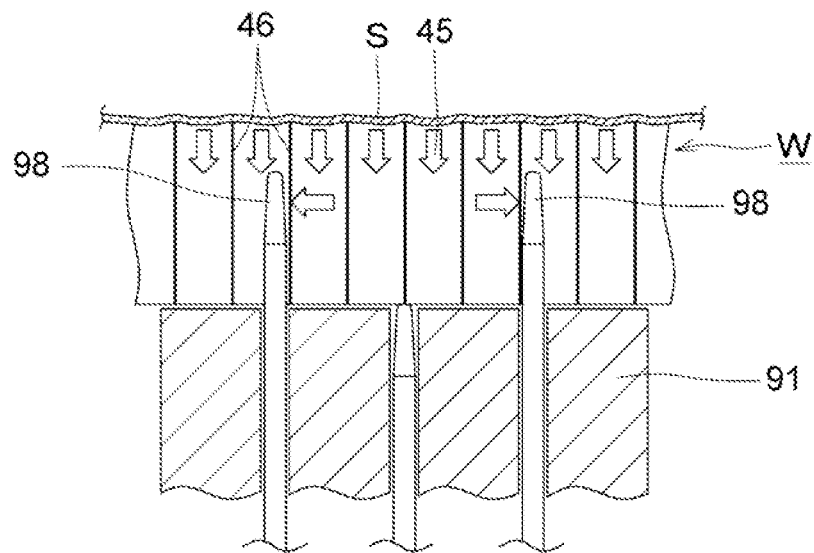
FIG. 43 is an enlarged explanatory view of the table portion in a sectional direction in a state in which the workpiece is fixed to the table in the processing device according to the eighth embodiment.

As the inner table 91 descends, the ascending/descending pins 98 project from the placement surface of the inner table 91. At this time, only ascending/descending pins 98 which do not interfere with the cell walls 46 of the workpiece W enter the cells 45 of the workpiece W. The ascending/descending pins 98 that have interfered with the cell walls 46 of the workpiece W do not project from the placement surface of the inner table 91 due to contraction of the elastic members 99a as shown in FIG. 42(b) and FIG. 43. In this manner, since the ascending/descending pins 98 are urged upward by the elastic members 99a such that the ascending/descending pins 98 interfering with the workpiece W do not project, the workpiece W not having an opening can be held by suction, and the workpiece W having an opening can be held by suction and the ascending/descending pins 98. Therefore, various workpieces W can be efficiently held on the table 90 independently of the air permeability and or air impermeability of the workpiece W.

In addition, movement of the workpiece W in a direction perpendicular to the axes of the cells 45 is restricted as a result of the workpiece W being sucked and held on the inner table 91 by a suction force in the axial direction (vertical direction in the figure) of the cells 45 and a plurality of the ascending/descending pins 98 being inserted therein as indicated by arrows shown in FIG. 43. Note that, it is preferable that a tip end shape of the ascending/descending pins 98 is a curved surface or a flat surface so as not to damage the workpiece W even when contacting the cell walls 46 of the workpiece W. Further, it is preferable that the tip ends of the ascending/descending pins 98 are inclined in conical shapes such that the ascending/descending pins 98 smoothly enter the cells 45. Further, it is more preferable that the tip ends of the ascending/descending pins 98 are formed in conical shapes and end portions of the conical shapes are in spherical shapes in view of smoothly inserting the ascending/descending pins into the cells 45. Note that diameters of the ascending/descending pins 98 may be appropriately selected in accordance with the sizes of the cells 45 and may be any diameter as long as the ascending/descending pins 98 can be inserted in the cells 45.

Figure 44:
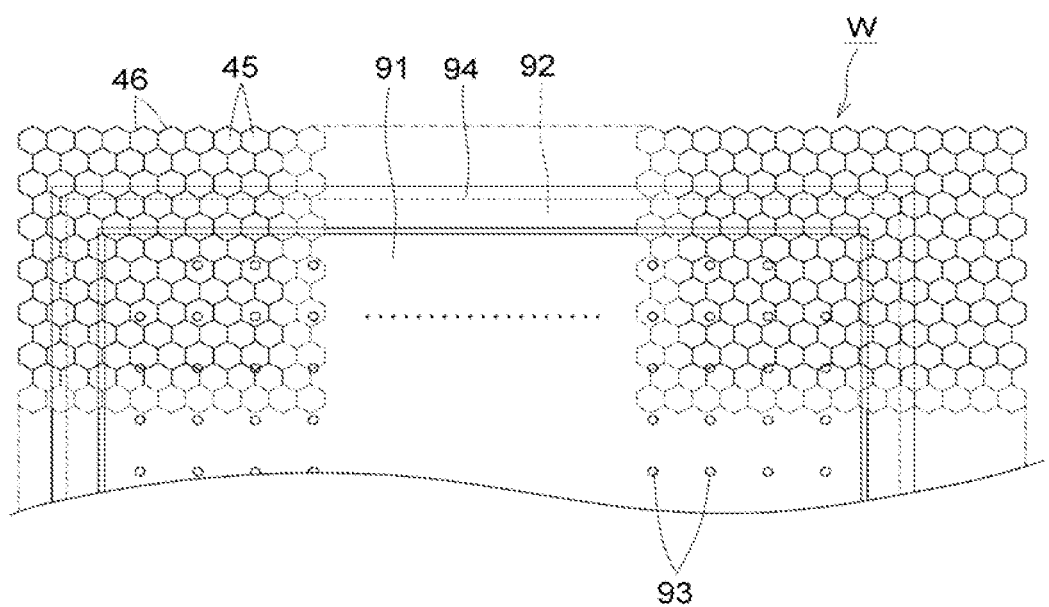
FIG. 44 is an explanatory view in a plane direction in a state in which the workpiece is placed on the table in the processing device according to the eighth embodiment.
Figure 45:
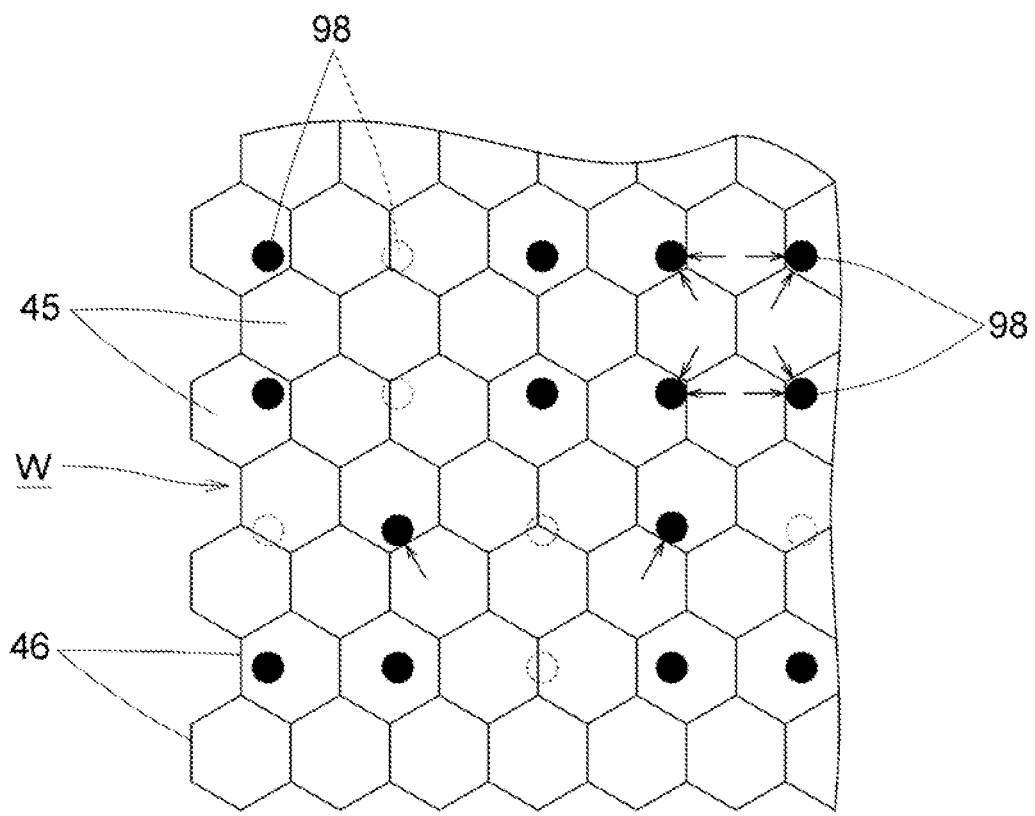
FIG. 45 is a partial enlarged explanatory view in a state in which the workpiece is placed on the table in the processing device according to the eighth embodiment.
Figure 46:
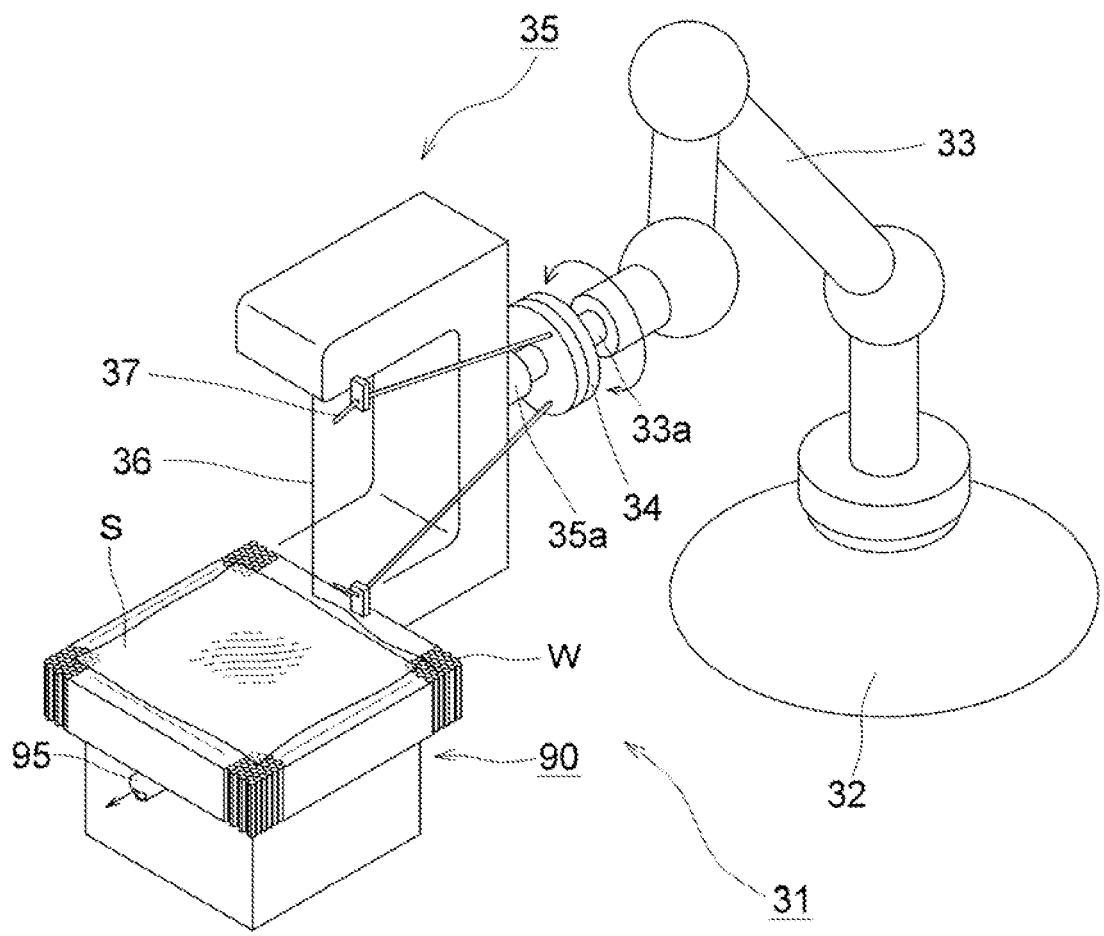
FIG. 46 is an explanatory diagram showing a state in which the workpiece is processed by the processing device according to the eighth embodiment.

FIGS. 44 and 45 are explanatory diagrams schematically showing a relationship with the ascending/descending pins 98 when the workpiece W is placed on the table 90.

As shown in FIG. 44, in the case where the workpiece W is placed on the table 90, there is a position where a plurality of the ascending/descending pins 98 interfere with the cells of the workpiece W and a position where the ascending/descending pins 98 are inserted in the cells 45 without interference. Since a large number of ascending/descending pins 98 are provided, a random plurality of ascending/descending pins 98 are inserted in the cells 45 of the workpiece W. Note that, the arrangement and diameters of the ascending/descending pins 98 can be appropriately changed in accordance with the shape of the workpiece W to be held. For example, the diameter of the ascending/descending pin 98 is about 2 to 3 mm, but the diameter can be appropriately changed in accordance with the size of the opening of the workpiece W, and any diameter can be preferably used as long as insertion in and pulling out from the opening of the workpiece W can be smoothly performed.

As shown in FIG. 45, the ascending/descending pins 98 inserted in the workpiece W are represented by black dots, and the ascending/descending pins 98 indicated by dotted lines represent ones that interfere with the cell walls 46 of the workpiece W and do not project. Movement of the ascending/descending pins 98 represented by the black dots is restricted by the cell walls 46 indicated by arrows shown in the figure. Therefore, the workpiece W is firmly held on the table 90 due to the holding force by suction and the limitation of lateral displacement by the ascending/descending pins 98.

Further, by releasing the suction and setting the inside of the suction chamber 100 to atmospheric pressure or positive pressure, the inner table 91 is raised to the raised position and the ascending/descending pins 98 are accommodated in the suction holes 93 of the inner table 91, and thus the workpiece W can be easily removed from the table 90.

Next, a processing method using the fixing method of the workpiece W on the table 90 described above will be described with reference to FIG. 46.

As described above, the workpiece W is placed on the placement surface of the table 90 and the air-impermeable sheet S is placed over the workpiece W. The air-impermeable sheet S may be a member of, for example, flexible vinyl or a hard thin plate of, for example, resin.

Next, the inside of the suction chamber 100 of the table 90 is set to negative pressure, and thus the workpiece W is fixed on the table 90. Subsequently, the processing unit 35 (wire saw in the present embodiment) mounted on the robot arm 33 is controlled, and thus the traveling wire 36 of the processing unit 35 is pressed against the workpiece W held on the table 90. At this time, cooling air is jetted from the jetting nozzles 37 to cool the wire 36 and blow off the cutting waste. In addition, the processing unit 35 rotates the tip end shaft 33a of the robot arm 33 forward and backward as necessary, and thus the wire 36 is caused to swing arcuately.

After the workpiece W is cut into a predetermined shape, the workpiece W whose cutting has been completed is detached by releasing the suction of the table 90.

Embodiments of the processing device and the processing method of the workpiece of the present invention have been described above, but the embodiments can be appropriately modified within the scope of the invention.

Although a wire saw is used as the processing unit in the present embodiment, various processing tools such as a band saw and a knife can be also used. Further, the shape of the table 90 may be not only a rectangle but also a circle, a triangle, or another polygon. Further, although the air-impermeable cover 94 is used on the outer side of the inner table 91 in the present embodiment, another sealing means such as a rubber ring may also be used. In the case of using a rubber ring, it is preferable that the inner table 91 and the outer casing 92 move smoothly.

It should be noted that the present invention is not limited to the above-described illustrated examples, and various modifications can be made within the scope of each claim as long as the examples do not deviate from the gist of the present invention. That is, embodiments obtained by combining technical means appropriately modified within the scope indicated by the claims are also included in the technical scope of the present invention.

REFERENCE SIGNS LIST 1 wire saw device
2 robot arm
3 wire saw unit
4a guide pulley
4b guide pulley
5 rotary pulley
6 workpiece
7 tool changer
8 wire
9 base
10 nozzle
10a air jetting nozzle
10b air suction nozzle
11 connection bracket
12 rotatable body
13a power supply connector 13b power supply connector
14a air supply connector
14b air supply connector
15 rotary shaft
16a air supply hose
16b air suction hose
16c pressurizing hose
17a substrate
17b substrate
18 male portion
19 female portion
20 processed region
21 nipple
22 fan
23 load cell
24 rotary shaft
25 bracket
26 table
26a holding surface
27 suction hole
28 air-impermeable member
W workpiece
S air-impermeable sheet
31 processing device
32 machine base
33 robot arm
33a tip end shaft
34 tool changer
35 processing unit
36 wire
37 jetting nozzle
38 frame
39 guide pulley
40 guide pulley
41 band saw
42 cylinder
45 cell
46 cell wall
50 table
50a holding surface
50b side surface holding portion
51 suction hole
52 suction region
53 switching valve
54 vacuum pump
55 table unit
56 support frame
57 movable shaft
58 table
58a holding surface
60 table unit
61 support base
62 rail
63 movable frame
64 slider
65 rotary shaft
66 table
70 table unit
71 cylinder
72 table
80 table unit
81 support base
82 rail
83 slider
84 movable base
85 rail
86 support frame
87 slider
88 table
90 table
91 inner table
92 outer casing
93 suction hole
94 cover
95 suction adapter
96 guide member
96a elastic member
97 stopper
98 ascending/descending pin
99 guide member
99a elastic member
100 suction chamber

The invention claimed is:

1. A processing device of a workpiece that processes the workpiece by a processing unit in a state in which the workpiece is held on a table, wherein
the table includes:
an inner table having a placement surface for the workpiece and a plurality of suction holes provided in the placement surface;
an outer casing that is provided so as to surround an outer side of the inner table and forms a suction chamber by fitting with the inner table; and
a plurality of ascending/descending pins capable of projecting and retracting provided in the outer casing and inserted in the suction holes of the inner table,
the inner table is provided to be relatively and vertically movable with respect to the outer casing, and configured to be positioned at a raised position when placing the workpiece and descend to a lowered position when negative pressure acts in the suction chamber, and
the ascending/descending pins are urged toward the placement surface by elastic members, and are configured to be positioned in the suction holes of the inner table when the inner table is at the raised position and project from the placement surface of the inner table when the inner table is at the lowered position.

2. The processing device of a workpiece according to claim 1, wherein the processing unit is a wire saw provided at a tip end of a freely movable robot arm.

3. The processing device of a workpiece according to claim 1, wherein
a plurality of openings are defined on at least one surface of the workpiece, and
at least one of the ascending/descending pins is inserted in an opening of the workpiece and the workpiece is fixed to the table by suction and the ascending/descending pin by placing the workpiece on the inner table, generating a suction force on the placement surface of the inner table to suck and hold the workpiece, thus causing the inner table to descend to the lowered position, and causing the ascending/descending pins to project.

4. The processing device of a workpiece according to claim 1, wherein
the workpiece is a honeycomb core member formed by assembling tubular cells, and
a suction force is generated on the placement surface of the table by placing an air-impermeable member over the honeycomb core member.

5. The processing device of a workpiece according to claim 1, wherein the ascending/descending pins are urged toward the placement surface by the elastic members, and only the ascending/descending pins corresponding to an opening portion of the workpiece project from the placement surface of the table.

\* \* \* \* \*